United States Patent [19]

Tsuruta et al.

[11] Patent Number: 5,038,658

[45] Date of Patent: Aug. 13, 1991

[54] METHOD FOR AUTOMATICALLY TRANSCRIBING MUSIC AND APPARATUS THEREFORE

[75] Inventors: Schichirou Tsuruta, Osaka; Yosuke Takashima, Tokyo; Masaki Fujimoto, Tokyo; Masanori Mizuno, Tokyo, all of Japan

[73] Assignees: NEC Home Electronics Ltd., Osaka; NEC Corporation, Tokyo, both of Japan

[21] Appl. No.: 315,761

[22] Filed: Feb. 27, 1989

[30] Foreign Application Priority Data

| | | | |
|---|---|---|---|
| Feb. 29, 1988 | [JP] | Japan | 63-46111 |
| Feb. 29, 1988 | [JP] | Japan | 63-46112 |
| Feb. 29, 1988 | [JP] | Japan | 63-46113 |
| Feb. 29, 1988 | [JP] | Japan | 63-46114 |
| Feb. 29, 1988 | [JP] | Japan | 63-46115 |
| Feb. 29, 1988 | [JP] | Japan | 63-46116 |
| Feb. 29, 1988 | [JP] | Japan | 63-46117 |
| Feb. 29, 1988 | [JP] | Japan | 63-46118 |
| Feb. 29, 1988 | [JP] | Japan | 63-46119 |
| Feb. 29, 1988 | [JP] | Japan | 63-46120 |
| Feb. 29, 1988 | [JP] | Japan | 63-46121 |
| Feb. 29, 1988 | [JP] | Japan | 63-46122 |
| Feb. 29, 1988 | [JP] | Japan | 63-46123 |
| Feb. 29, 1988 | [JP] | Japan | 63-46124 |
| Feb. 29, 1988 | [JP] | Japan | 63-46125 |
| Feb. 29, 1988 | [JP] | Japan | 63-46126 |
| Feb. 29, 1988 | [JP] | Japan | 63-46127 |
| Feb. 29, 1988 | [JP] | Japan | 63-46128 |
| Feb. 29, 1988 | [JP] | Japan | 63-46129 |
| Feb. 29, 1988 | [JP] | Japan | 63-46130 |

[51] Int. Cl.[5] .................... G09B 15/02

[52] U.S. Cl. .................... 84/461; 84/475; 84/616

[58] Field of Search .................... 84/461, 462, 475, 603, 84/616, 477 R

[56] References Cited

U.S. PATENT DOCUMENTS

| | | | |
|---|---|---|---|
| 3,647,929 | 3/1972 | Milde, Jr. | 84/461 X |
| 4,392,409 | 7/1983 | Coad, Jr. et al. | 84/477 R |
| 4,479,416 | 10/1984 | Clague | 84/462 |
| 4,603,386 | 7/1986 | Kjaer | 84/461 X |

FOREIGN PATENT DOCUMENTS

| | | |
|---|---|---|
| 0113257 | 7/1984 | European Pat. Off. . |
| 2139405 | 11/1984 | United Kingdom . |

OTHER PUBLICATIONS

"Transcription of Sung Song", by Takami Niihara, Masakazu Imai and Seiji Inokuchi, published in Oct. 1984.

"Personal Computer Music System" in NEC Technical Reports, vol. 41, No. 13, by Masaki Fujimoto, Masanori Mizuno, Shichiro Tsuruta and Yosuke Takashima, published in 1988.

*Primary Examiner*—Steven L. Stephan

*Assistant Examiner*—Emanuel Todd Voeltz

*Attorney, Agent, or Firm*—Cushman, Darby & Cushman

[57] ABSTRACT

An automatic music transcription method and system for generating a muscial score from an input acoustic signal. The acoustic signal may include vocal songs, vocal humming, and music from musical instruments. The system comprises means for extracting pitch information and power information from the input acoustic signal, for correcting the pitch information based on the deviation of the acoustic signal relative to an absolute musical scale, for dividing the acoustic signal into a set of single-sound segments using the corrected pitch information, dividing the acoustic signal into a second set of single-sound segments this time using changes in the power information, for dividing the acoustic signal in still greater detail using information contained in both previous segmentations, for associating each segment with a musical interval of an absolute musical scale, and for determining single-sounds segments depending on whether or not the musical intervals of adjacent segments are identical, for determining the key of the acoustic signal, for correcting the placement of the segments on the musical scale of the determined key using the pitch information, for determining the time and tempo of the acoustic signal using this placement, and for compiling musical score data using the determined musical scale, sound length, key, time, and tempo of the acoustic signal.

22 Claims, 36 Drawing Sheets

FIG. 39

| | C | C SHARP D FLAT | D | D SHARP E FLAT | E | F | F SHARP G FLAT | G | G SHARP A FLAT | A | A SHARP B FLAT | B |
|---|---|---|---|---|---|---|---|---|---|---|---|---|
| COL 1 C MAJOR | 2 | 0 | 2 | 0 | 2 | 1 | 0 | 2 | 0 | 2 | 0 | 1 |
| COL 2 A MINOR | 2 | 0 | 1 | 0 | 2 | 2 | 0 | 1 | 0 | 2 | 0 | 2 |
| COL 3 D FLAT MAJOR | 1 | 2 | 0 | 2 | 0 | 2 | 1 | 0 | 2 | 0 | 2 | 0 |
| COL 4 B FLAT MINOR | 2 | 2 | 0 | 1 | 0 | 2 | 2 | 0 | 1 | 0 | 2 | 0 |

WITH DETECTED MAXIMUM VALUE POSITIONED IN PROXIMITY OF SECOND LOCAL MAXIMUM POINT

WITH DETECTED MAXIMUM VALUE POSITIONED IN PROXIMITY OF FIRST LOCAL MAXIMUM POINT

METHOD FOR AUTOMATICALLY TRANSCRIBING MUSIC AND APPARATUS THEREFORE

BACKGROUND OF THE INVENTION

The present invention relates to automatically transcribing music (vocal music, vocal humming, and sounds of musical instruments) into a musical score.

In such an automatic music transcription system, it is necessary to detect the basic items of information in musical scores: sound lengths, musical intervals, keys, times, and tempos.

Generally, since acoustic signals are the kind of signals which contain repetitions of fundamental waveforms in continuum, it is not possible immediately to obtain the above-mentioned items of information.

Therefore, the present applicants have already proposed an automatic music transcription system as disclosed, for example, in Unexamined Patent Application No. 62-178409.

This automatic music transcription system is shown in FIG. 1. The system is provided with autocorrelation analyzing means 14 for converting hummed vocal sound signals 11 into digital signals by means of analog/digital (A/D) converter 12. The digitized sound is called vocal sound data 13. Pitch information and sound power information 15 is then extracted from the vocal sound data 13. Segmenting means 16 divides the input song or hummed sounds into a plural number of segments on the basis of the sound power information. Musical interval identifying means 17 identifies the musical interval on the basis of the afore-mentioned pitch data with respect to each of the segments as established by the afore-mentioned segmenting means. Key determining means 18 determines the key of the input song or hummed vocal sounds on the basis of the musical interval as identified by the afore-mentioned musical interval identifying means. Tempo and time determining means determines the tempo and time of the input song or hummed vocal sounds on the basis of the segments established by division by the afore-mentioned segmenting means. Musical score data compiling means 110 prepares musical score data on the basis of the output of the afore-mentioned segmenting means, musical interval identifying means, key determining means, and tempo and time determining means. Musical score data outputting means 111 generates musical score data 112 prepared by the afore-mentioned musical score compiling means 110.

It is to be noted in this regard that such acoustic signals as those of vocal sounds in songs, hummed voices, and musical instrument sounds consist of repetitions of fundamental waveforms. In an automatic music transcription system for transforming such acoustic signals into musical score data, it is necessary first to extract for each analytical cycle the repetitive frequency of the fundamental waveform in the acoustic signal. This frequency is hereinafter referred to as "the pitch frequency". The corresponding cycle is called "the pitch cycle." This "pitch" information is taken into account, in order accurately to determine various kinds of information on such items as musical interval and sound length in acoustic signals.

Two extracting methods, frequency analysis and autocorrelation analysis, have been developed in the fields of vocal sound synthesis and vocal sound recognition. Autocorrelation analysis has hitherto been employed because it extracts pitch without being affected by noises in the environment and because it permits easy processing.

In the automatic music transcription system mentioned above, the system calculates the autocorrelation function after it converts acoustic signals into digital signals. Therefore, an autocorrelation function can be calculated for each analytical cycle.

Pitch extraction accuracy is similarly dependent upon the sampling cycle. If the resolution of a pitch so extracted is low, then the musical interval and sound length determined by the processes described later will have a low degree of accuracy.

It is conceivable to use a higher frequency for sampling, but such an approach is liable to result in the inability of the system to perform real-time processing, as well as a larger-sized, more expensive, automatic music transcription system apparatus. The disadvantages are a consequence of the increase in the amount of data processed in arithmetic operations such as the autocorrelation function.

Acoustic signals have the characteristic feature that their power is augmented immediately after a change in sound. This feature of sound is utilized in the segmentation of on the basis of power information.

Unfortunately, acoustic signals, particularly those appearing in songs sung by a man, do not necessarily take any specific pattern in the change of their power information. Songs have fluctuations in relation to the pattern of change. In addition, the sound to be transcribed also often contains abrupt sounds, such as outside noises. In these circumstances, a simple segmentation of sound with attention paid to the change in the power information has not necessarily led to any good division of individual sounds.

In this regard, it is noted that acoustic signals generated by a man are not stable in sound length, either. That is, such signals have much fluctuations in pitch. This has caused an obstacle to the performance of good segmentation based on pitch information.

Thus, in view of the fluctuations existing in pitch information, conventional systems often treat two or more sounds as a single segment in some cases.

With existing transcription equipment, even sounds generated by musical instruments do not readily lend themselves to segmentation based on pitch information. This shortcoming is due to ambient noises intruding into the pitch information after capture by the acoustic signal input apparatus for converting acoustic signals into electrical signals.

When musical intervals, times, tempos, etc. are determined on the basis of sound segments (sound length), the process of segmentation becomes a very important factor in the preparation of musical score data. A low accuracy of segmentation reduces the accuracy of the ultimately developed musical score data. A high initial accuracy of segmentation is therefore desired when final segmentation utilizes the results of the power information. A high initial accuracy is also desired when final segmentation utilizes the results of both pitch information segmentation and the results of power information segmentation.

Acoustic signals, particularly those acoustic signals uttered by a man, are not stable in their musical interval. These signals have considerable fluctuations in pitch even when the same pitch (one tone) is intended. Accordingly, it is very difficult to identify musical intervals in such signals.

When a transition occurs from one sound to another, it often happens that a smooth transition is not made to the pitch of the following sound. Pitch fluctuations occur before and after the transition. Consequently, the segments on either side are often mistaken for another sound segment. The result is that sound segments with pitch transitions are often identified as belonging to a different pitch level in the identification of a musical interval.

In order to explain this in specific terms, methods permitting simplicity in arithmetic operation are considered for the automatic music transcription system mentioned above. For example a given sound can be identified with a pitch closest on the absolute axis to the average value of the pitch information within the segment. The sound can also be identified with the pitch closest on the absolute axis to the medium value of the pitch information of the segment.

With a method like this, it is possible to identify the musical interval well when the interval difference between two adjacent sounds is a whole tone, for example do and re on the C-major scale. But, if the difference between two adjacent sounds is a semitone, for example of mi and fa on the C-major scale, there may sometimes be an inaccuracy in the identification of the musical interval. For example, the sounds intended to be mi on the C-major scale can be identified as fa.

In addition to sound length, the musical interval is a fundamental element. It is therefore necessary to identify the interval accurately. If it cannot be identified accurately, the accuracy of the resulting musical score data will be low.

The key, on the other hand, is not merely an element of musical score data. The key gives an important clue to the determination of a musical interval. A key has a certain relationship to a musical interval and to the frequency of occurrence of a musical interval. In improving the accuracy of the musical interval, it is desirable to determine the key and to review the identified musical interval.

Furthermore, as mentioned above, the musical intervals of acoustic signals, particularly those of vocal music, deviate from the absolute musical interval. The greater the deviation, the more inaccurate the musical interval identified on the musical interval axis. The deviation of the musical intervals in vocal music heretofore has resulted in lower accuracy in music transcription.

In summary, the automatic music transcription system and apparatus disclosed in the present applicants' published patent application No. 62-178409 may generate musical score data with low accuracy. It has so therefore not found widespread practical use.

SUMMARY OF THE INVENTION

The present invention has been made in consideration of the problems mentioned hereinabove. Therefore, a primary object of the invention is to provide a practically usable automatic music transcription system and apparatus which improves the accuracy of the final musical score data.

Another object of the present invention is to provide an automatic music transcription method and apparatus which further improves the accuracy of the final musical score data by segmentation based on power information segmentation and pitch information segmentation. This accuracy is to be achieved without being influenced by fluctuations in acoustic signals or abrupt intrusions of outside sounds.

The present invention is a method of identifying musical intervals which both identifies musical scales with accuracy and also provides for an automatic music transcription system for further improving the accuracy of the final musical score data.

Still another object of the present invention is to provide an automatic music transcription method and apparatus which further improves the accuracy of the final musical score data by obtaining more accurate information on the musical interval. The more accurate musical interval is achieved through correction of the pitch of segments (identified with musical intervals whose pitch differs from those pitches intended by the singer due to pitch fluctuations occurring at the time of transition from one sound to the next). The pitch of the segment is corrected with reference to musical interval information on the preceding segment and on the following segment.

Still another object of the present invention is to provide an automatic music transcription method and apparatus capable of accurately determining the key of acoustic signals.

Still another object of the present invention is to provide an automatic music transcription method and apparatus capable of detecting the amount of deviation of the musical interval axis of an acoustic signal in relation to the axis of the absolute musical interval, correcting the pitch information in proportion to the detected deviation, and making it possible to compile musical score data more accurately in the subsequent process.

Still another object of the present invention is to provide a pitch extracting method and pitch extracting apparatus capable of extracting the pitch of an acoustic signal with high accuracy without employing a higher sampling frequency.

In order to attain these and other objects, the automatic music transcription system according to the present invention involves extracting pitch information and power information from the input acoustic signal, correcting pitch information in proportion to the deviation of the musical interval axis from the absolute musical interval axis, dividing the acoustic signal into single sound segments on the basis of the corrected pitch information and on the basis of changes in the power information, making more detailed divisions of the acoustic signal on the basis of the segment information, identifying musical intervals amid the individual segments referencing the pitch information, and dividing the acoustic signal again into single-sound segments on the basis of whether or not the identified musical intervals of the segments in continuum are identical, determining the key of the acoustic signal on the basis of the extracted pitch information, correcting the prescribed musical interval on the musical scale for the determined key on the basis of the pitch information, determining the time and tempo of the acoustic signal on the basis of the segment information, and finally compiling musical score data from the information on the determined musical interval, sound length, key, time, and tempo.

Similarly, the automatic music transcription system according to the present invention comprises a means for extracting from the input acoustic signal the pitch information and the power information thereof, a means for correcting the pitch information in accordance with the amount of deviation of the musical interval for the acoustic signal in relation to the axis of the absolute musical interval, a means for dividing the acoustic signal into single-sound segments on the basis of the corrected pitch information, a means for dividing the acoustic signal into single-sound segments on the basis of the changes in the power information, a means for making further divisions of the acoustic signal into segments on the basis of both of these sets of segment information thus made available, a means for identifying the musical intervals for the acoustic signals in the individual segments along the axis of the absolute musical interval, a means for dividing the acoustic signal again into single-sound segments on the basis of whether or not the musical intervals of the identified segments in continuum are identical, a means for determining the key for the acoustic signal on the basis of the extracted pitch information, a means for correcting the prescribed musical interval on the determined key on the basis of the pitch information, a means for determining the time and tempo of the acoustic signal on the basis of the segment information, and a means for compiling musical score data from the information on the musical interval, sound length, key, time and tempo so determined.

The automatic music transcription system according to the present invention is further characterized by a means for inputting acoustic signals, a means for amplifying the acoustic signals thus input, a means for converting the amplified analog signals into digital signals, a means for extracting the pitch information by performing autocorrelation analysis of the digital acoustic signals and extracting the power information by performing the operations for finding the square sum, (the means for extracting the pitch information and the power information being constructed in hardware) a storage means for keeping in memory the prescribed music-transcribing procedure, a controlling means for executing the music-transcribing procedure kept in memory in the storage means, a means for starting the processing by the control means, and a means for generating the output of the musical score data obtained by the processing.

The present invention has made it possible to provide an automatic music transcription system with sufficient capabilities for its practical application owing to the extremely significant improvement in its accuracy in generating the final musical score data. This is so because the system accurately extracts pitch information and power information from acoustic signals such as vocal songs, humming voices, and musical instrument sounds, divides the acoustic signals accurately into single-sound segments on the basis of such information, and identifies the musical interval and the key with high accuracy. These performance features therefore have proven effective in reducing the influence of noise and power fluctuations in the processing of acoustic signals.

BRIEF DESCRIPTION OF THE DRAWINGS

FIG. 39 is a table presenting some examples of the weighing coefficients for each musical scale established in accordance with each key.

DESCRIPTION OF THE PREFERRED EMBODIMENTS

Detailed descriptions of the various embodiments of the present invention with reference to the accompanying drawings are given below.

Figure 1:
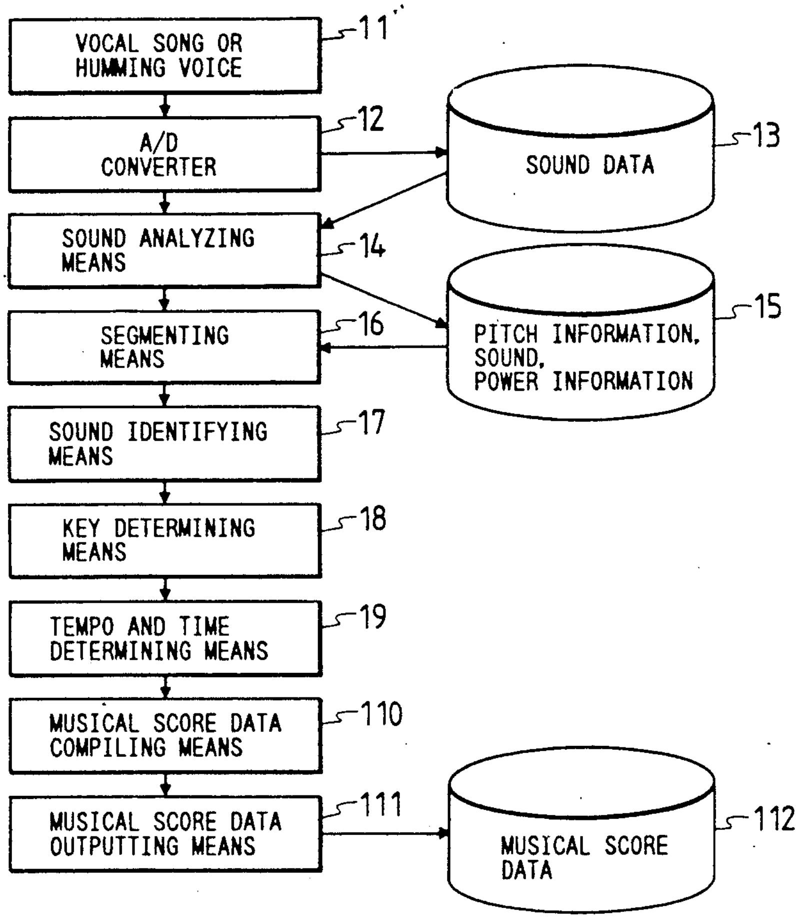
FIG. 1 is a block diagram illustrating the automatic music transcription system leading to the present invention.
Figure 2:
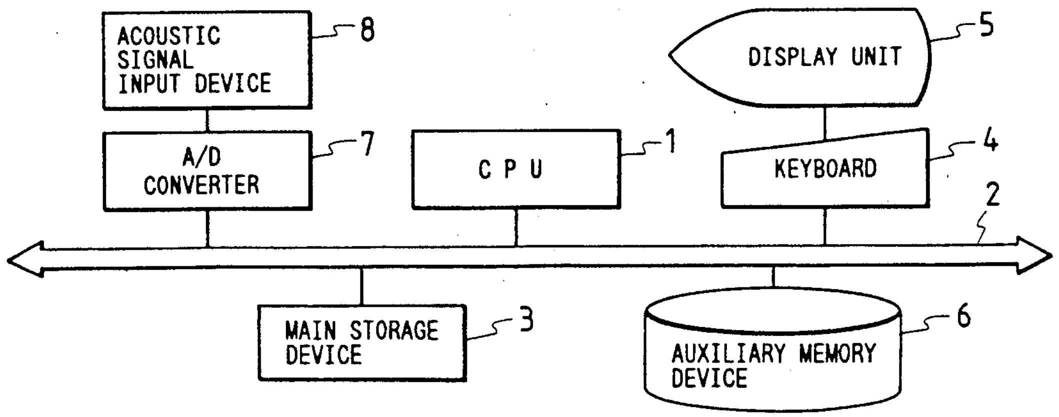
FIG. 2 is a block diagram illustrating the first hardware embodiment of the automatic music transcription system according to the present invention.
Figure 3:
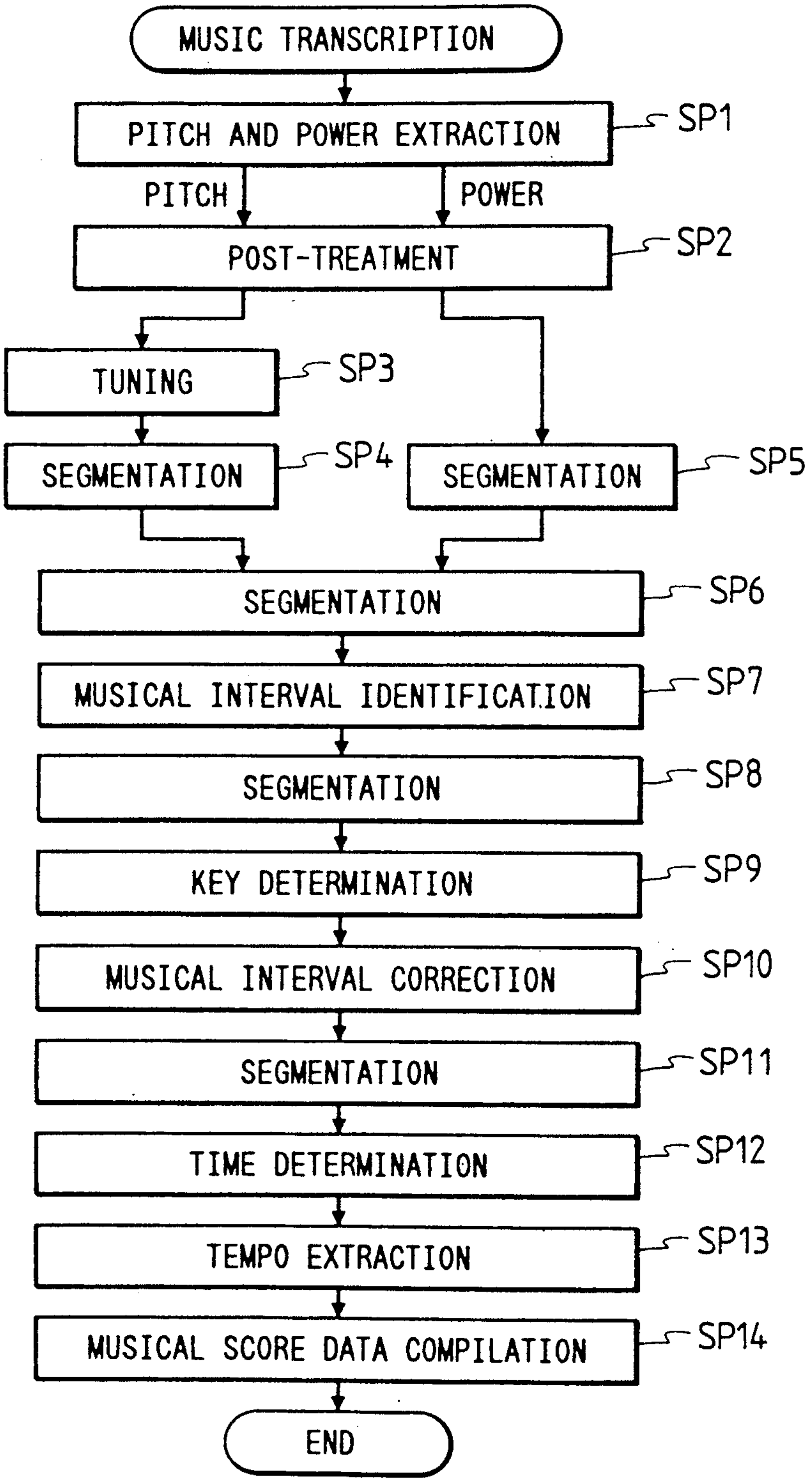
FIG. 3 is a flow chart showing the automatic music transcription process in the first embodiment of the present invention.

FIG. 2 is a block diagram illustrating the construction of the automatic music transcription system to which the first embodiment according to the present invention is applied. FIG. 3 is a flow chart illustrating the processing procedure for the system.

In FIG. 2, the Central Processing Unit (CPU) 1 performs overall control for the entire system and executes the music score processing program shown in FIG. 3. This program is stored in the main storage device 3 which is connected to the CPU through the bus 2, to which input device keyboard 4, output device display unit 5, auxiliary memory device 6 for use as working memory, and analog/digital converter 7 are connected. CPU 1 and main storage device 3 are also connected to bus 2.

To analog/digital converter 7 is connected acoustic signal input device 8, which is composed of a microphone. This acoustic signal input device 8 captures the acoustic signals in vocal songs and transforms them into electrical signals. The electrical signals are supplied to analog/digital converter 7.

CPU 1 begins the music transcription process when it receives a command to that effect as entered on the keyboard input device 4. CPU 1 then executes the program stored in the main storage device 3, temporarily storing the acoustic signals as converted into digital signals by the analog/digital converter 7 into the auxiliary memory device 6. CPU 1 thereafter converts these acoustic signals into musical score data by executing the above-mentioned program so that the musical score data may be output as required.

After CPU 1 has input the acoustic signals, processing for musical score transcription occurs. This processing is described in detail with reference to the flow chart shown in terms of functional levels in FIG. 3.

First, CPU 1 extracts pitch information for the acoustic signals for each analytical cycle through its autocorrelation analysis of the acoustic signals. CPU 1 also extracts power information for each analytical cycle by first processing the acoustic signals to find the square sum, and then performing post-treatments. Post-treatments may include the elimination of noises and an interpolation operation (Steps SP 1 and SP 2). Thereafter, CPU 1 calculates, with respect to the pitch information, the amount of deviation of the musical interval axis of the acoustic signal in relation to the axis of the absolute musical interval. This deviation is calculated on the basis of the distribution around the musical interval axis. CPU 1 then performs the tuning process (Step SP 3), which involves shifting the pitch information in proportion to the amount of deviation of the musical interval axis. In other words, the CPU corrects the pitch information to reduce the difference between the musical interval axis of the (singer or musical instrument) and the axis of the absolute musical interval.

Then, CPU 1 executes the segmentation process. This process divides the acoustic signals into single-sound segments, each of which have continuous durations of pitch information. CPU 1 treats the resulting segments as indicating one musical interval. The CPU then executes the segmentation process again on the basis of the changes in the obtained power information (Steps SP 4 and SP 5). Each resulting set of segment information has continuous pitch. CPU 1 then calculates the standard lengths corresponding respectively to the time lengths of a half note, an eighth note, and so forth and execute the segmentation process in further detail on the basis of these standard lengths (Step SP 6).

CPU 1 thus identifies the musical interval of a given segment with the musical interval on the absolute musical interval axis to which the relevant pitch information is considered to be closest. This determination is made on the basis of the pitch information of the segment obtained by segmentation. CPU 1 then further executes the segmentation process again on the basis of whether or not the musical interval of the identified segments in continuum are identical (Steps SP 7 and SP 8).

After that, CPU 1 finds the product sum of the frequency of occurrence of the musical interval. The product sum is obtained by weighing the classified total of the pitch information around the musical interval axis after tuning with prescribed weighing coefficients. The weighing coefficients are determined in correspondence with the key. On the basis of this product sum, CPU 1 determines the key. An example of a determined key may be the C-major key or the A-minor key. CPU 1 thereafter ascertains and corrects the musical interval by reviewing the musical interval in greater detail with respect to the pitch information (Steps SP 9 and SP 10). Next, CPU 1 executes a review of the segmentation results on the basis of whether or not the determined musical interval contains identical segments in continuum or whether or not there is a change in power. CPU 1 then finally performs the final segmentation process (Step SP 11).

When the musical interval and the segments are determined in this manner, CPU 1 extracts the measures. Breaking up the musical interval into measures is based on the assumption that a measure begins with the first beat, that the last tone in a phrase does not extend to the next measure, and that there is a division for each measure. CPU 1 first determines the time on the basis of the measure information and the segmentation information. CPU 1 next determines the tempo on the basis of this determined time information on the basis of and the length of a measure (Steps SP 12 and SP 13).

Finally, CPU 1 compiles musical score data by ordering the determined musical interval, sound length, key, time, and tempo information (Step SP 14).

SEGMENTATION BASED ON POWER INFORMATION

Figure 4:
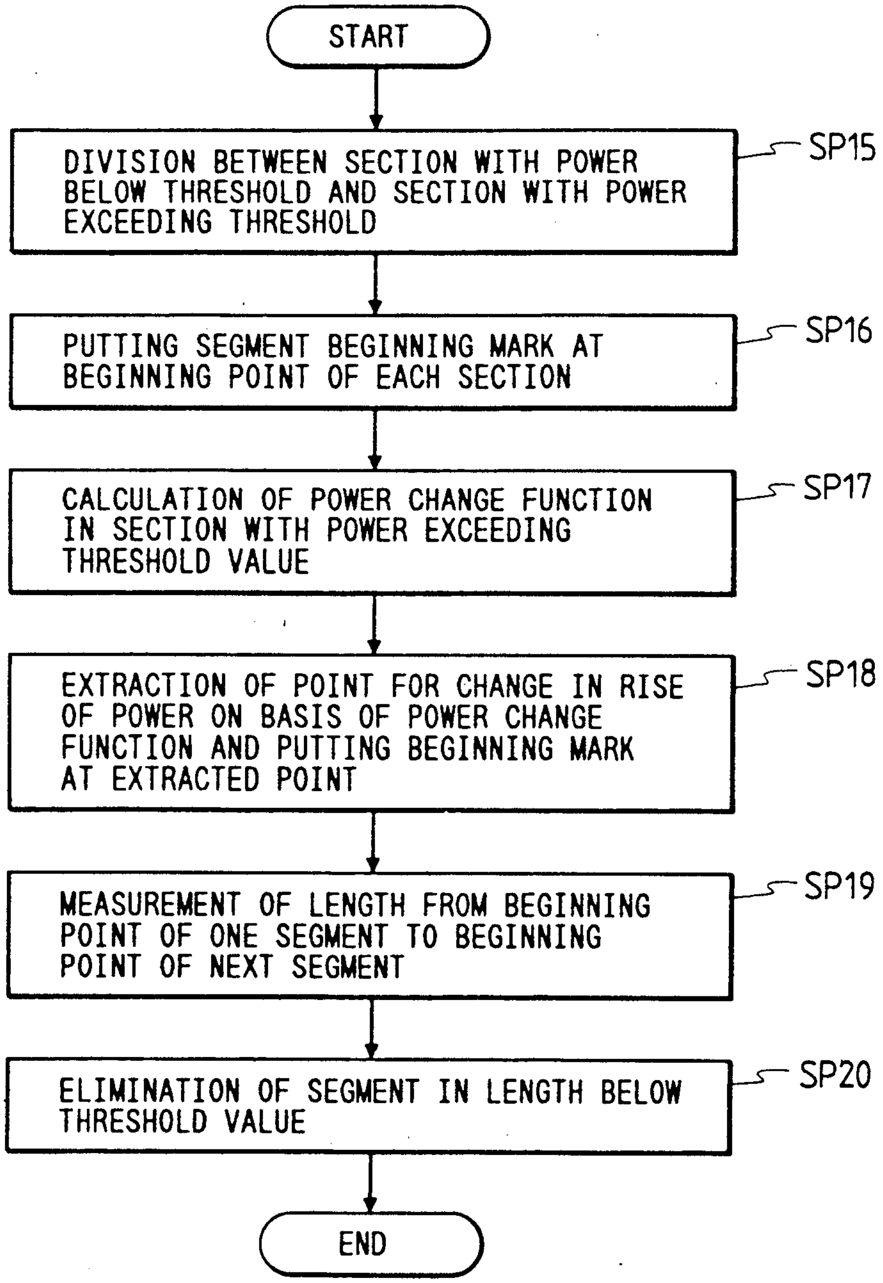
FIG. 4 is a summary flow chart illustrating the segmentation process based on the power information pertinent to the present invention.
Figure 5:
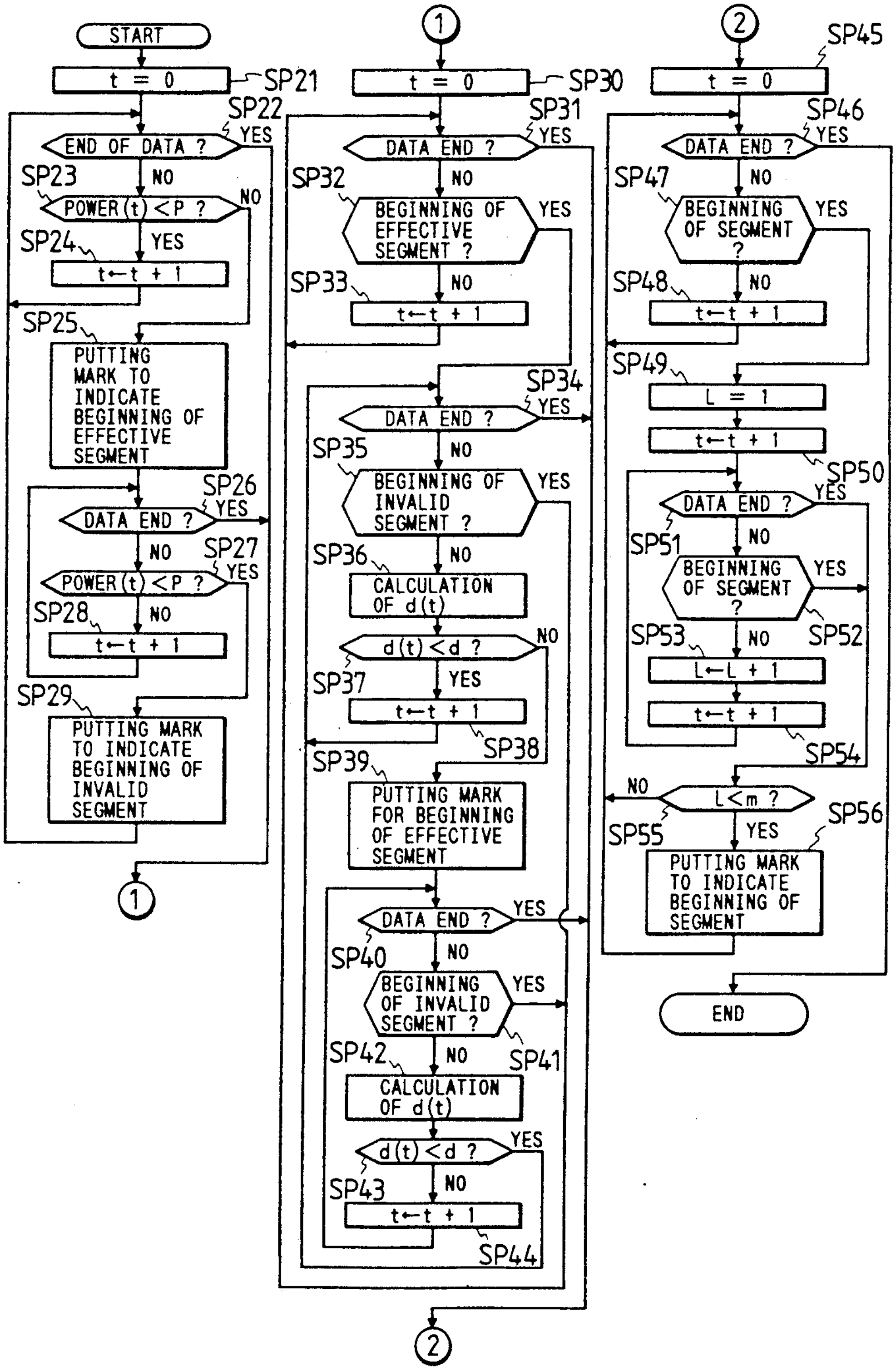
FIG. 5 is a flow chart illustrating an example of the segmentation process in greater detail.

Next, a detailed explanation is given in specific terms, with reference to the flow chart of FIG. 5, the flow chart of and FIG. 4, and the segmentation process of FIG. 3 (Step SP 5) based on the power information on those acoustic signals applicable to an automatic music transcription system like this. FIG. 4 presents a flow chart illustrating such a process at the functional level. FIG. 5 presents a flow chart illustrating greater details of what is shown in FIG. 4.

In determining the power information of the acoustic signals, the acoustic signals are squared. More specifically, it is the individual sampling points within the analytical cycle that are squared. The sum total of those squared values is used to represent the power information on that analytical cycle.

CPU 1 compares the power information at each analytical point with the threshold vale. CPU 1 then divides the acoustic signal into a section larger than the threshold value and a section smaller than the value. In dividing the acoustic signals using the threshold value, the section larger than the threshold value is treated as the segment for the effective section. The section smaller than the threshold value is treated as the segment of the invalid section. The smaller section is used to mark the initial part of the effective section. The smaller section marks the initial part of the invalid section (Steps SP 15 and SP 16). This feature has been incorporated in the system in view of the fact that a failure often occurs in the identification of a musical interval due to a lack of stability in the musical interval where the power information is small. Therefore, this feature serves to detect rest sections.

Then, CPU 1 performs arithmetic operations to find a function for the variation of the power information within the effective segment derived by the division mentioned above. CPU 1 extracts the point of change in the rising of the power information using this function of variation. The CPU then divides the effective segment into smaller parts at the point of change in the rise in the power information, placing a mark for the beginning of an effective segment at this point (Steps SP 17 and SP 18). This feature has been introduced because the above-mentioned process alone is liable to generate a segment containing two or more sounds. Because there may be a transition from a sound to the next sound while the power is maintained at a somewhat high level, such a segment may be divided further by taking advantage of the notable fact that increases in power accompany the beginning of sounds.

Thereafter, CPU 1 measures the lengths of the individual segments, regardless of whether they are effective segments or invalid ones. In measuring segment length, segments with a lengths sorter than the prescribed length are connected to the immediately preceding segment to form one segment (Steps SP 19 and SP 20). This feature has been adopted in view of the fact that signals may sometimes be divided into minute fragmentary segments as the result of the presence of noises or the like. Also, this feature is used for the object of connecting a plural number of segments resulting from the further division of segments on the basis of the point of change in the rise as mentioned above.

Next, this process is explained in greater detail with reference to the flow chart in FIG. 5.

CPU 1 first clears the parameter t for the analytical point to zero. Then, after ascertaining that the analytical point data has not yet been processed, the CPU judges whether or not the power information (Power (t)) of the acoustic signal at the analytical point is smaller than the threshold value power (Steps SP 21–SP 23).

If the power information, Power (t), is smaller than the threshold value p, CPU 1 increments the parameter t for the analytical point. The CPU again returns to Step SP 22 and passes judgment on the power information at the next analytical point (Step SP 24). If it finds at Step 23 that the value of the power information, Power (t), is above the threshold value p, CPU 1 then moves on to the processing of the subsequent steps beginning with the next Step SP 26 (Step SP 25).

At this time, CPU 1 ascertains that the processing has not yet been completed on all the analytical points. CPU 1 again judges whether or not the value of the power information is smaller than the threshold value p, returns to Step SP 26, and increments the parameter t for the analytical point if the value of the power information (Power (t)) is above the threshold power value (Steps SP 26–SP 28). On the other hand, if the value of the power information is smaller than the threshold value p, CPU 1 places a mark for the beginning point of an invalid segment at the analytical point before returning to Step SP 22 mentioned above (Step SP 29).

CPU 1 performs the above-mentioned process until it detects the completion of the process at all of the analytical points (Steps, SP 22 or SP 24). After it has established the division of the segments between effective segments above the threshold value p and invalid segments below the threshold value p (through its comparison of the power information Power (t) and the threshold value p at all the analytical points), CPU 1 then shifts to its processing of the subsequent steps beginning with the Step 30.

In the process subsequent to this, CPU 1 clears the parameter t for the analytical point to zero and begins the subsequent process as from the initial analytical point (Step SP 30). CPU 1 judges whether the analytical point is one marked as the beginning of an effective segment (Steps SP 31 and SP 32) after it ascertains that the analytical point data requiring its processing has not yet been completed. In case the analytical point is not one in which an effective segment begins, CPU 1 increments the parameter t for the analytical point and then returns to the Step SP 29 mentioned above (Step SP 33).

On the other hand, in case CPU 1 has detected any analytical point where an effective segment begins, it ascertains again that there is no analytical point remaining to be processed and further judges whether the analytical point is one in which an invalid segment begins (Steps SP 34 and SP 35). In case the analytical point is not one in which an invalid segment begins, which means that it is an analytical point within an effective segment, CPU 1 finds the function for the variation d(t) of the power information, Power (t), (which is to be called a rise extraction function in the following part since it is to be used for the extraction of a rise in the power information in the subsequent process) by performing arithmetic operations according to the equation (1) (Step SP 36).

$$d(t)=\{\text{power}(t+k)-\text{power}(t)\}/\{\text{power}(t+k)+\text{power}(t)\} \quad (1)$$

Where k represents a nature number appropriate for capturing the fluctuations in power.

Thereafter, CPU 1 judges whether or not the value of the rise extraction functin d(t) so obtained is smaller than the threshold value d. If it is smaller, CPU 1 increments parameter t for the analytical point and returns to the Step SP 34 (Steps SP 37 and SP 38). On the other hand, if the rise extraction function d(t) is found to exceed the threshold value d, CPU 1 places the mark for the beginning of a new effective segment to the analytical point (Step SP 39). The effective segment has, therefore, been divided into smaller parts.

Thereafter, CPU 1 ascertains that the processing has not yet been completed on all the analytical points. It then judges whether or not a mark for the beginning of an invalid segment is placed on the analytical point where the processing is being performed. If such a mark is placed there, the CPU returns to the above-mentioned step, SP 31, and performs the detecting process for the beginning point of the next effective segment (Steps SP 40 and SP 41).

On the other and, if the point is not an analytical point for the beginning of an invalid segment, CPU 1 obtains the rise extraction function d(t) by the equation (1) on the basis of the power information, Power (t) and judges whether or not the rise extraction function d(t) is smaller than the threshold value d (Steps SP 42 and SP 43). If the function is any smaller, CPU 1 returns to the above-mentioned step, SP 34, and proceeds to the processing of extraction of a point of change in the rise of the power information. In the meantime, if the rise extraction function d(t) at the analytical point is continuously above the threshold value at the step SP 43, CPU 1 returns to the step SP 40 to increment the parameter t for the analytical point and to judge whether or not the rise extraction function d(t) in respect of the next analytical point has become smaller than the threshold value d.

When CPU 1 has detected (by repeating the above-mentioned process at Steps SP 31, SP 34 or SP 40) that the process has been completed on all the analytical points, CPU 1 proceeds to the process for reviewing the segments on the basis of the segment length at the step SP 45 and the subsequent steps.

In this process, CPU 1 clears the parameter t for the analytical point to zero and thereafter ascertains that the analytical point data has not yet been completed. CPU 1 then judges whether or not any mark for the beginning of a segment is placed on the particular analytical point, regardless of its being an effective segment or an invalid segment (Steps SP 45–47). If the point is not a beginning point of a segment, CPU 1 returns to the step SP 46 in order to increment the parameter t for the analytical point and to move on to the data at the next analytical point (Step SP 48). If CPU 1 has detected a beginning point for a segment, CPU 1 sets the segment length parameter L at the initial value "1" in order calculate the length of the segment starting from this beginning point (Step SP 49).

Thereafter, CPU 1 increments the analytical point parameter t and, ascertaining that the analytical point data has not yet been completed, further judges whether or not any mark for the beginning of a segment (regardless of an effective one or an invalid one) is placed on the particular analytical point (Steps SP 50–SP 52). If CPU 1 finds that the analytical point is not a point where a segment begins, CPU 1 increments the segment length parameter L and also increments the analytical point parameter t, thereafter returning to the above-mentioned step, SP 51 (Steps SP 53 and PS 54).

By repeating the process consisting of the steps SP 51 to SP 54, CPU 1 will soon come to analytical point where a mark for the beginning of a segment is placed, obtaining an affirmative result at the step SP 52. The segment length parameter found corresponds to the distance between the marked analytical point for processing and the immediately preceding marked analytical point for processing, i.e. to the length of the segment. If an affirmative result is obtained at the step SP 52, CPU 1 judges whether or not the parameter L (i.e. the segment length) is shorter than the threshold value m. When it is above the threshold value m, CPU 1 returns to the above-mentioned step, SP 46 without eliminating the mark for the beginning of a segment. When it is smaller than the threshold value m, CPU 1 removes the mark placed at the front side to indicate the beginning of a segment, thereby connecting this segment to the preceding segment, and then returns to the above-mentioned step SP 46 (Steps SP 55 and SP 56).

Moreover, in case that CPU 1 has returned to the step SP 46 from the step SP 55 or SP 56, CPU 1 will immediately obtain an affirmative result at the step SP 47 unless the analytical point data has been completed. CPU 1 will proceed to the processing at the subsequent steps beginning with the step SP 49 and will move on to the operation for searching for another mark next to the mark just found. When the CPU finds the next mark in the manner described above, the CPU carries out the review of segment length.

By repeating a processing operation like this, CPU 1 will complete the review of all the segment lengths, and when it obtains an affirmative result at the step SP 46, CPU 1 will complete the processing program.

Figure 6:
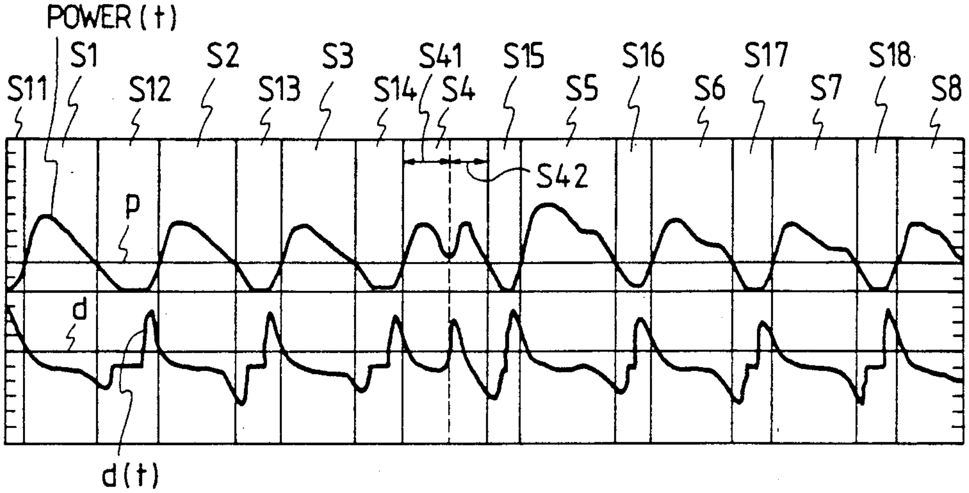
FIG. 6 is a characteristic curve chart illustrating one example of segmentation by such a process.

FIG. 6 presents one example of segmentation by a process in the manner just described. In the case of this example, the repetition of the processes in the steps up to SP 29 will establish the distinction between the effective segments, S1–S8, and the invalid segments, S11–S18, on the basis of the power information, Power (t). Thereafter, by the repetition of the processes up to the step SP 44, the effective segment S4 will be further divided into smaller segments, S41 and S42, at the point of change in the rise of power on the basis of the rise extraction function d(t). Furthermore, the processing at the step SP 45 and the subsequent steps will thereafter be performed, and then a review will be made on the basis of the segment length. In this example, however, no connection of segments in particular will take place since there is no segment shorter than the prescribed length.

Therefore, with the embodiments described above, the system will be capable of performing a highly accurate segmentation process not liable to any faulty segmentation due to noises or power fluctuations for the reason that the power information divides the acoustic signals between the effective segments above the threshold value and the invalid segments below the value, and that the effective segments are further divided into smaller segments by the point of change in the rise of the power information, and that the segments so established are reviewed on the basis of the segment length.

In other words, this process can also eliminate the use of the unstable period with little vocal power in the subsequent processes such as the identification of the musical interval because the sections containing power information in excess of the threshold value are taken as effective segments. Moreover, as the system has been designed to divide a segment into smaller parts by extracting a point of change in the rise of power, it is possible to have the system perform segmentation well even in case where there occurs a transition to the next sound while the power is maintained above the prescribed level. Moreover, as the system is designed to conduct a review on the basis of the segment length, it is possible to avoid dividing one sound or a rest period into a plural number of segments.

Figure 7:
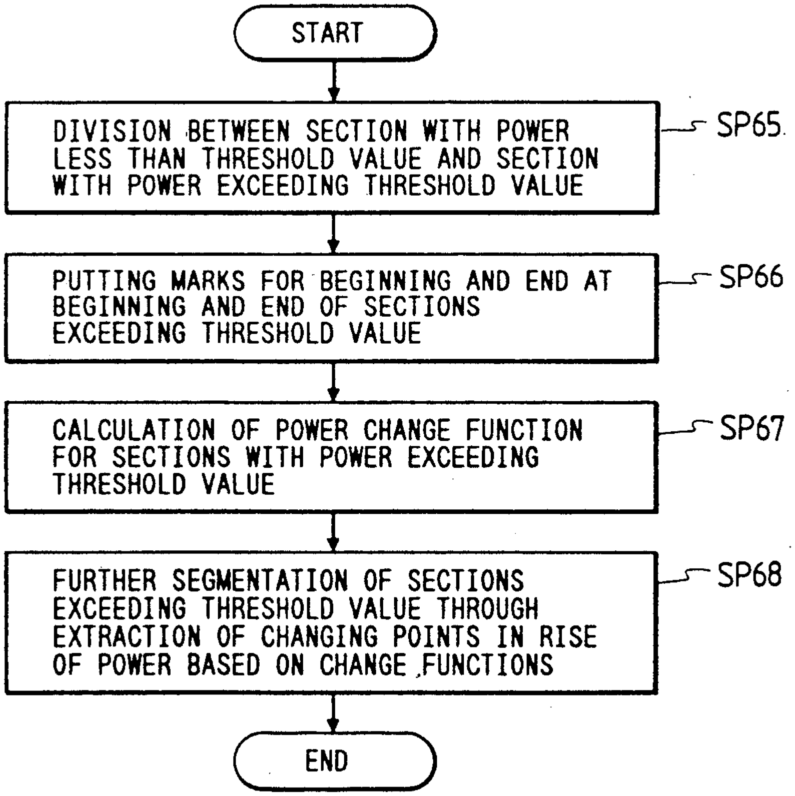
FIG. 7 is a summary flow chart illustrating another example of the segmentation process based on the power information according to the present invention.

In the example given above, the length of the effective sections mentioned above (including the further divided effective sections mentioned above, and that of the invalid sections mentioned above) have been extracted. This is not necessarily required. In such a case, a beginning mark and an ending mark are to be placed respectively in the beginning and end of each section above the threshold value at the step SP 66 as shown in the block diagram representing the processing procedure given in FIG. 7. In specific terms, it is seen with reference to the flow chart in FIG. 8, which represents greater details of what is shown in FIG. 7. CPU 1 returns to the above-mentioned step, SP 22, after putting a mark of a segment ending point at the analytical point concerned if the value of the power information, Power (t), becomes smaller than the threshold value power (Step SP 29′). With this embodiment, the system will finish the program when it detects the completion of the processing in respect of all the analytical points at the steps, SP 31, SP 34, or SP 40, by repeating the processes mentioned above. The segments processed at this time are the same as those shown in FIG. 6.

Figure 8:
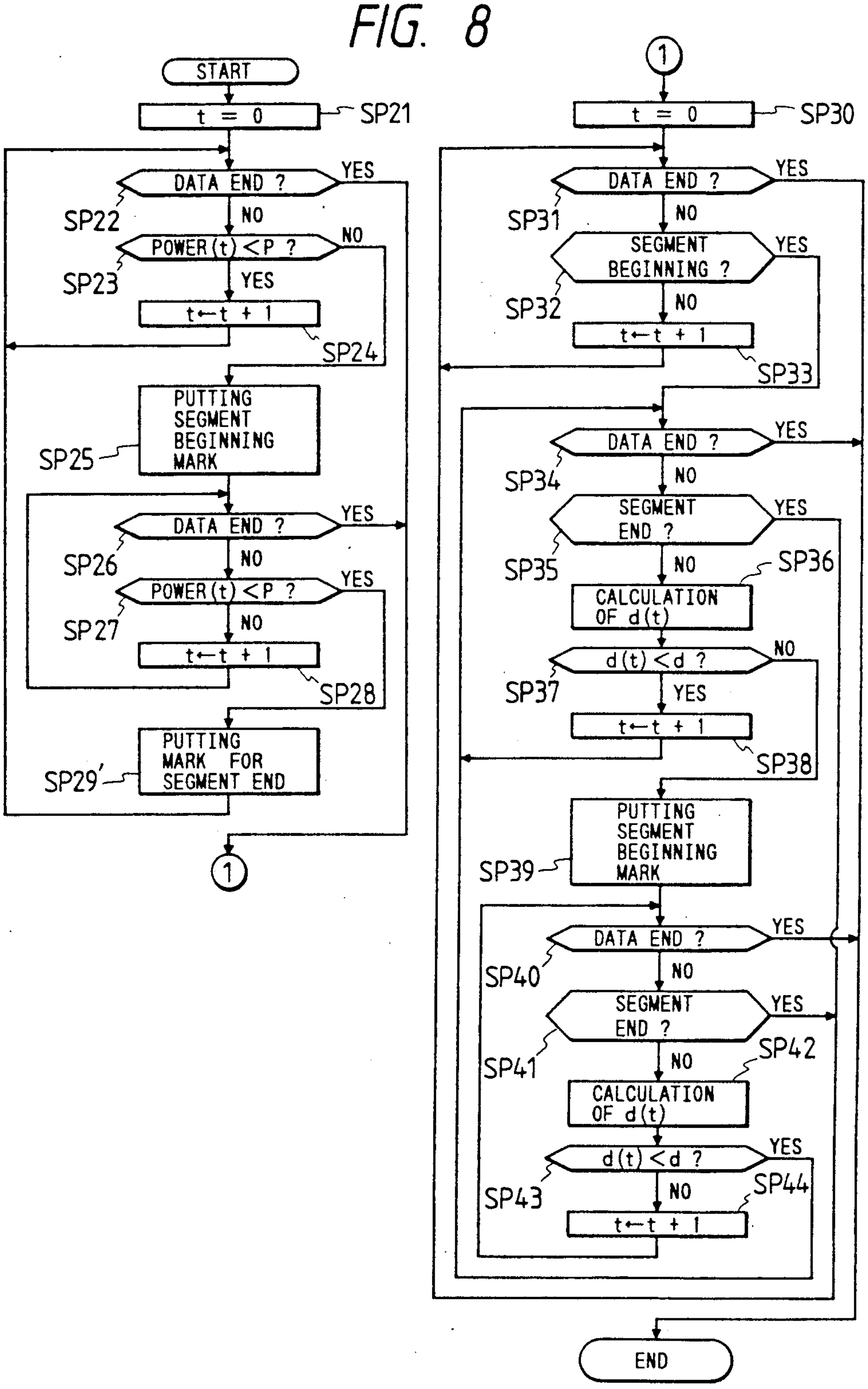
FIG. 8 is a flow chart illustrating the segmentation process in greater detail.
Figure 9:
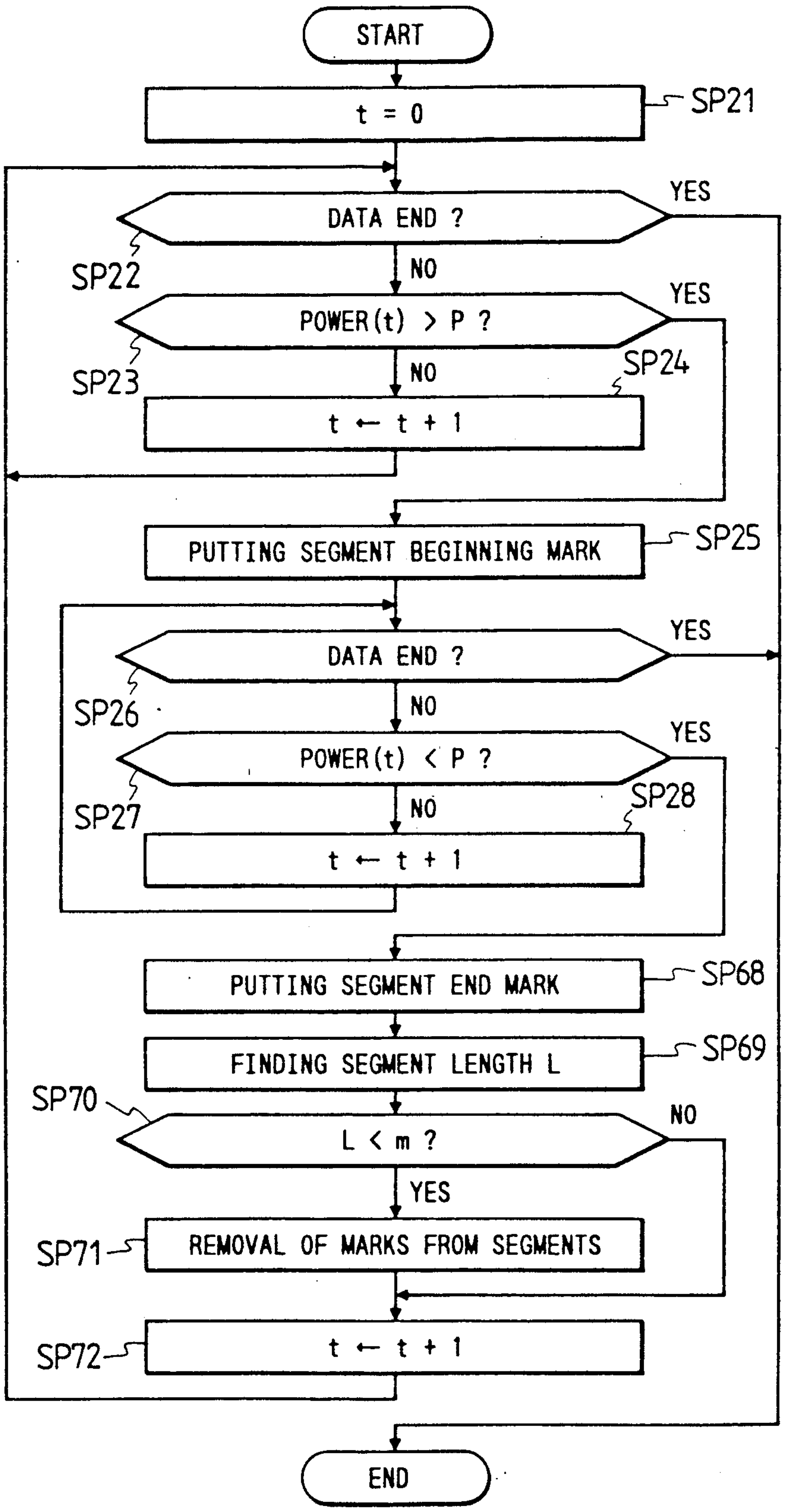
FIG. 9 is a flow chart illustrating an example of the segmentation process based on the power information according to the present invention.

Furthermore, it is also possible to perform the segmentation process by the procedure illustrated in the flow chart in FIG. 9. In this case, the procedure from the beginning to the step SP 28 is identical to the same steps shown in FIG. 8. CPU 1 will soon detect an analytical point having the power information, Power (t), smaller than the threshold value p by repeating the processing at the steps, SP 26 to SP 28, in the same way as what is shown in FIG. 8, and will obtain an affirmative result at the step SP 27. At this time, CPU 1 places a mark for the ending of the segment at this analytical point and thereafter detects the length L of the segment on the basis of the beginning mark information for the above-mentioned segment and the ending mark information for the segment. CPU 1 then judges whether or not the length L is smaller than the threshold value m (Steps SP 68–SP70). This judging step is designed not to regard too short a segment as an effective segment. The threshold value m has been decided in relationship to musical notes. If it obtains an affirmative result at this step SP 70, CPU 1 increments the parameter t and returns to the above-mentioned step SP 22 after it eliminates the beginning and the ending marks for the segment. On the other hand, when it obtains a negative result because the length of the segment is sufficient, it immediately increments the parameter t, without eliminating those marks, and returns to the above-mentioned step SP 21 (Steps SP 71 and SP 72).

By repeating this processing procedure, CPU 1 completes its processing with respect to all the power information and, with an affirmative result obtained at the step SP 23 or SP 26, it completes the particular program.

Figure 10:
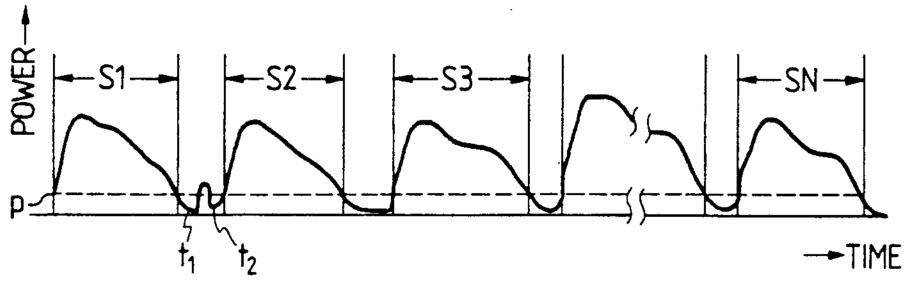
FIG. 10 is a characteristic curve chart presenting the chronological change of the power information together with the results of the segmentation.

FIG. 10 represents the chronological change of power information and an example of the results of segmentation corresponding to this chronological change. In the case of this example, the segments, S1, S2 . . . SN, are obtained by execution of the process given in FIG. 9. Moreover, in the period for the points in time, t1-t2, the power information is in excess of the threshold value p, but the period is short and its length is below the threshold value m. It is, therefore, not extracted as a segment.

Furthermore, the segmentation processing procedure as presented in the following can also be applied. This procedure is explained with reference to the flow chart shown in FIG. 11.

CPU 1 first clears the parameter t for the analytical point to zero and then, ascertaining that the data to be processed is not yet completed, performs arithmetic operations with respect to that analytical point t on the basis of the power information Power (t) for that analytical point t and the rise extraction function d(t). (Steps SP 80 and SP 81).

Here, k is to be set an appropriate time difference suitable for capturing the change in the power information.

Thereafter, CPU 1 judges whether or not the rise extraction function d(t) at the analytical point t is above the threshold value d. If it obtains a negative result because the function is smaller than the threshold value d, it increments the parameter t and returns to the above-mentioned step SP 81 (Steps SP 83 and SP 84).

By repeating this processing procedure, CPU 1 soon finds an analytical value immediately after its rise extraction function d(t) has changed to a level above the threshold value d, and obtains an affirmative result at the step SP 83. At this time, CPU 1 ascertains (after it places a segment beginning mark to that analytic point) that the data on the analytical point to be processed has not yet been completed. CPU 1 then performs arithmetic operations to find the rise extraction function d(t) of the power information again with respect to that analytical point on the basis of the power information Power (t) on that analytical point and the power information Power (t+k) for the analytical point t+k (analytical point t+k is ahead of analytical point t by k-points) (Steps SP 85 and SP 87).

Thereafter, CPU 1 judges whether or not the rise extraction function d(t) at analytical point t is smaller than the threshold value d. If it obtains a negative result because the function is above the threshold value d, it increments the parameter t and returns to the above-mentioned step SP 86 (steps SP 88–SP 89). If CPU 1 obtains an affirmative result because the function is smaller than the threshold value d, it returns to the above-mentioned step SP 81 and then proceeds to its processing operation for extracting a point of change immediately following a change of the rise extraction function d(t) to a level above the threshold value d.

By repeating a processing procedure in this manner, CPU 1 places a segment beginning mark at every point of change of the rise in the power information, and will soon complete its processing of all the power information, obtaining an affirmative result at the step SP 81 or SP 86 and thereupon finishing the particular program.

Moreover, the system is designed to execute the segmentation process through its extraction of the rise in power information in this way in view of the fact, for example, that a singer will raise the power to the highest level at the point of the onset of a new sound when he or she changes the pitch of sounds, letting the voice have a gradual decrement in power thereafter. It also reflects the consideration of the fact that musical instrument sounds have such nature than an attack occurs in the beginning of a sound with a decay occurring thereafter.

Figure 12:
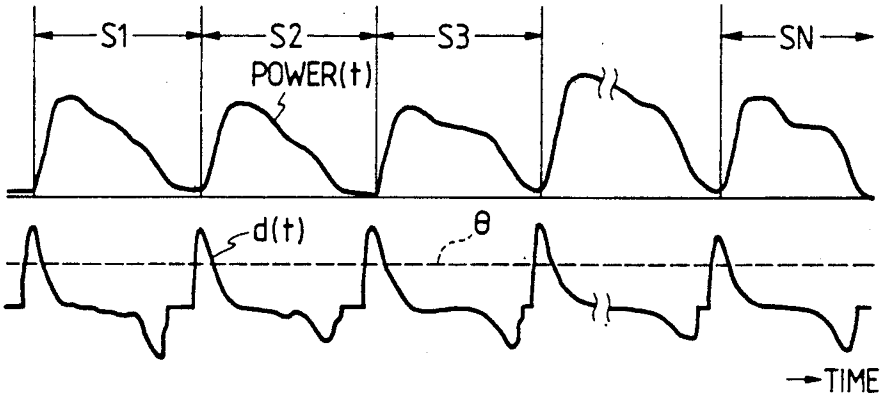
FIG. 12 is a characteristic curve chart presenting the chronological changes of the power information and those of the rise extracting functions, together with the results of the segmentation.

FIG. 12 represents one example of the chronological change of the power information Power (t) and the chronological change of the rise extraction function d(t). In this example, the execution of the processing operation shown in FIG. 11 will result in the division of the signals into the segments, S1, S2.

Figure 13:
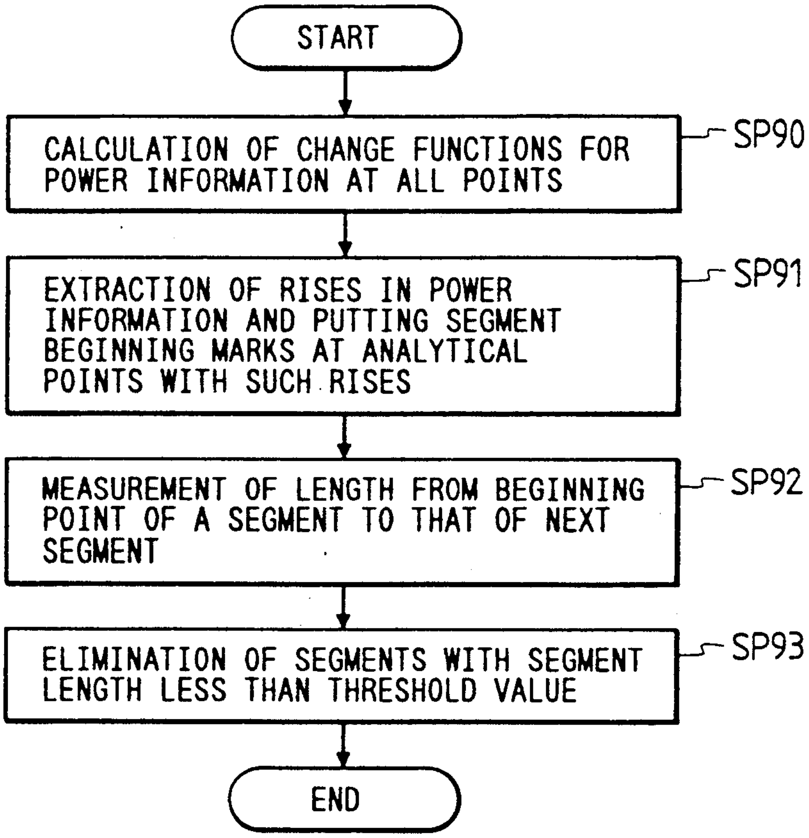
FIG. 13 and FIG. 14 are flow charts each illustrating an example of the segmentation process based on the power information according to the present invention.
Figure 14:
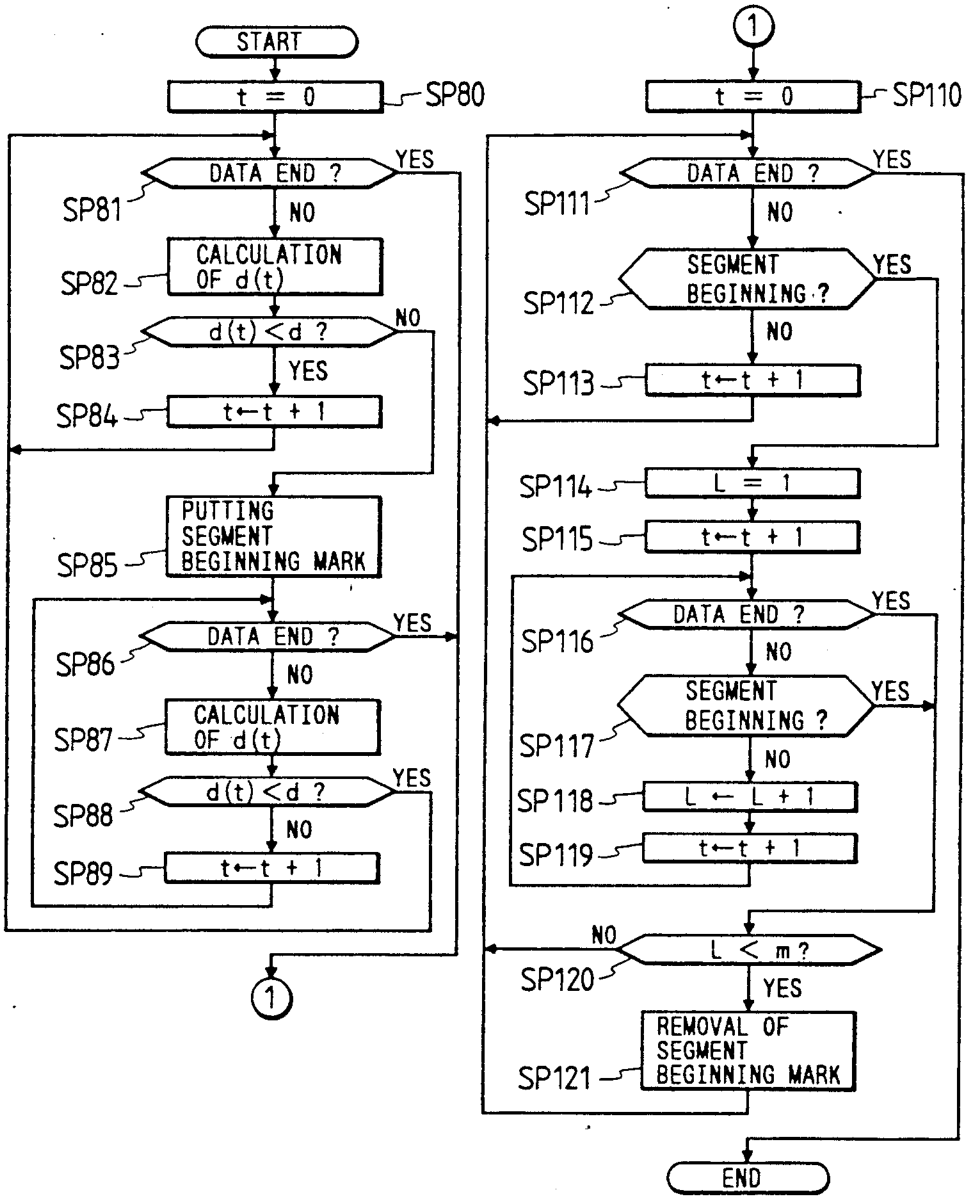

Furthermore, a segmentation review process as shown in FIG. 13 and FIG. 14 may be performed.

Another arrangement of the segmentation process on the basis of the power information may be employed, as described below.

FIG. 13 presents a flow chart illustrating this process at the functional level while FIG. 14 is a flow chart illustrating greater details of what is shown in FIG. 13. First, CPU 1 performs arithmetic operations to find the function of variation for the power information with respect to each analytical point, extracts a rise in the power information on the basis of the function, and places a segment beginning mark at the analytical point for the rise (Steps SP 90 and SP 91).

Moreover, the system performs segmentation by extracting a rise in the power information in view of the fact that acoustic signals are of such nature that they will attain the maximum power at the beginning point of a new sound, when their musical interval has been changed, with a gradual decrement of power occurring thereafter.

After that, CPU 1 measures the length from the beginning point of a segment to that of the next segment, i.e. the segment length, and eliminates segments having any insufficient segment length by connecting the section to another segment before or after it (Steps SP 92 and SP 93).

The system has been designed not to treat a segment as such if its length is too short because acoustic signals may sometimes have fluctuations in their power information and may also have intrusive noises in them and additionally because it is necessary to prevent segmentation errors from their occurrence in consequence of a plural number of peaks which may sometimes occur in the change of power in vocal sound even when the singer intends to utter a single sound.

Thus, this system is capable of executing its segmentation process based on the information on a rise in the power information and additionally taking account of the segment length.

Next, this process is explained in further detail on the basis of FIG. 14.

Figure 11:
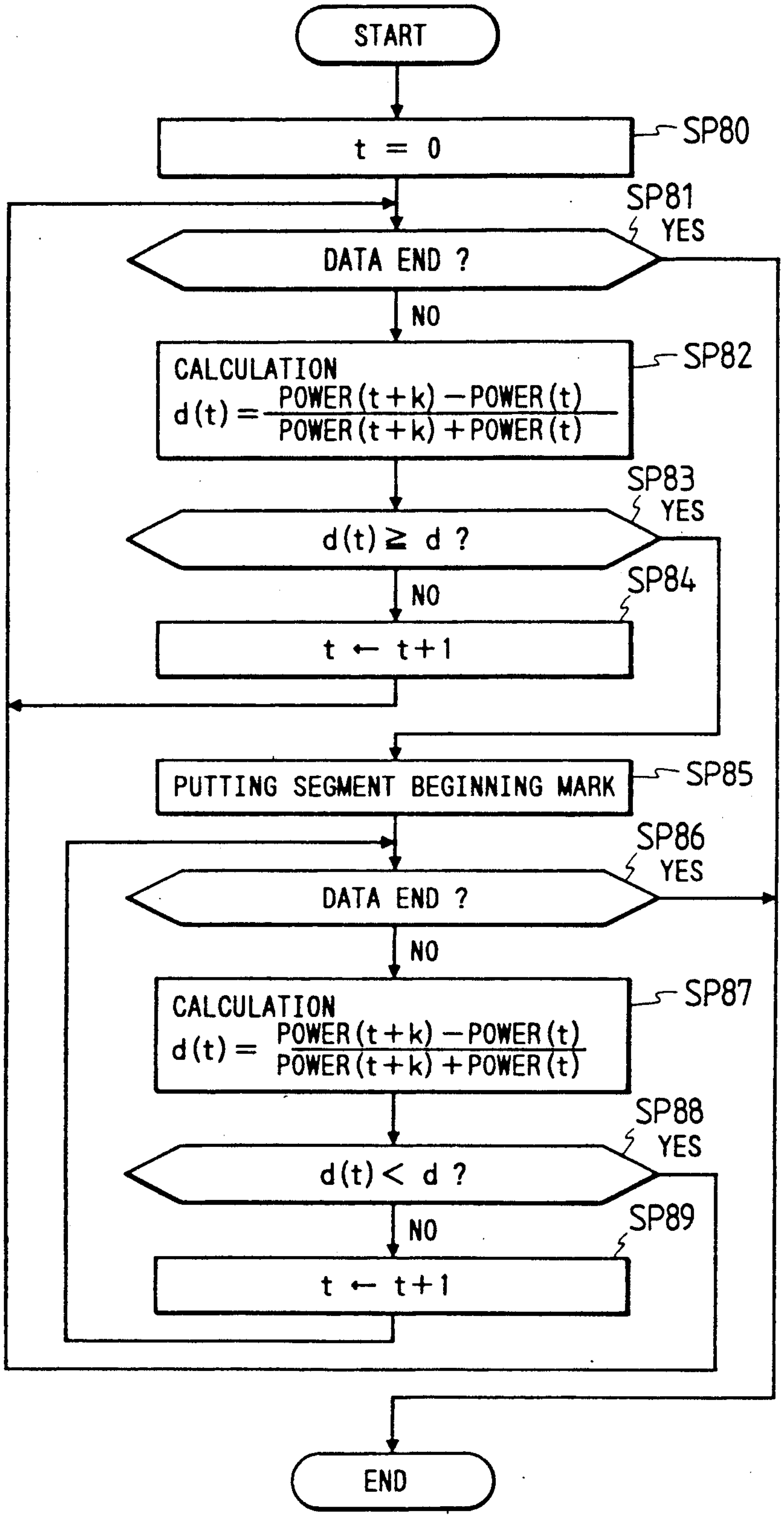
FIG. 11 is a flow chart illustrating an example of the segmentation process based on the power information according to the present invention.

In FIG. 14, the steps from SP 80 to SP 89 are the same as those given in FIG. 11, and their explanation is omitted here. That is, the step SP 110 and the subsequent steps perform a review of the segments.

For processing a review of segments, CPU 1 first clears the parameter t to zero and then ascertains that the analytical point data to be processed has not yet been completed. CPU 1 then judges whether or not any mark for the beginning of a segment is placed in respect of the analytical point (Steps SP 110–SP 112). When CPU 1 obtains a negative result as no such mark is placed, it increments the parameter t and returns to the above-mentioned step SP 111 (Step SP 113). By repeating this process, CPU 1 soon finds an analytical point with such a mark placed on it and obtains an affirmative result at the step SP 112.

At this time, CPU 1 increments the parameter t, setting 1 as the length parameter L, and then (ascertaining that the analytical point data to be processed has not yet been completed) it judges whether or not a segment beginning mark is placed on the analytical point t (Steps SP 114–117). When CPU 1 obtains a negative result as no such mark is placed on the analytical point being processed, CPU 1 increments both the length parameter L and the analytical point parameter t, and returns to the above-mentioned step SP 116 (steps SP 118 and SP 119).

Repeating this process, CPU 1 will soon find an analytical point to which a segment beginning mark is placed next to it and will obtain an affirmative result at the step SP 117. The length parameter L at this time corresponds to the distance between the analytical point which has a mark on it and the marked analytical point immediately preceding it. When an affirmative result is obtained at the step SP 117, CPU 1 judges whether or not this parameter L (the segment length) is shorter than the threshold value m. If the parameter is in excess of the threshold value m, CPU 1 returns to the step SP 111 mentioned above without eliminating the segment beginning mark. If, however, the parameter is smaller than the threshold value m, CPU 1 eliminates the segment beginning mark at the front side, and returns to the above-mentioned step 111 (Steps SP 120 and SP 121).

Figure 15:
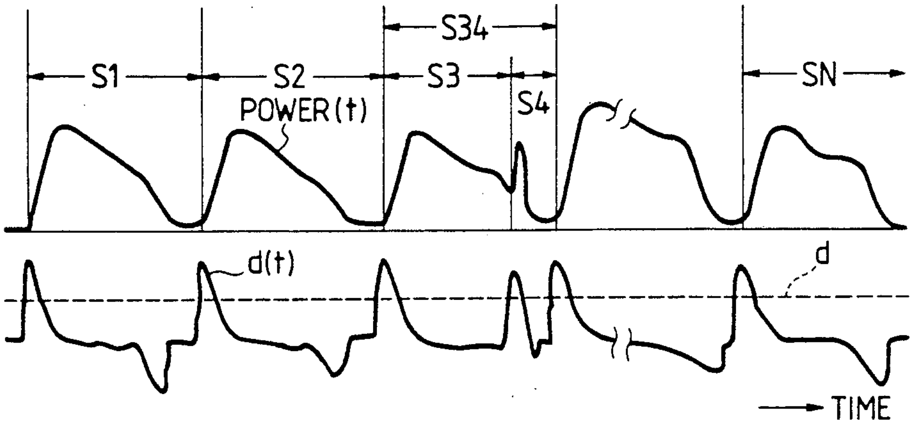
FIG. 15 is a characteristic curve chart presenting the chronological changes of the power information and the rise extracting functions, together with the results of the segmentation.

FIG. 15 shows one example of the chronological change of the power information Power (t) and the chronological change of the rise extraction function d(t). In this example, the acoustic signals have been divided into the segments, S1, S2 . . . SN by the processing up to the step SP 89 shown in FIG. 14. However, by executing their processing as from the step SP 110, those segments short in length are excluded, with the result that the segment S3 and the segment S4 are combined into the single segment S34.

In the above-mentioned embodiment, the function expressed in the equation (1) has been applied as the function for extracting the rise. It should be noted that other functions may be applied. For example, a differential function with a fixed denominator may be applied.

Furthermore, in the embodiment given above, a square sum of the acoustic signal is used as the power information. It should be noted that other parameters may be used. For example, a square root for the square sum may be used.

Moreover, in the embodiment mentioned above, it is shown that a segment in an insufficient length is connected to the immediately preceding segment. It should also be noted that a short segment may well be connected to the immediately following segment. Such a short segment may also be conditionally connected to the immediately preceding segment if the immediately preceding segment is one other than a rest section. Accordingly, the short segment would be conditionally connected to the immediately following segment if the immediately preceding segment is a rest section.

SEGMENTATION BASED ON PITCH INFORMATION

Next, the segmentation process of the automatic music transcription system according to the present invention based on the pitch information (Refer to the step SP 4 in FIG. 3) is explained in detail with reference to the flow charts presented in FIG. 16 and FIG. 17.

Figure 16:
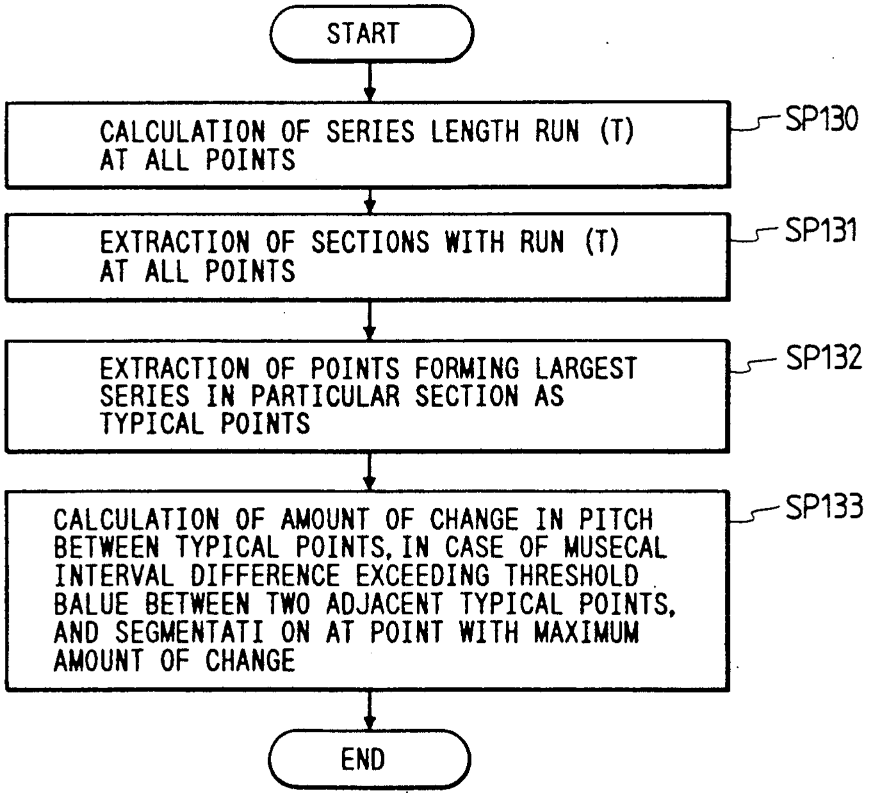
FIG. 16 and FIG. 17 are flow charts each illustrating an example of the segmentation process based on the pitch information according to the present invention.

In this regard, FIG. 16 is a flow chart illustrating such a process at the functional level. FIG. 17 is a flow chart showing greater details.

Figure 18:
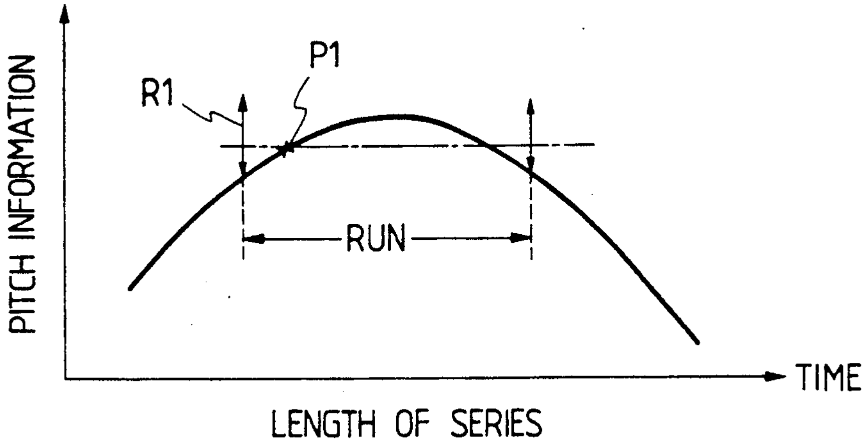
FIG. 18 is a schematic drawing providing an explanation of the length of the series.

CPU 1 calculates the length of a series with respect to all the sampling points in each analytical cycle on the basis of the obtained pitch information (Step SP 130). Here, the length of a series means a series of period RUN assuming the value of the pitch information in a prescribed narrow range R1 symmetrical in form centering around the pitch information on the observation point P1 as illustrated in FIG. 18. The acoustic signals generated by a singer or the like are generated with the intention of making such sounds as will assume a regular musical interval for each prescribed period. Even though the acoustic signals may have fluctuations, the changes in the pitch information for a period in which the same musical interval is intended should take place in a narrow range. Thus, the series length RUN serves as a guide for capturing the period of the same sound.

Subsequently, CPU 1 performs a calculation to find a section in which sampling points with a series length in excess of the prescribed value appear in continuation (Step SP 131). This calculation eliminates the influence of changes in the pitch information. CPU 1 then extracts as a typical point a sampling point having the maximum series length in respect of each of the sections found by the calculation (Step SP 132).

Then, finally, when the difference in the pitch information (i.e. the difference of tonal height) at two adjacent typical points is in excess of the prescribed level, CPU 1 finds the amount of the variation in the pitch information between the typical points (with respect to the individual sampling points between them) and segments the acoustic signals at the sampling point where the amount of such variation is in the maximum (Step SP 133).

In this manner, this system is capable of performing the segmentation process on the basis of the pitch information without being influenced by fluctuations in the acoustic signals or by sudden outside sounds.

Figure 17:
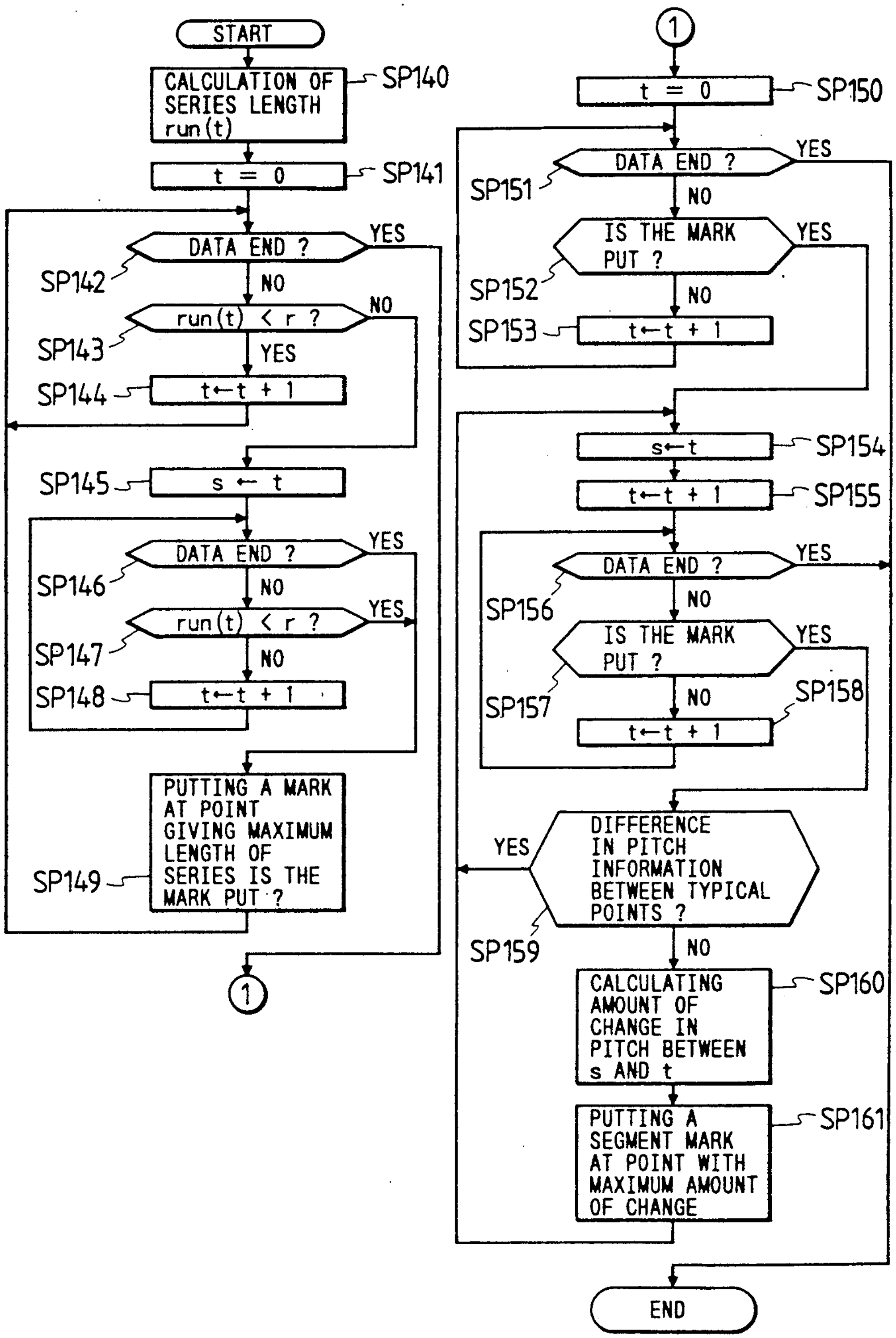

Next, this process is explained in greater detail in reference to FIG. 17.

First, CPU 1 works out the length of the series run(t) by calculation with respect to all the sampling points t (t=O to N) in every analytical cycle (Step SP 140).

Next, after clearing to zero the parameter t indicating the sampling point to be processed, CPU 1 ascertains that processing has not yet been completed in respect of all the sampling points. CPU 1 judges whether or not the series length run(t) at the sampling point t is smaller than the threshold value r (Steps SP 141 to 143). If CPU judges that the length of the series is insufficient, it increments the parameter t and returns to the above-mentioned step SP 142 (Step SP 144).

By repeating these steps, CPU 1 finds a sampling point with a series length run(t) longer than the threshold value r and obtains a negative result at step SP 143. CPU 1 stores that parameter t as the parameter s and marks it as the beginning point where the series length run(t) has exceeded the threshold value r. Thereafter CPU 1 ascertains that the processing has not yet been completed with respect to all the sampling points, and judges whether or not the series length run(t) at the sampling point t is smaller than the threshold value r (Steps SP 145 to SP 147). If CPU 1 finds as the r (Steps SP 145 to SP 147). If CPU 1 finds that the series length run(t) is sufficient, it increments the parameter t and returns to the above-mentioned step SP 146 (Step SP 148).

By repeating this processing operation, CPU 1 soon finds a sampling point where the series length run(t) is shorter than the threshold value r. Here CPU 1 obtains an affirmative result at step SP 147. Thus, CPU 1 detects those sections in continuum where the series length run(t) is shorter than the threshold value r, i.e. the section from the marked pointed s to the sampling point t-1 at one point ahead. CPU 1 then puts a mark at the point which gives the maximum series length among these sampling points (Step SP 149). Upon completion of this process, CPU 1 returns to the above-mentioned step SP 142 and performs the detecting process for the next continuous section where the series length run(t) is in excess of the threshold value r.

When CPU 1 has completed the detection of the continuous section (series length run(t) is in excess of the threshold value r and the marking of the typical points), CPU 1 clears the parameter t to zero again, thereafter ascertaining that processing has not yet been completed for all the sampling points. CPU 1 thereafter judges whether or not the mark is placed on the sampling point (Steps SP 150 to SP 152). If no such mark is placed, CPU 1 increments the parameter t and returns to the above-mentioned step SP 151 (Step SP 153).

By repeating this process, a sampling point with a mark placed on it will be taken up as the object of processing, and the first typical point will be found. Then, CPU 1 stores and marks this value t as the parameter s, and, further incrementing the parameter t and ascertaining that the processing has not yet been completed with respect to all the sampling points, judges whether or not a mark as a typical point is placed on the sampling point taken as the object of the processing (Step SP 154 to 157). If no such mark is placed there, CPU 1 increments the parameter t and returns to the above-mentioned step SP 154 (Step SP 158).

As this process is repeated, a sampling point with a mark placed on it will soon be taken up as the object of the processing, and the next typical point t will be found. At this time, CPU 1 judges whether or not the difference in pitch information between these adjacent typical points s and t is smaller than the threshold value q. If it is smaller, CPU 1 returns to the above-mentioned step SP 154 and proceeds to the process for finding the next pair of adjacent typical points. If the difference is in excess of the threshold value q, however, CPU 1 finds the amount of variation in the pitch information between the typical points in relation to the individual sampling points s to t. CPU 1 then places a segment mark on the sampling point with the maximum amount of variation (Steps SP 159 to 161).

By the repetition of this process, segment marks are placed one after another between typical points, and an affirmative result is soon obtained at the step SP 156, the process being thereupon completed.

Accordingly, the above-mentioned embodiment is capable of performing the segmentation process well even if there are fluctuations in the acoustic signals or if sudden outside sounds are included in them. This advantage is realized because the system performs its segmentation process using a series lengths representing a single length in which the pitch information is present in a narrow range.

In the embodiment mentioned above, moreover, the system performs segmentation on the pitch information output by the autocorrelation analysis. It should be understood that this method of extracting pitch information is not confined to the specifics of the above described embodiment.

PROCESSING FOR REVIEW OF SEGMENTATION

Figure 19:
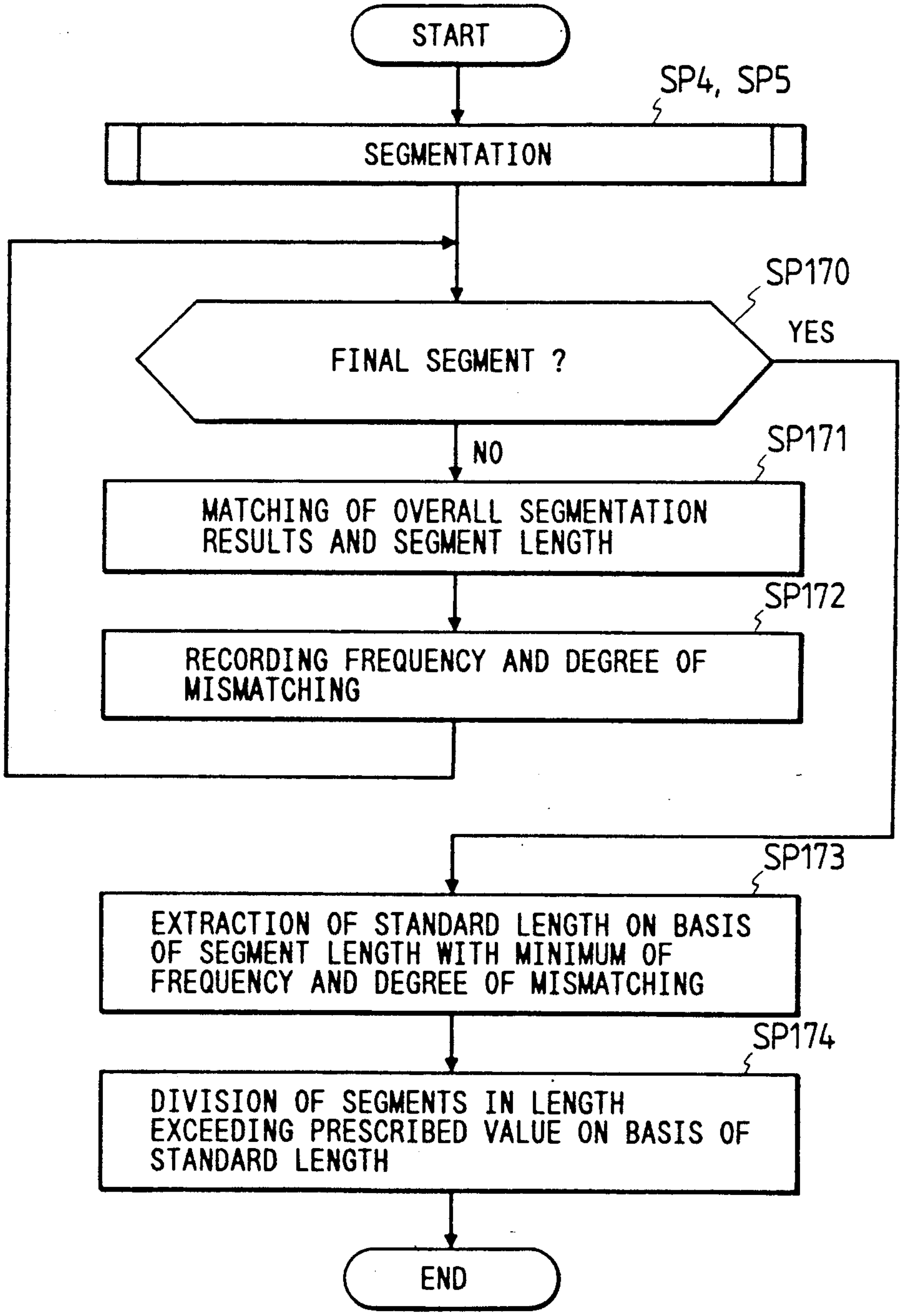
FIG. 19 is a flow chart illustrating the reviewing process for the segmentation according to the present invention.

Next, with reference to the flow chart in FIG. 19, a detailed description is presented with regard to the processing for the review of segmentation (Refer to the step SP 6 in FIG. 3).

This reviewing process has been adopted in order to improve the accuracy of the musical interval identifying process. The reviewing process further segments the segments prior to the process for identifying a musical interval. The reviewing process reexecutes the musical interval identifying process with the segmented segments because the musical interval identified is highly likely to be erroneous (resulting in a decline in the accuracy of the generated musical score data) if a segment has been established by mistake to consist of two or more sounds. It is also conceivable that a single sound may be divided into two or more segments. This situation does not present a problem because those segments which are considered to form a single sound on the basis of the identified musical scale and the power information are connected to each other by the segmentation processing at the step SP 11. In such a reviewing process for segmentation, CPU 1 first ascertains that the segment to be taken up for processing is not the final segment. CPU 1 then executes the matching of the particular segment with the entire segmentation result (Steps SP 170 and 171).

Here, "matching" means a process which finds the grand total sum of the absolute values of two differences. One of these differences is itself the difference between the value of one part of the particular segment length (as divided by its integral number or as obtained by multiplying the segment length by its integral number) and the length of the other segment. The other difference is the difference between the frequency of the disagreement between the value for one part of the length of the segment (as divided by its integral number or as obtained by multiplying it with its integral number) and the value for the length of the other segment (the number of times of mismatches). In the case of this embodiment, the other segment to be matched is both the segment obtained on the basis of the pitch information and the segment obtained on the basis of the power information.

Figure 20:
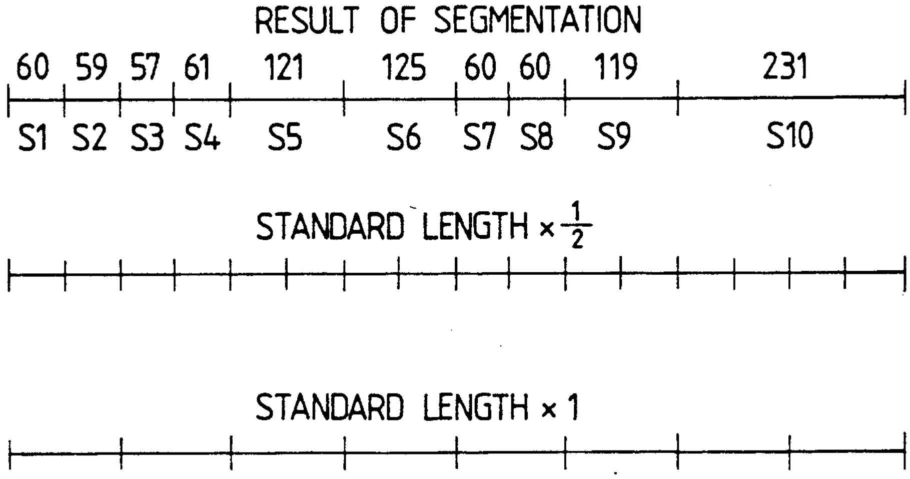
FIG. 20 is a schematic drawing provided for an explanation of the reviewing process.

For example, FIG. 20 shows ten segments which have been established by the former-stage process of segmentation (Steps SP 4 and SP 5 in FIG. 3). When first segment S1 is the object of the processing, this matching process generates "1+3+1+1+5+0+0+1+9=21" as the grand total sum information on the differences. The matching process also outputs a seven as the number of mismatches.

When the number of mismatches and the degree of such mismatching (i.e. the information on the grand total sum of the differences) have been obtained for the object of the processing, CPU 1 stores the information in auxiliary memory device 6 and returns to the above-mentioned step, SP 170, taking up the next segment as the segment to be the object of the processing (Step PS 172).

Repetition of the processing loop composed of steps SP 170 to SP 172 generates information on the number of times of mismatching and the degree of the mismatches with respect to all the segments. An affirmative result is soon obtained at the step SP 170. At this time, CPU 1 determines the standard length on the basis of the segment length which is liable to the minimum of these factors in light of the information stored on all the number of times of mismatching and the degree of such mismatches in the auxiliary memory device (Step SP 173). Here, "standard length" means the duration of time equivalent to a quarter note or the like.

In the case of the example of FIG. 20, "60" is extracted as the segment length with the minimum of the number of times of mismatching and the minimum of its degree. A value of "120" (a value twice as large as length "60" ) is selected as the standard length. In practice, the length corresponding to a quarter note is made to correspond with a value in the prescribed range. From this viewpoint, "120" instead of "60" is extracted as the standard length.

When the standard length is extracted, CPU 1 further divides the segments generally longer than the standard length by a value roughly corresponding to one half of the standard length. This completes the reviewing process for this segmentation Step SP 174). In this case of the example given in FIG. 20, the fifth segment S5 is further divided into "61" and "60"; sixth segment S6 is further divided into "63" and "62"; the ninth segment S9 is further divided into "60" and "59"; the tenth segment S10 is further divided into "58", "58", "58", and "57".

Therefore, according to the embodiment given above, it is possible to make a further division of segments even where case two or more sounds have been segmented as a single segment. Hence, it is possible for the system accurately to execute such processes as the musical interval identifying process and the musical interval correcting process.

In this method of further segmentation, segments corresponding to a single sound will not be erroneously divided into two or more sections. Single sounds remain as they are because the system involves a post-treatment process which connects adjacent segments considered to form a single sound.

The embodiment given above shows the extraction of the standard length based on the number of times of mismatching and based on the degree of mismatching. The extraction of the length may, however, also be done based on the frequency of occurrence of a segment length.

Furthermore, the embodiment given above shows a case in which a duration of time equivalent to a quarter note is used as the standard length. It should be noted that a duration of time equivalent to an eighth note may also be employed as the standard length. In this case, further segmentation will be performed not only by a length equivalent to one half of the standard length, but by the standard length itself.

The embodiment given above also shows a processing system whose segmentation is based both on the pitch information and on the power information. It should be noted that, the present invention may involve a segmentation process based only on the power information.

IDENTIFICATION OF MUSICAL INTERVAL

Figure 21:
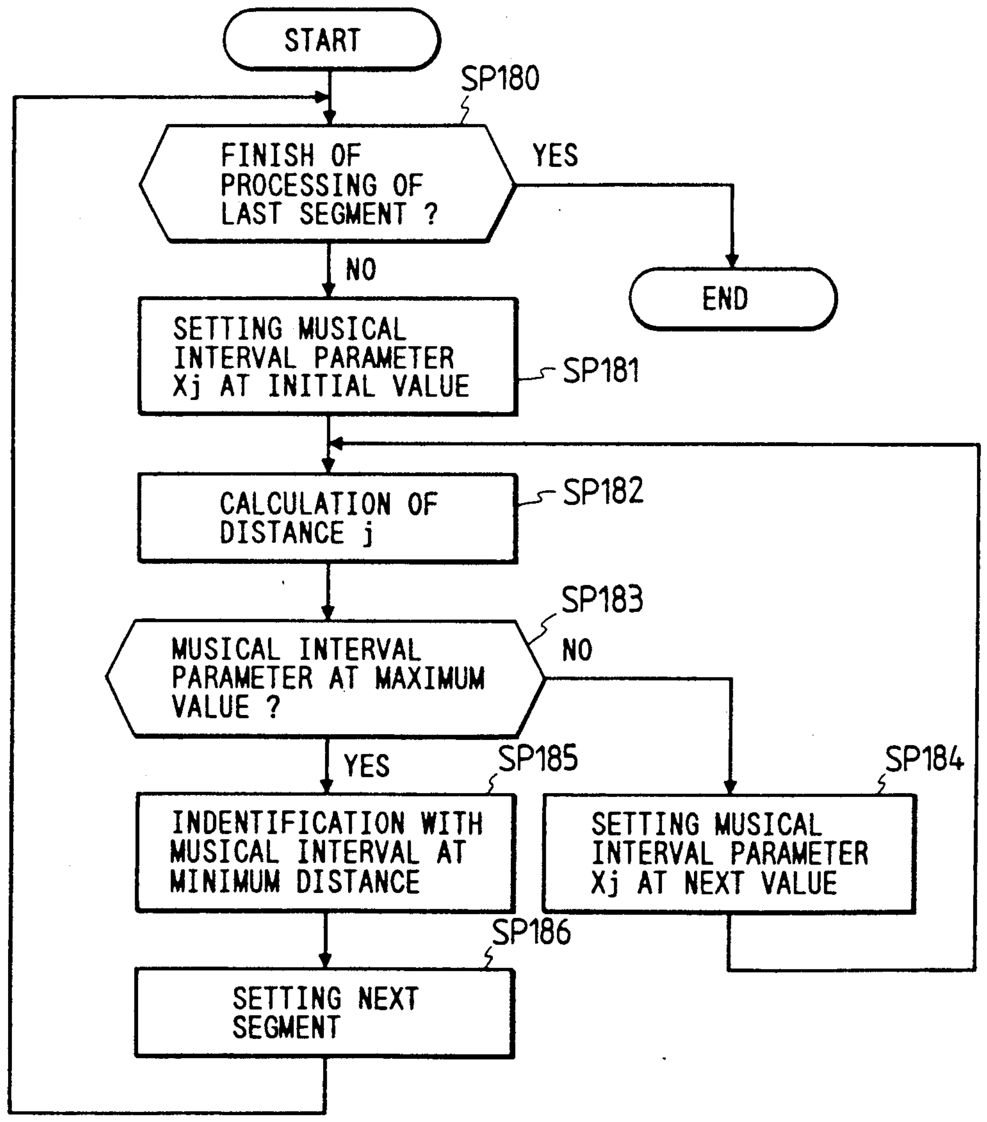
FIG. 21 is a flow chart illustrating the musical interval identifying process according to the present invention.

Next, a detailed description is given (with reference to the flow chart in FIG. 21) of the musical interval identifying process (step SP 7 in FIG. 3).

CPU 1 first ascertains that the processing of the final segment has not yet been completed. CPU 1 then sets the pitch information (x0) for the lowest interval that the acoustic signals are considered to have. This lowest interval, denoted xj, is placed on the axis of an absolute musical interval (j=0 to m−1, where m expresses the number of musical intervals which the acoustic signal is considered to take on the axis of the absolute musical interval in the high tone range). CPU 1 then calculates and stores the distance $\epsilon j$ of the pitch information pi (i=0 to n−1, where n expresses the number of items of the pitch information for this segment) in relation to that musical interval (Steps SP 180 and SP 182).

Figure 22:
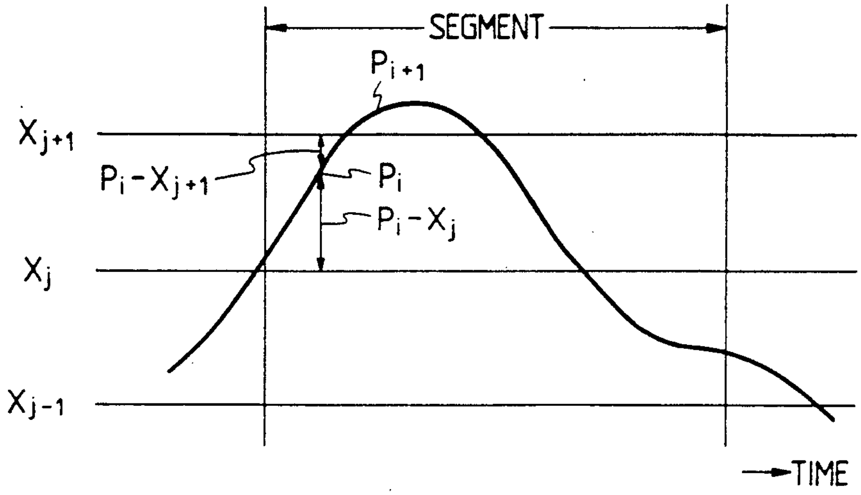
FIG. 22 is a schematic drawing providing an explanation of the distance of the pitch information to the axis of the absolute musical interval in each segment.

Here, the distance $\epsilon j$ is the sum of the square of the difference pi−xj (Refer to FIG. 22) between each item of the pitch information pi in the segment and the pitch information xj for the musical interval. The distance $\epsilon j$ is calculated according to the following equation:

$$\epsilon j = \sum_i (pi - xj)^2 \quad (2)$$

Thereafter, CPU 1 judges whether or not the musical interval parameter xj has become the pitch information xm−1 for the musical interval on the axis of the highest absolute musical interval that the acoustic signal is considered to be able to take. If it obtains a negative result, CPU 1 renews the musical interval xj to develop pitch information xj+1 for the musical interval which is higher by a half step on the axis of the absolute musical interval than the musical interval used for the processing up to the present time. CPU 1 then returns to the above-mentioned distance-calculating step, SP 182 (Steps SP 183 and SP 184).

By the repetition of the processing loop consisting of these steps, SP 183 and SP 184, the distance $\epsilon 0$ to $\epsilon m-1$ between the pitch information and all the musical intervals on the axis of the absolute musical scale is calculated. When an affirmative result is found at the step SP 183, CPU 1 detects the smallest of the distances of the individual musical intervals stored in the memory. This smallest musical interval becomes the musical interval of the segment. The CPU then processes the next segment, thereafter returning to the step SP 180 mentioned above (Steps SP 185 and SP 186).

By the repetition of the process in this manner, the musical intervals are identified for all the segments. When an affirmative result is obtained at the Step SP 180, CPU 1 finishes processing.

Therefore, the embodiment described above can identify the musical interval with a high degree of accuracy owing to its calculation of 1) the distance between the pitch information on each segment and the axis of the absolute musical interval, and 2) its identification of the musical interval of the segment with such a musical interval on the axis of the absolute musical interval as results in the minimum distance.

In the embodiment given above, the distance is calculated by the equation (2). It is, however, also acceptable to determine the distance using the following equation:

$$\epsilon j = \sum_i |pi - xj| \quad (3)$$

Furthermore, the pitch information used in the process for identifying the musical interval may be expressed either in Hz, which is the unit of frequency, or in cent, which is a unit frequently used in the field of music.

Figure 23:
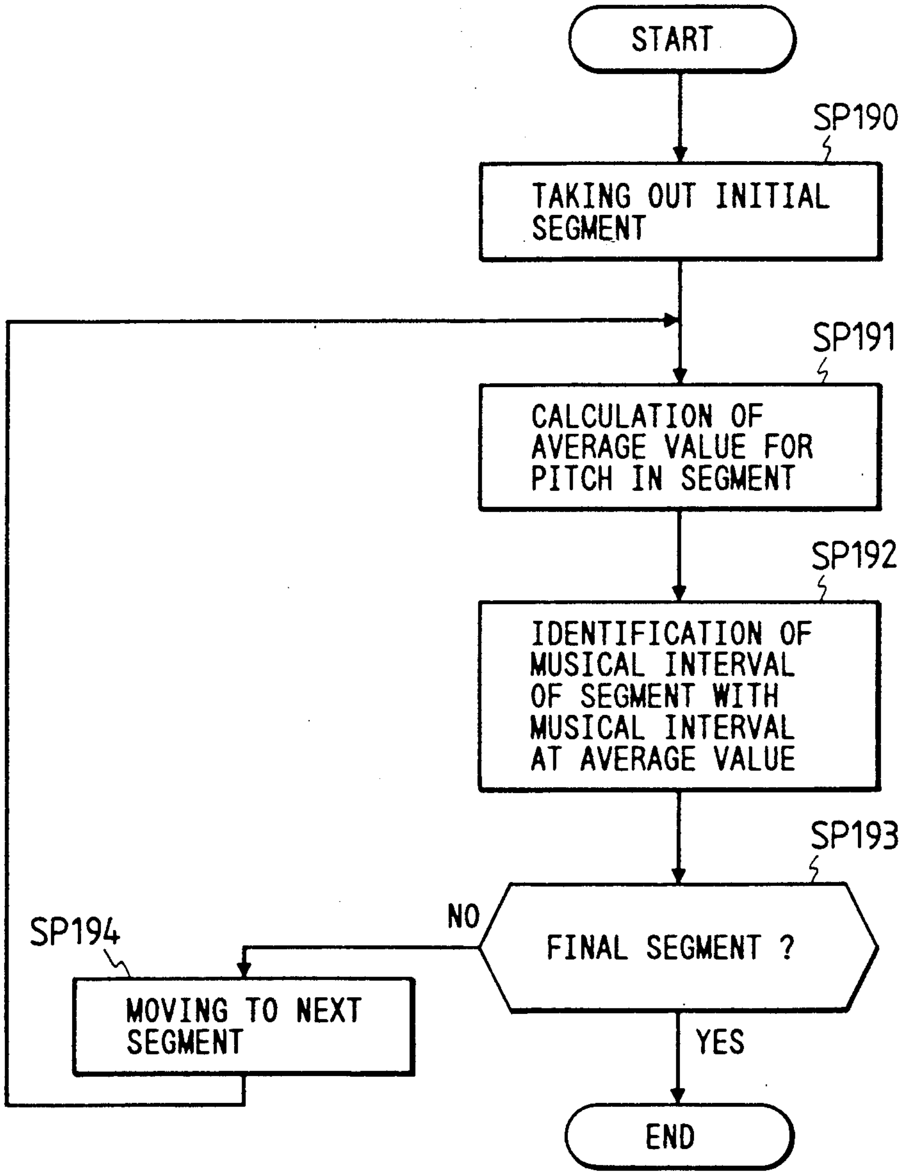
FIG. 23 is a flow chart illustrating an example of the musical interval identifying process according to the present invention.

Next, a detailed description is presented with reference to the flow chart in FIG. 23 about another process for the identification of musical intervals with the automatic music transcription system according to the present invention.

CPU 1 first retrieves the initial segment from all the segments obtained by the segmentation process. CPU 1 then calculates the average value of all the pitch information present in that segment (Steps SP 190 and SP 191).

CPU 1 then identifies the musical interval on the axis of the absolute musical interval closest to the calculated average value. This interval becomes the musical interval for the particular segment (Step SP 192). Accordingly, the musical interval of each segment of the acoustic signal is identified with a half step on the axis of the absolute musical interval. CPU 1 distinguishes whether or not a given segment processed in this way, with its musical segment thereby identified, is the final segment (Step SP 193). If CPU 1 determines that processing has been completed, it finishes the program for the particular program. If the process has not been completed yet, CPU 1 retrieves the next segment as the object of its processing and returns to the above-mentioned step SP 191 (Step SP 194).

With the repetition of this processing loop consisting of these steps, SP 191 to SP 194, the identification of musical intervals is executed with respect to all the segments on the basis of the pitch information in the segment.

Note that the system utilizes the average value of the musical interval identifying process. The acoustic signals will fluctuate in such a manner as to center around the musical interval intended by the singer or the like, therefore the average value corresponds to the intended musical interval.

Figure 24:
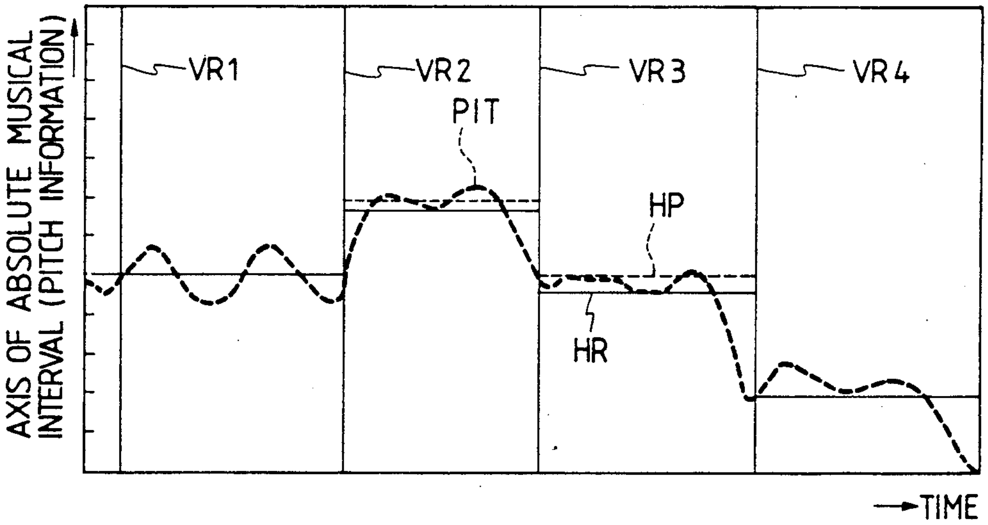
FIG. 24 is a schematic drawing illustrating one example of such a musical interval identifying process.

FIG. 24 shows one example of the identification of a musical interval through such processing. The curve PIT (dotted line) represents the pitch information of the acoustic signal. Solid line VR in the vertical direction shows the division of each segment. The average value for each segment in this example is indicated by the solid line HR in the horizontal direction. The identified musical interval is represented by the dotted line HP in the horizontal direction. As is evident from FIG. 24, the average value has a very small deviation in relation to the musical interval on the axis of the absolute musical interval. It is therefore possible to perform the identification of the musical interval accurately.

Consequently, this embodiment finds the average value of the pitch information in respect of each segment and then identifies the musical interval of the segment with such a musical interval on the axis of the absolute musical interval as is closest to the average value. Therefore, the system is capable of identifying musical intervals with a high degree of accuracy. Moreover, because this system performs a tuning process on the acoustic signals prior to the identification of the musical interval, this method can find an average value assuming a value close to the musical interval on the axis of the absolute musical interval. The tuning feature provides considerable ease in the performance of the identification process.

In the example presented above the musical interval of the segment is identified on the basis of the average value of the pitch. The identification of segments is, however, not limited to this. The identification of segments can be based on the median value for the pitch. The flowchart shown in FIG. 25 outlines this process.

Figure 25:
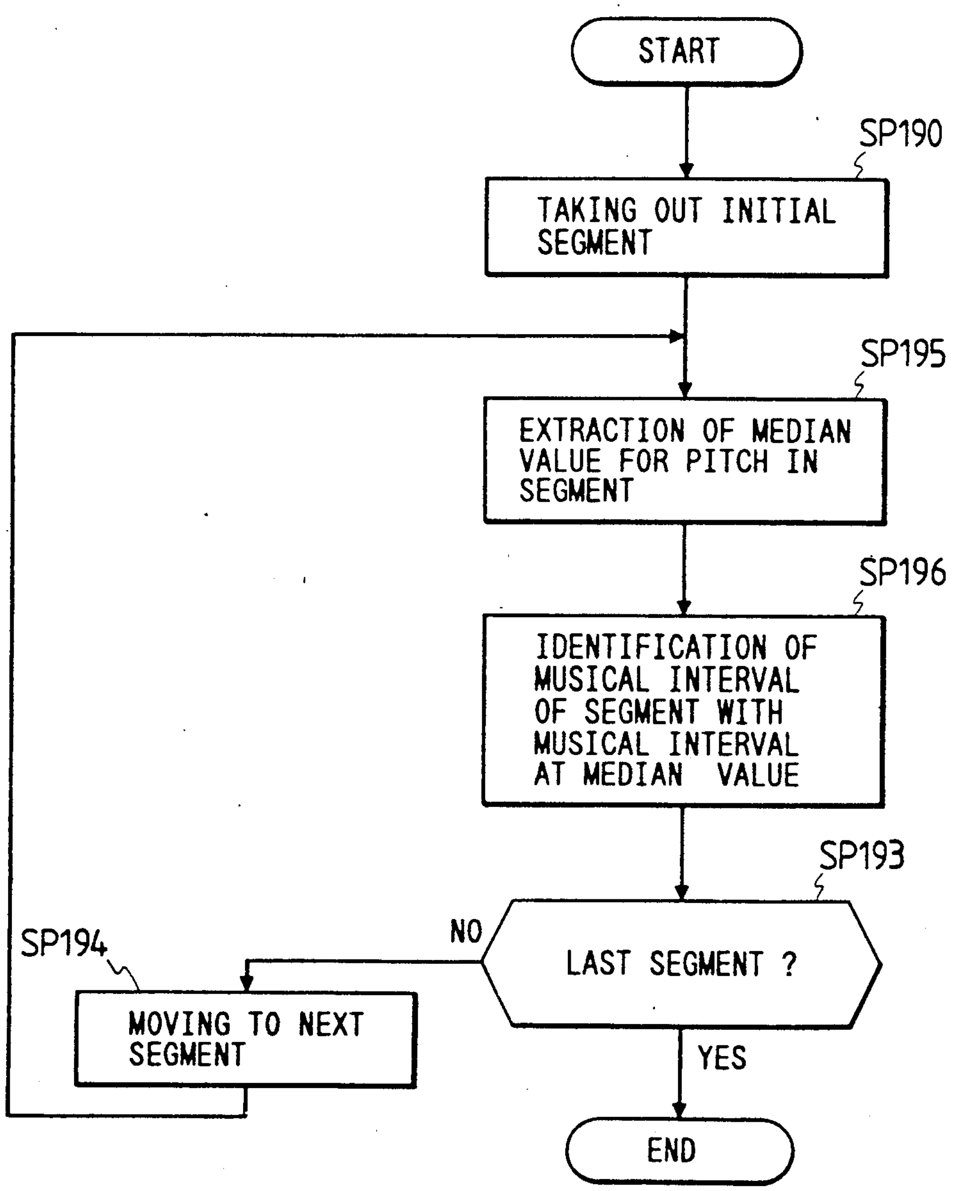
FIG. 25 is a flow chart illustrating an example of the musical interval identifying process according to the present invention.

As shown in FIG. 25, CPU 1 first retrieves the initial segment from the segments obtained by segmentation. CPU 1 then extracts the median value of all the pitch information present in the segment (Steps SP 190 and SP 195). Provided that the number of pitch items in a segment is odd, the median value is the value of the pitch information in the middle of the segment when the items of the pitch information for the particular segment are arranged in the order starting with the largest one. If the number of pitch items in a segment is even, the median value is the average value of the two items positioned in the middle of the segment.

The processes other than those at the steps SP 195, SP 196, and SP 196 are basically the same as those shown in FIG. 23.

By the repetition of the processing loop consisting of the steps, SP 195, SP 196, SP 193, and SP 194, the identification of the musical intervals on the basis of the pitch information in the particular segment is performed with respect to all the segments.

Here, the reason for which the system has been designed to utilize the median value for the process for identifying the musical intervals is that, even though acoustic signals have fluctuations, they are considered to fluctuate in a manner centering around the musical interval intended by the singer or the like, so that the median value corresponds to the intended musical interval.

Figure 26:
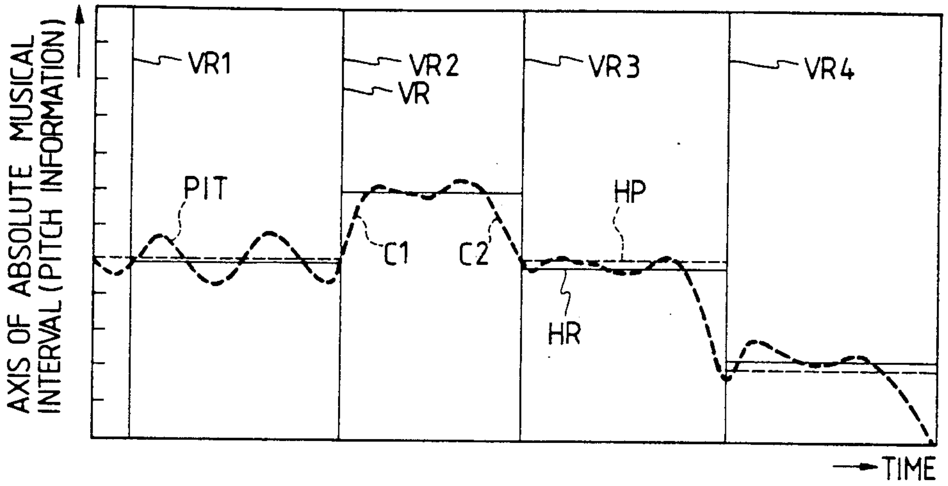
FIG. 26 is a schematic drawing illustrating one example of such a musical interval identifying process.

FIG. 26 shows one example of the identification of musical intervals by this process. The dotted-line curve PIT shows the pitch information of the acoustic signal. Solid line VR in the vertical direction indicates the division of the segment. The median value for each segment in this example is represented by the solid line HR in the horizontal direction. The identified musical interval is shown by the dotted line HP in the horizontal direction. As it is evident from FIG. 26, the median value has a very small deviation in relation to the musical interval on the axis of the absolute musical interval. It is therefore possible for the system to perform the identifying process accurately. It is also possible to identify the musical interval without being affected by any unstable state of the pitch information immediately before or after the division of a segment (for example, the curve portions C1 and C2).

Thus, since the system in this embodiment extracts the median value of the pitch information on each segment and identifies the musical interval at such a musical interval on the axis of the absolute musical interval as is positioned closest to the median value, it is possible for the system to identify the musical interval with a high degree of accuracy. Moreover, prior to the identification of the musical interval, this system applies a tuning processing to the acoustic signals. Therefore, by this method, the median value assumes a value close to the musical interval on the axis of the absolute musical interval and the ease of the identification is facilitated.

Figure 27:
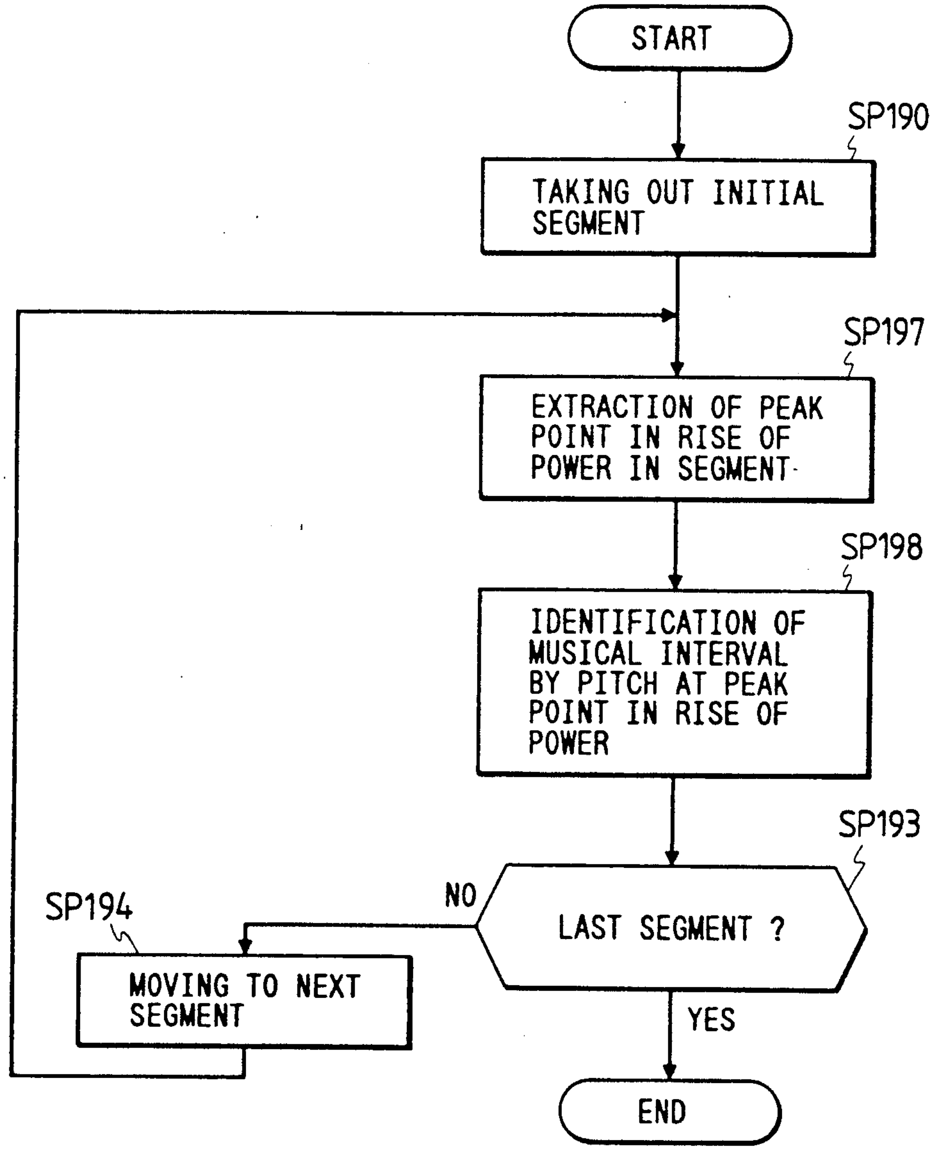
FIG. 27 is a flow chart illustrating one example of the musical interval identifying process according to the present invention.

In the alternative, the process for the identification of the musical interval may be executed on the basis of a peak point in the rise of power (Step SP 7 in FIG. 3). An explanation is provided on this feature with reference to FIG. 27 and FIG. 28. The processing procedure illustrated in FIG. 27 is basically the same as that given in FIG. 23, and only the steps, SP 197 and SP 198, are different.

CPU 1 first retrieves the initial segment from those segments which have been obtained by segmentation. CPU 1 also retrieves the sampling point which gives the initial maximum value (a peak in the rise) from the change in the power information of the segment (Steps SP 190 and SP 197).

After that, CPU 1 identifies the musical interval for the particular segment to be the musical interval on the axis of the absolute musical interval that is closest to the pitch information on the sampling point which gave rise to the peak in the rise of power (Step SP 198). In this regard, the musical intervals of the individual segments of the acoustic signals are identified with either one of the musical intervals different by a half step on the axis of the absolute musical interval.

Here, the peak in the rise of the power information for the process for identifying the musical intervals because has been used because it is assumed that the singer or the like will control the volume of voice in such a way as to attain the musical interval at the peak in volume. As a matter of fact, it has been conclusively verified that there is a very close correlation between a peak in the rise of the power information and the musical interval.

Figure 28:
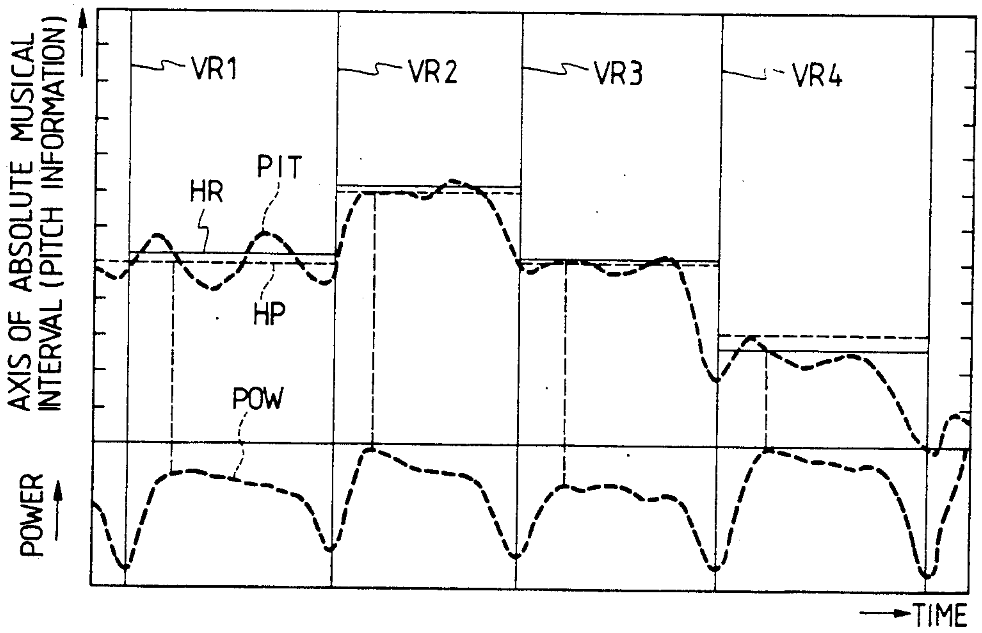
FIG. 28 is a schematic drawing showing one example of such a musical interval identifying process.

FIG. 28 illustrates one example of the identification of the musical interval by this process. The first dotted-line curve PIT represents the pitch information of the acoustic signal. The second dotted-line curve POW represents the power information. The solid line VR in the vertical direction indicates the division of segments. The pitch information at the peak in the rise in each segment in this example is shown by the solid line HR in the horizontal direction while the identified musical interval is shown by the dotted line HP in the horizontal direction. As it is evident from FIG. 28, the pitch information in relation to the peak point in the rise of the power information has a very small deviation from the musical interval on the axis of the absolute musical interval. This observation makes it possible for the system to identify the musical interval well.

Therefore, according to the embodiment described above, the system extracts the pitch information on the peak point in the rise of the power information for each segment and identifies the musical interval of the segment with such a musical interval on the axis of the musical interval as is closest to this pitch information. Hence, the system is capable of identifying the musical interval with a high degree of accuracy. Moreover, prior to the identification of the musical interval, the system applies a tuning process to the acoustic signals, so that the pitch information in relation to the peak point in the rise of the power information assumes a value close to the musical interval on the axis of the absolute musical interval. Accordingly, the ease with which this system performs the identification is enhanced.

Moreover, since the system makes use of the peak point in the rise of the power information, it is possible for the system to identify the musical interval well even if the segment is short (the number of sampling points is small in comparison with the case of the identification of a musical interval through the statistical processing of the pitch information in the segment). Accordingly, the identification of the musical interval by this system is not readily influenced by segment length.

Although the embodiment described above shows a process for identifying the musical interval on the basis of the pitch information in relation to the peak point in the power information, it is also a workable process to perform the identification of the musical interval on the basis of the pitch information on the sampling point which gives the maximum value of the power information on this segment.

Figure 29:
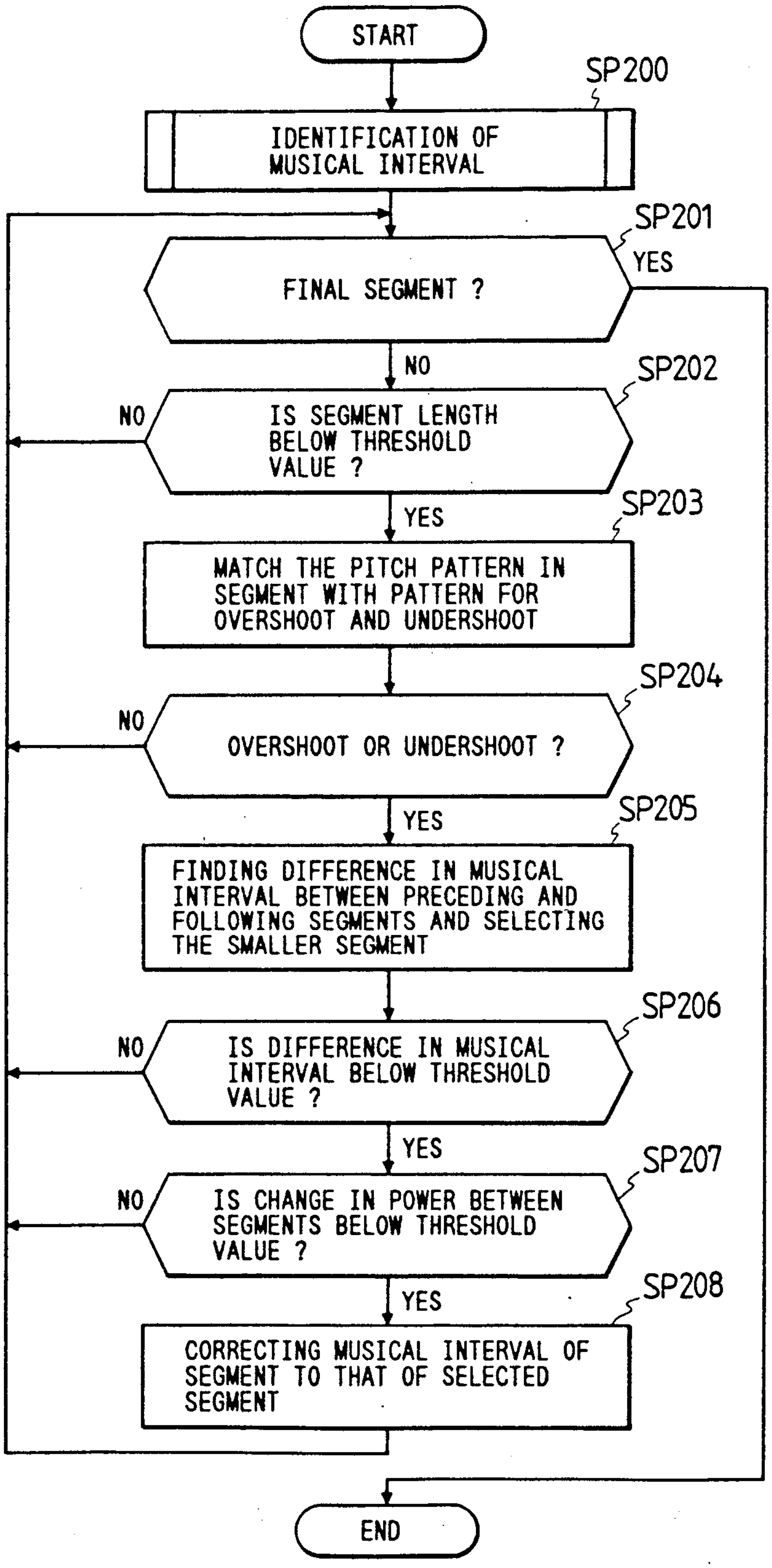
FIG. 29 is a flow chart illustrating an example of the process for correcting the identified musical interval according to the present invention.

Next, a detailed description is given with reference to the flow chart in FIG. 29 concerning a still another arrangement of the musical interval identifying process and the reviewing process for the once identified musical intervals performed by this automatic music transcription system according to the present invention.

CPU 1 first obtains an average value, for example, of the pitch information of segments obtained through segmentation. CPU 1 then identifies the musical interval of the segment to be the musical interval (one of the half steps on the axis of the absolute musical interval) closest to this average value (Step SP 200).

The musical interval thus identified is reviewed by this system in the following manner. Review is made of those segments which were identified with musical intervals independently of their preceding and following segments, the independent determination of their musical interval being the result of their division as separate segments in consequence of the instability of their musical interval at the time of their sound transition.

CPU 1 first ascertains that the processing of the final segment has not been completed. CPU 1 then judges whether or not the length of the segment to be processed is shorter than the threshold value. If the length exceeds the threshold value, CPU 1 shifts the processing operation to the next segment and returns to the step SP 200 (Steps SP 201 and SP 202).

This type of processing is performed due to the fact that the length of a segment will be short if it is identified as a separate segment (despite its being a part of a single sound at the beginning or the ending transition of the sound). When it is detected that the segment being processed is one with a short length, CPU 1 determines the matching of the tendency of the change in the pitch information for the particular segment, determines the tendency of the change in the overshoot, and determines the matching of the tendency of the change in the pitch information for that segment, and also determines the tendency of the change in the undershoot. CPU 1 thereby judges whether or not the tendency of the change in the pitch information on that segment represents an overshoot or an undershoot (Steps SP 203 and SP 204).

At the time of a transition from one sound to another gradual transition sometimes occurs from a somewhat higher musical interval level to that of the sound in the proximity of the beginning of the next sound. Similarly a gradual transition sometimes occurs from a somewhat lower musical interval level to that of the sound in the proximity of the beginning of the next sound. Accordingly, a transition with a gradual decline in pitch sometimes occurs from the musical interval level of a sound to the next sound, and a transition with a gradual rise in pitch sometimes occurs from the musical interval level of a sound to the next sound. Of the parts of segments where the musical interval changes with a tendency towards a gradual rise or fall in pitch (although they are parts of single sounds), those parts which are higher in pitch than the proper musical interval are called "overshoots". Of the parts of segments where the musical interval changes with a tendency towards a gradual rise or fall in pitch (although they are parts of single sounds), those parts which are lower in pitch than the proper musical interval are called "undershoots".

Such overshoot parts and undershoot parts may be distinguished as independent segments. In such a case, CPU 1 judges whether or not the segment taken as the object of the process shows the possibility of its being a segment assuming any overshoot or any undershoot. The system then determines the matching between the tendency of the change in the pitch information for the segment and the proper tendency towards a rise in pitch or the proper tendency towards a fall in pitch as just mentioned above.

When CPU 1 obtains a negative result as the result of this judging process, it retrieves the next segment as the object of the processing and returns to the above-mentioned step SP 201. On the other hand, if CPU 1 judges that there is a possibility of the segment reflecting an overshoot or an undershoot, it finds the differences between the identified musical interval of the particular segment and the identified musical intervals of the immediately following segment in relation to the segment (placing a mark on the segment showing the smaller difference) and judges whether or not the difference in the marked musical interval of the segment is smaller than the threshold value (Steps SP 205 and SP 206).

If a sound is divided into separate segments through the segmentation process even though they form a single sound, the musical interval of such a segment is not much different from the musical intervals of the preceding segments and the following segments. If such a segment shows a considerable difference in musical interval from those of the segments preceding and following it, the segment is determined not to be a segment reflecting an overshoot or an undershoot. CPU 1 retrieves the next segment for processing and returns to the step SP 201 mentioned above.

On the other hand, if the particular segment shows a small difference in musical interval from that of the marked segment, CPU 1 judges whether or not there is any change in the power information in excess of the threshold value in the proximity of the boundary between the particular segment and the marked segment (Step SP 206). When a transition takes place from one sound to another, it often happens that the power information also changes. If the change in the power information is large, it is considered that the particular segment is not a segment reflecting an overshoot or an undershoot. In this case, CPU 1 retrieves the next segment for processing and returns to the above-mentioned step, SP 201.

If an affirmative result is obtained by the judgment at this step, SP 207, it is considered that the particular segment reflecting an overshoot or an undershoot. Hence, CPU 1 corrects the musical interval of the particular segment to that of the marked segment. CPU 1 then retrieves the next segment for processing, then returning to the step, SP 201, mentioned above (Step SP 208).

When CPU 1 completes the review of the final segment of the musical intervals by the repetition of a process like this, it obtains an affirmative result at the step, SP 201, and completes the particular processing program.

Figure 30:
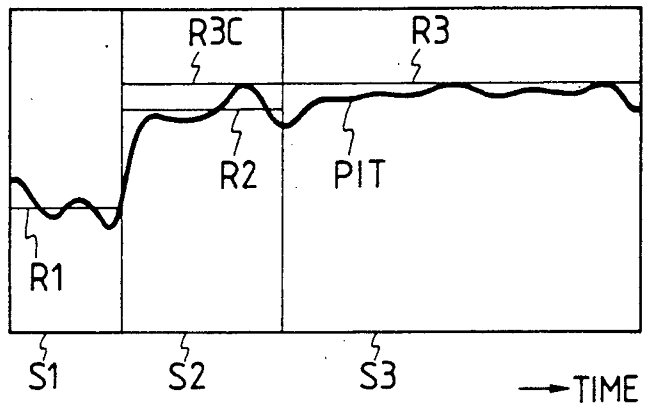
FIG. 30 is a schematic drawing illustrating one example of the correction of such an identified musical interval.

FIG. 30 presents an example in which the identified musical interval is corrected by the process just described. Here, the curve expresses the pitch information PIT. In this example, the second segment S2 and the third segment S3 are intended to form the same musical interval. The second segment S2 was identified, prior to the correction, with the musical interval R2, which was at a level lower by a half step from the musical interval R3 with which the third segment S3 was identified. The musical interval R3C of this segment S2 was later modified by this process to the musical interval R3 of the segment S3.

Therefore, this system can increase the accuracy of the musical score data due to the improvement in accuracy of the identified musical intervals. A higher degree of accuracy in the execution of the subsequent processes is realized because the system corrects the identified musical interval through by detecting segments erroneously identified with incorrect musical intervals. The correction uses the segment length, the tendency of the change in the pitch information, the difference of the particular segment in musical interval from the preceding and following segments, and the difference of the particular segment in power information from the preceding and following segments.

Although the above-mentioned embodiment extracts those segments identified with wrong musical intervals by taking account of the difference in power information between a particular segment and those sections preceding and following it, another possible embodiment involves extracting such wrongly identified segments on the basis of the segment length, the tendency of the change in the pitch information, and the difference in musical interval between the particular segment and the preceding and following segments.

The present invention's method of detecting the presence of an overshoot or an undershoot on the basis of the change in the pitch information is not to be confined to the above-mentioned method of detecting them simply by a rising tendency or a falling tendency. Other methods, such as a comparison with a standard pattern, are possible.

Figure 31:
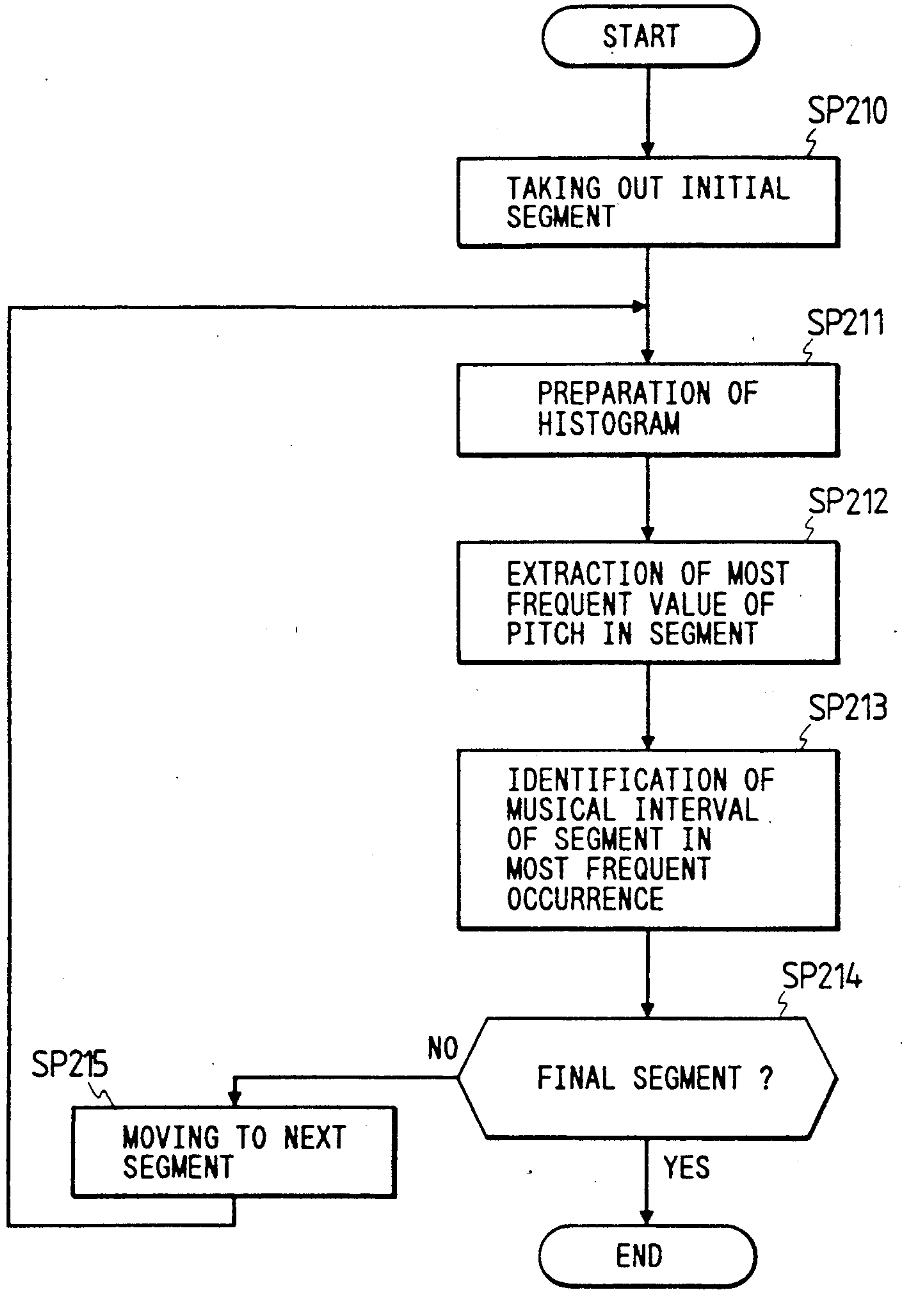
FIG. 31 is a flow chart illustrating an example of the musical interval identifying process according to the present invention.

Also, as explained in the following part, the process for identifying musical intervals may be executed from a different viewpoint (Refer to the step SP 7 in FIG. 3). An explanation is given about this point with reference to FIG. 31 and FIG. 32.

CPU 1 first retrieves the first segment out from those obtained by segmentation. CPU 1 then prepares a histogram for all the pitch information in the particular segment (Steps SP 210 and SP 211).

Thereafter, CPU 1 detects the value of the pitch information that occurs most frequently, i.e. the most frequent value, out of the histogram. CPU 1 identifies the musical interval of the particular segment with the musical interval on the axis of the absolute musical interval closest to the most frequently detected value (Steps SP 212 and SP 213). Moreover, the musical interval of each segment of an acoustic signal is identified with either one of the musical intervals on the axis of the absolute musical interval with a difference by a half step between them. CPU 1 then judges whether or not the segment identified with a musical interval by this process performed thereon is the final segment (Step SP 214). If it is found as the result that the process has been completed, CPU 1 finishes the particular processing program and, if the process has not been completed yet, CPU 1 retrieves the next segment for processing and returns to the above-mentioned step, SP 211 (Step SP 215).

By repeating a processing loop consisting of these steps, SP 211 to SP 215, the identification of the musical interval is performed on the basis of the information on the most frequent value of the pitch information in each particular segment.

Here, the pitch information on the most frequent value is used in this system for its identification of the musical intervals in view of the fact that the pitch information showing the most frequent value can be considered to correspond to the intended musical interval because it is considered that the acoustic signals, which have fluctuations, fluctuate in a range centering around the musical interval intended by the singer or the like.

Moreover, in order to use the pitch information showing the most frequent value for the identification of the musical interval of sound segments, it is necessary to use a large number of sampling steps, and it is necessary to select a period for obtaining a piece of pitch information from the acoustic signal (the analytical cycle). In selecting the period, care must be taken to assure that the identification process will be performed well.

Figure 32:
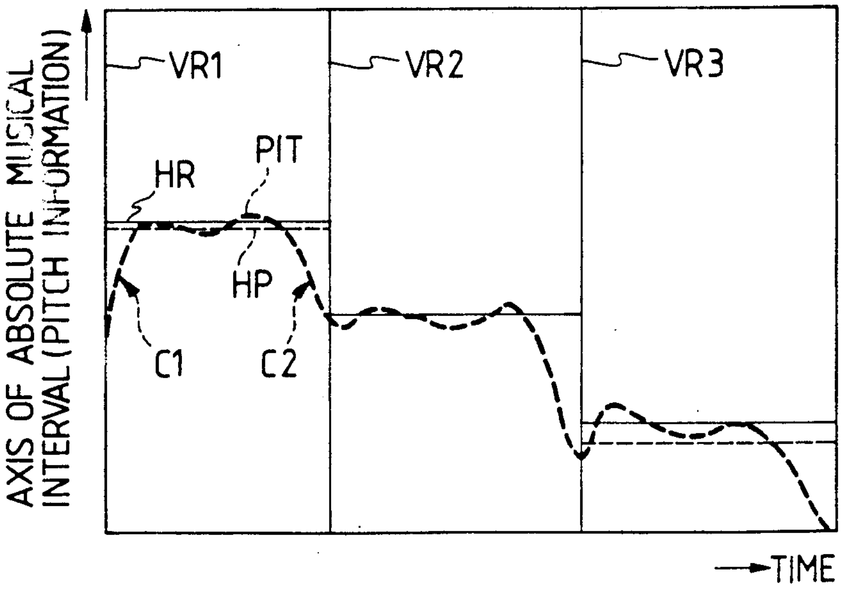
FIG. 32 is a schematic drawing illustrating one example of such a musical interval identifying process.

FIG. 32 shows an example of the identification of musical intervals by a process like this. The dotted-line curve PIT expresses the pitch information on the acoustic signal. The solid line VR in the vertical direction shows the division of the segment. The pitch information with the most frequent value for each segment in this example is represented by the solid line HP in the horizontal direction. The identified musical interval is shown by the dotted line HP in the horizontal direction.

As is evident from FIG. 32, the pitch information with the most frequent value has very minor deviation from the musical interval on the axis of the absolute musical interval and hence serves the purpose of performing the identifying process well. It is also understood clearly that this method is capable of identifying the musical intervals without being affected by the instability in the state of pitch information (for example, the curved sections C1 and C2) in the proximity of the segment division. Therefore, by the embodiment mentioned above, it is possible to determine the musical intervals with a high degree of accuracy because the most frequent value is extracted out of the pitch information on each segment and the musical interval of the segment is identified with such a musical interval on the axis of the absolute musical interval as is closest to the most frequent value in the pitch information. Moreover, prior to the identification of the musical interval, a tuning process is applied to the acoustic signals, the pitch information with the most frequent value as processed by this method assumes the value closest to the musical interval on the axis of the absolute musical interval, making it very easy to perform the identifying process.

Figure 33:
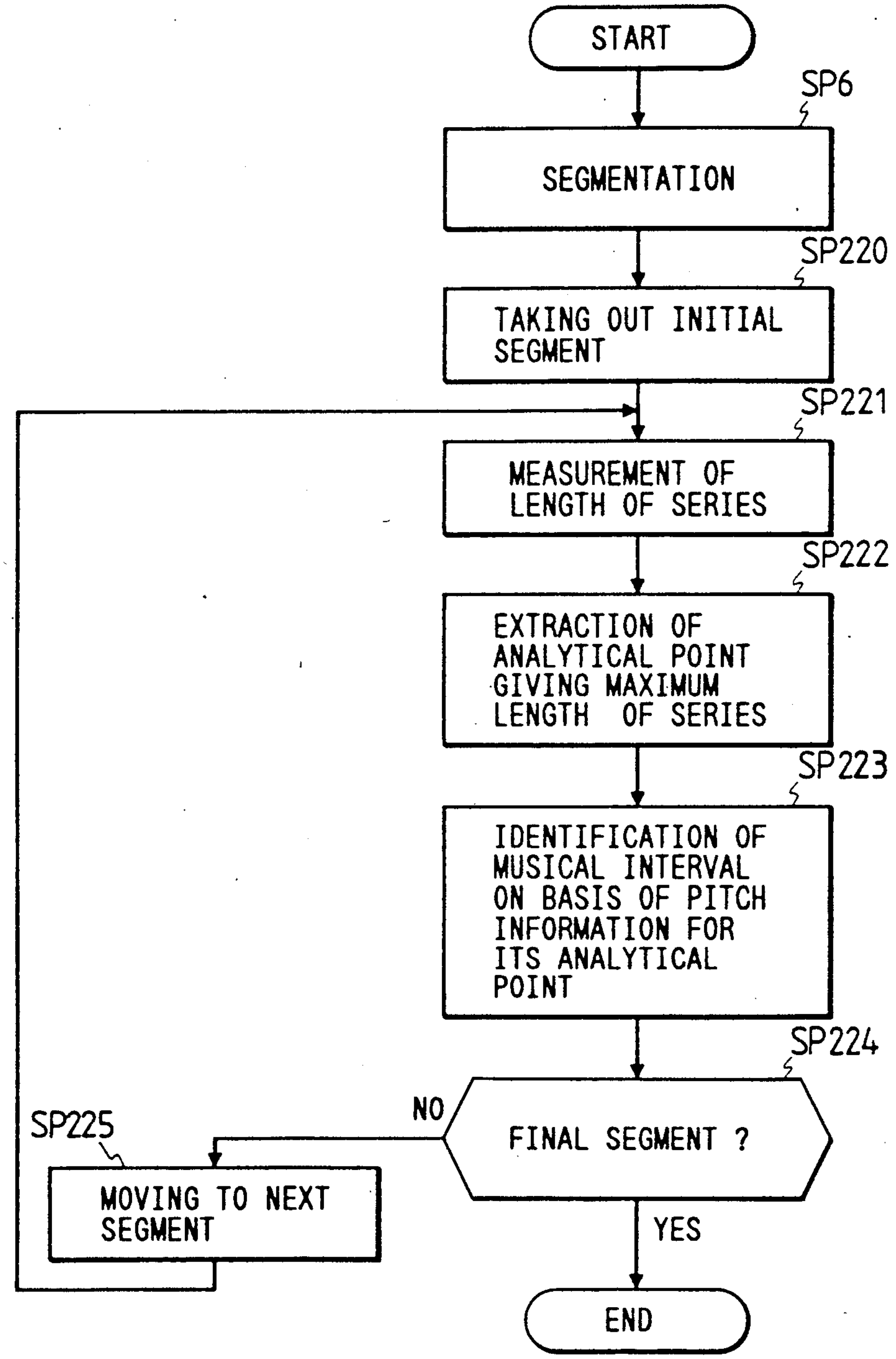
FIG. 33 is a flow chart illustrating an example of the musical interval identifying process according to the present invention.

Also, it is possible to execute the process for the identification of the musical intervals by the processing procedure described below. Now, with regard to this process, an explanation is given with reference to FIG. 33 to FIG. 35.

CPU 1 first retrieves the initial segment from those segments obtained by the segmentation process (Step SP 6 in FIG. 3). CPU 1 then calculates the series length, run(t), with respect to each analytical point in the segment (Steps SP 220 and SP 221).

Figure 34:
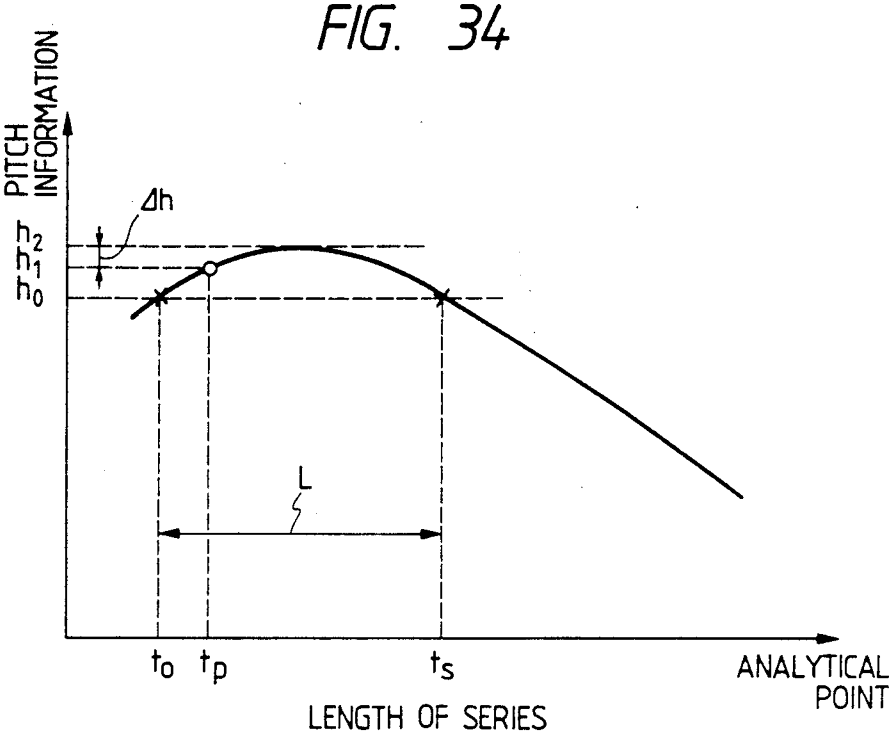
FIG. 34 is a chart for explaining the length of the series applicable to the present invention.

Here, an explanation is given about the length of a series with reference to FIG. 34. The chronological change in the pitch information is presented in FIG. 34, in which the analytical points t are expressed along the horizontal axis while their pitch information is given on the vertical axis. As an example, the length of a series at the analytical point tp is explained below.

The range of the analytical point tp which assumes the value between the pitch information h0 and h2 with a deviation by a very minor range $\Delta h$ upward or downward is determined to be the range from the analytical point t0 to the analytical point ts as shown in FIG. 34. The period L from this analytical point t0 to the analytical point ts is to be referred to as the length of the series from the analytical point tp.

When the length of the series, run(t), is worked out by calculation in this manner with respect to all the analytical points in the segment, CPU 1 extracts the analytical point where the length of the series, run(t), is the longest (Step SP 22). Thereafter, CPU 1 takes out the pitch information at the analytical point which gives the longest length of the series, run(t). CPU 1 then identifies the musical interval of the particular segment with the musical interval on the axis of the absolute musical interval closest to this pitch information (Step SP 223). The musical interval of each of the segments of the acoustic signals is identified with either one of the musical intervals differing from one another by half a step on the axis of the absolute musical interval.

Next, CPU 1 judges whether or not the segment identified with a musical interval as the result of this process is the final segment (Step SP 224). If CPU 1 finds that the process has been completed, it finishes the particular processing program. If the process is not yet completed, it retrieves the next segment for processing and returns to the above-mentioned step 221 (Step SP 225).

With the repetition of the processing loop consisting of the steps SP 221 to SP 225 in this manner, CPU 1 executes the identification of the musical intervals on the basis of the pitch information on the analytical point which gives the length of the longest series in the segment with respect to all the segments.

In this regard, the system utilizes the length of the series, run(t), in the process for identifying the musical intervals because it has been ascertained that there is a very high degree of correlation between the pitch information for the analytical point giving the length of the longest series and the intended musical scale. Even though acoustic signals have fluctuations, they fluctuate within a narrow range in case the singer or the like intends to produce the same musical interval.

Figure 35:
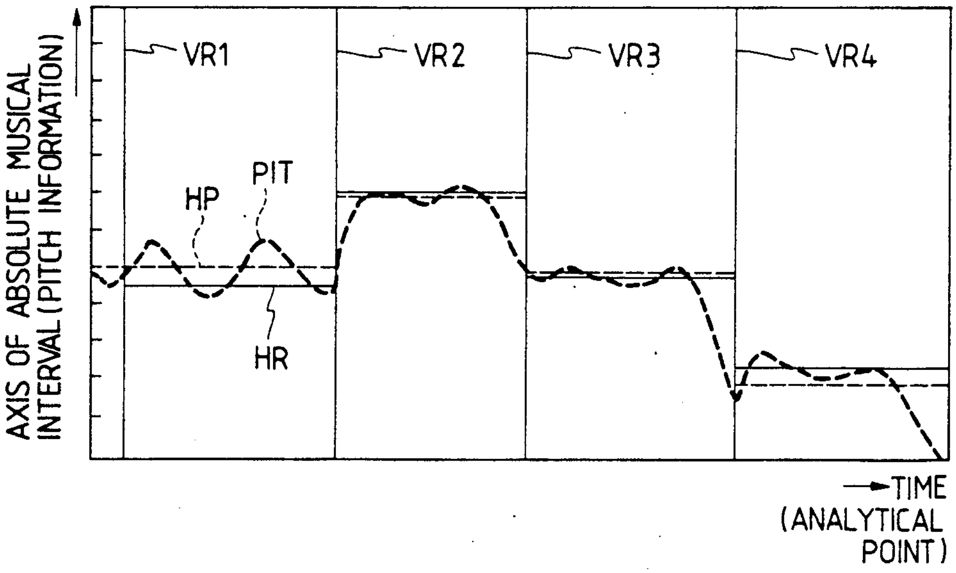
FIG. 35 is a schematic drawing illustrating one example by such a musical interval identifying process.

In FIG. 35, an example is given for the identification of the musical intervals of the input acoustic signals by this process.

In FIG. 35, the distribution of the pitch information in respect of the analytical cycle is shown by a dotted-line curve PIT. The vertical lines VR1, VR2, VR3 and VR4 represent the divisions of segments as established by the segmentation process while the solid line HR in the horizontal direction expresses the pitch information on the analytical point which gives the length of the longest series in that segment. Moreover, the dotted line HP represents the musical interval identified by the pitch information. As it is evident from this FIG. 35, the pitch information which gives the length of the longest series has a very minor deviation in relation to the musical interval on the axis of the absolute musical interval, and it is thus understood that this method is capable of identifying the musical intervals well.

Accordingly, the embodiment described above performs the identification of the musical intervals with fewer errors because it identifies the musical interval of each segment on the basis of the section where the change in the pitch information in the segment is small and in continuum (i.e. the section where the change in the musical interval is small). The musical interval is found by extracting the analytical point where the length of the series (found with respect to the analytical point for each segment) is the largest.

CORRECTION OF IDENTIFIED MUSICAL INTERVAL

Figure 36:
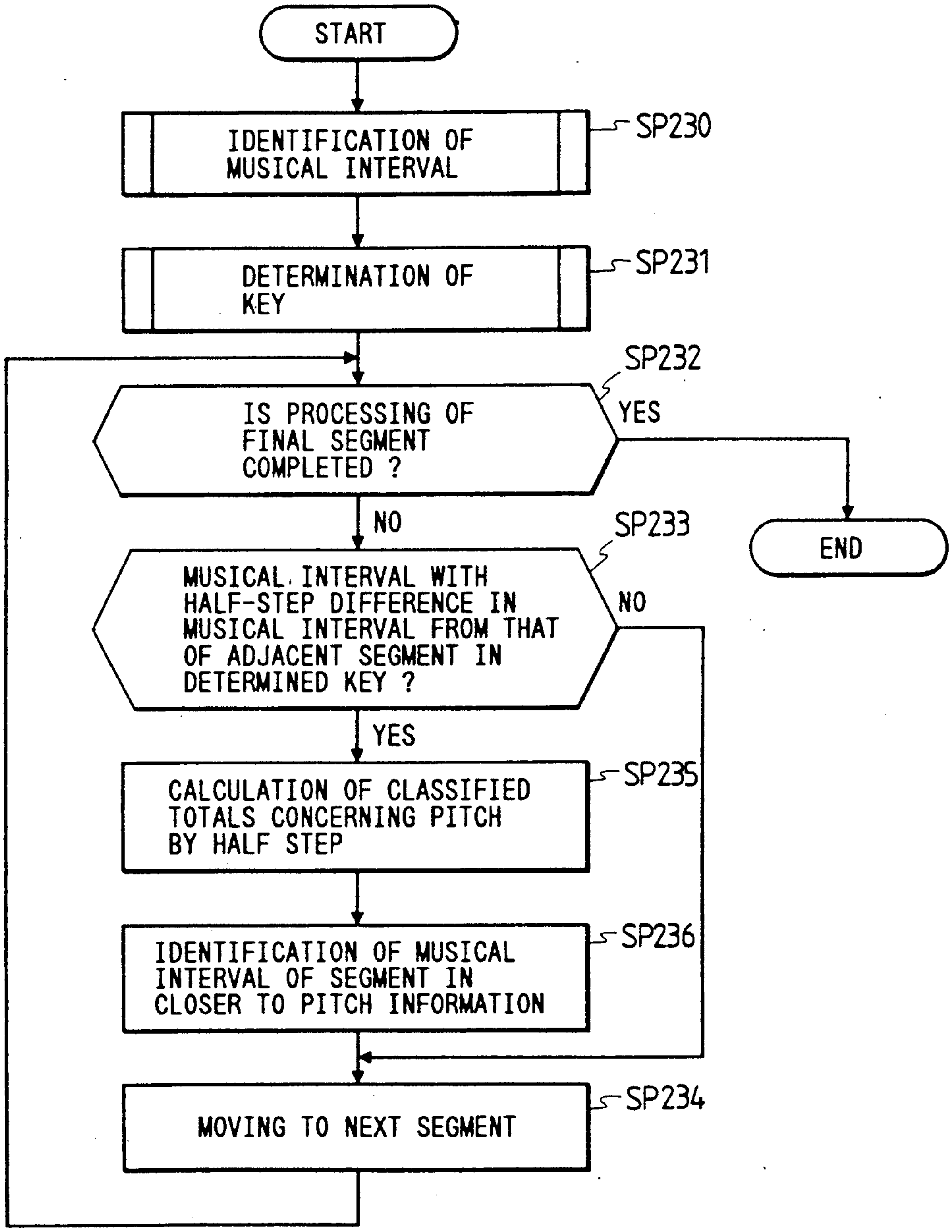
FIG. 36 is a flow chart illustrating an example of the process for correcting the identified musical interval according to the present invention.

Next, a detailed description is presented, with reference to the flow chart in FIG. 36, about the process (the step, SP 10, in FIG. 3) for correcting the musical intervals identified by the musical interval identifying process at the above-mentioned step, SP 7.

Before executing such a process for correcting the musical intervals, CPU 1 first obtains, for example, the average value of the pitch information in the particular segment, with respect to the segments obtained by segmentation. CPU 1 then identifies the musical interval of the segment with the musical interval with a difference by a half step on the axis of the absolute musical interval closest to the average value obtained of the pitch information in the segment (Step SP 230). CPU 1 thereafter prepares a histogram with regard to the twelve-step musical scale for all the pitch information. The histogram is prepared by finding the weighing coefficient determined for each step in the musical scale using the key and using its product sum with the frequency of occurrence of each musical scale. CPU 1 the determines the key of the particular acoustic signal to be the key which gives the maximum product sum. (Step SP 231).

In the correcting process, CPU 1 first ascertains that the processing of the final segment has not been completed yet, and then, judging whether or not the musical interval identified for the segment taken as the object of the processing is any of those musical intervals (for example, mi, fa, si, do, if on the C-major key) which are different by a half step from the musical intervals mutually adjacent on the musical interval on the determined key. If it is different, CPU 1 retrieves the next segment for processing, without making any correction of the musical interval, and returns to the step, SP 232 (Steps SP 232 to SP 234).

On the other hand, if the identified musical interval in the segment being processed is any of those musical intervals, CPU 1 works out the classified totals of the items of the pitch information existing between the identified musical interval of the segment and the musical interval different therefrom by a half step on the musical scale for the key so determined (Step SP 235). For example, if the musical interval for the segment being processed is "mi" on the C-major key, CPU 1 finds the distribution of the pitch information present between the sets of information respectively corresponding to "mi" and "fa" in the particular segment being processed. It follows from this that the pitch information not present between these half steps will not be calculated for determining the classified total, even if it is part of the pitch information within this segment. Then, CPU 1 finds whether there are more items of pitch information larger than the pitch information on this half-step intermediate section or whether there are more items of pitch information smaller than the pitch information on this half-step intermediate section. CPU 1 identifies the musical interval which is closer to the pitch information present in a greater number of items on the axis of the absolute musical interval as the musical interval for the segment (Step SP 236).

Upon completion of the review and correction of the results of the identification process, the CPU retrieves the next segment for processing and returns to the above-mentioned step, SP 232.

It is in view of the greater possibility of mistakes in identification due to the difference by a half step from the adjacent musical intervals that the system reviews the musical intervals in case the identified musical intervals are those with a half-step difference from the adjacent musical intervals on the key determined for them.

With the repetition of the above-mentioned process, thereby executing the review of the musical intervals with respect to all the segments until the review of the final segment is completed, CPU 1 obtains an affirmative result at the step SP 232 and finishes the particular processing program.

Figure 37:
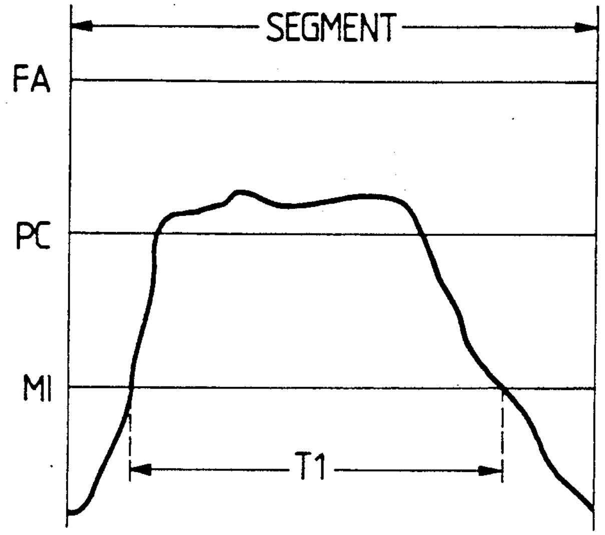
FIG. 37 is a schematic drawing explaining such a correcting process for the identified musical interval.

FIG. 37 shows one example of the correction of a once identified musical interval. In the example, the determined key is the C-major key and the musical interval identified on the basis of the average value of the pitch information is "mi". This segment is put to the correcting process because its identified musical interval is "mi". The pitch information present between "mi" and "fa" (only the pitch information in the period T1) is processed to determine the classified totals. The pitch information upward and downward of the pitch information value PC for the section intermediate between "mi" and "fa" is also calculated to work out the classified total. Because the pitch information greater than the pitch information value PC is predominant in this period T1, the musical interval of this segment is re-identified with the musical interval for "fa".

Therefore, the embodiment given above is capable of accurately identifying the musical interval of each segment because it performs a more detailed review of the musical interval of the segment in the case of any musical interval in which the difference between the adjacent musical intervals is a half step on the key determined for the identified musical interval. Although, the embodiment given above identifies a segment with the musical interval to which the average value of the pitch information is found to be closest, it is also possible to apply a similar manner of review to those musical intervals identified by another method of identifying musical intervals.

Also, the above-mentioned embodiment has been designed to re-identify the musical intervals, depending on the relative volume of the larger pitch information and the smaller pitch information than the pitch information in the section intermediate between the two segments taken as the objects of the review. Another method may, however, be employed to conduct such a review. For example, the review may be done on the basis of the average value or on the basis of the most frequent value of the pitch information present in the section between the two musical intervals taken as the objects of such a review out of the pitch information on the particular segment being processed.

PROCESS FOR DETERMINING A KEY

Figure 38:
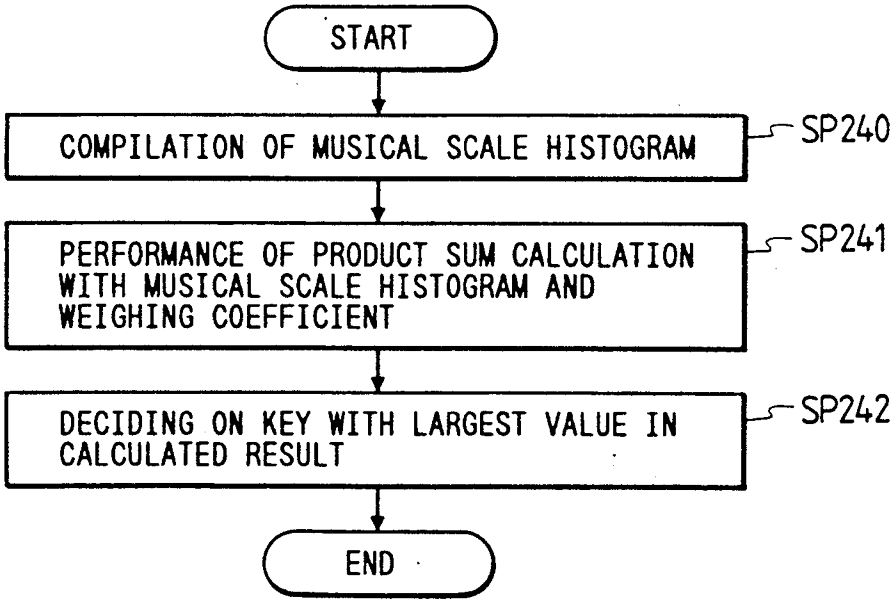
FIG. 38 is a flow chart illustrating an example of the key determining process according to the present invention.

Next, a detailed description of the process for determining the key inherent in the acoustic signals (Step SP 9 in FIG. 3) is provided (with reference to the flow chart in FIG. 38).

CPU 1 develops histograms on the musical scale from all the pitch information as tuned by the above-mentioned tuning process (Step SP 240). The "musical scale histogram" means the histograms relating to the twelve musical scales on the axis of the absolute musical interval, i.e. those in "C (do)," "C sharp: D flat (do#: reb)," "D (re),". . . , "A (la)," "A sharp: B flat (la#: sib)," "B (si)." In case the pitch information is not present on the axis of the absolute musical interval, the histograms represent the classified totals of the values as allocated to those musical scales on the two musical intervals on the axis of the absolute musical interval to which the pitch information is closest in proportion to the distance to those intervals. For this reason, the musical interval which is different by one octave is to be treated as the same musical interval.

Next, CPU 1 obtains product sum of the weighing coefficients as illustrated in FIG. 39. The product sum is determined by the respective keys and the above-mentioned musical scale histograms with respect to all of the 24 keys in total, which are the twelve major keys, "C major," "D flat major," "D major,". . . , "B flat major," "B major," and the twelve minor keys, "A minor," "B flat minor," "B minor,". . . , "G minor," "A flat minor" (Step SP 241).

Moreover, FIG. 39 indicates the weighing coefficient for "C major" in the first column, COL 1, that for "A minor" in the second column, COL 2, that for "D flat major" in the third column, COL 3, and that for "B flat minor" in the fourth column, COL 4. For the other keys, the system applies the same process, using the weighing coefficient, "202021020201," as from the keynote (do) for the major keys and using the weighing coefficient, "202201022010," as from the keynote (la) for the minor keys.

Here, the weighing coefficients are determined in such a way that a weight other than "0" is given to those musical intervals which can be expressed without the temporary signatures (#, b) for the particular key. A "2" is used for the matching of the pentatonic and septitonic musical scales in the major keys and the minor keys, i.e. for the musical scales in which there will be an agreement in the musical interval difference from the keynote when the keynotes are brought into agreement between a major key and a minor key. A "1" is used for the musical scales with no agreement of the difference in musical interval. These weighing coefficients correspond to the degrees of importance of the individual musical intervals in the particular key.

When CPU 1 has obtained the product sums for all the 245 keys in this manner, it determines the key in which the product sum is the largest to be the key for the particular acoustic signals. It then finishes the particular process for determining the key (Step SP 242).

Therefore, the embodiment mentioned above prepares histograms for musical scales, captures the frequency of occurrence in respect of the musical scales for the individual musical intervals, finds the product sum with the weighing coefficient as the parameter of importance for the musical interval to be determined in accordance with the frequency of occurrence and the key, and determines the key in which the product sum is the largest as the key for the acoustic signals. Consequently the system is capable of accurately determining the key for such signals and reviewing the musical intervals identified on the basis of such a key, thereby making a further improvement on the accuracy of the musical score data.

It should be noted that the weighing coefficients are not confined to those cited in the embodiment mentioned above. It is feasible, for example, to give a heavier weight to the keynote.

Figure 40:
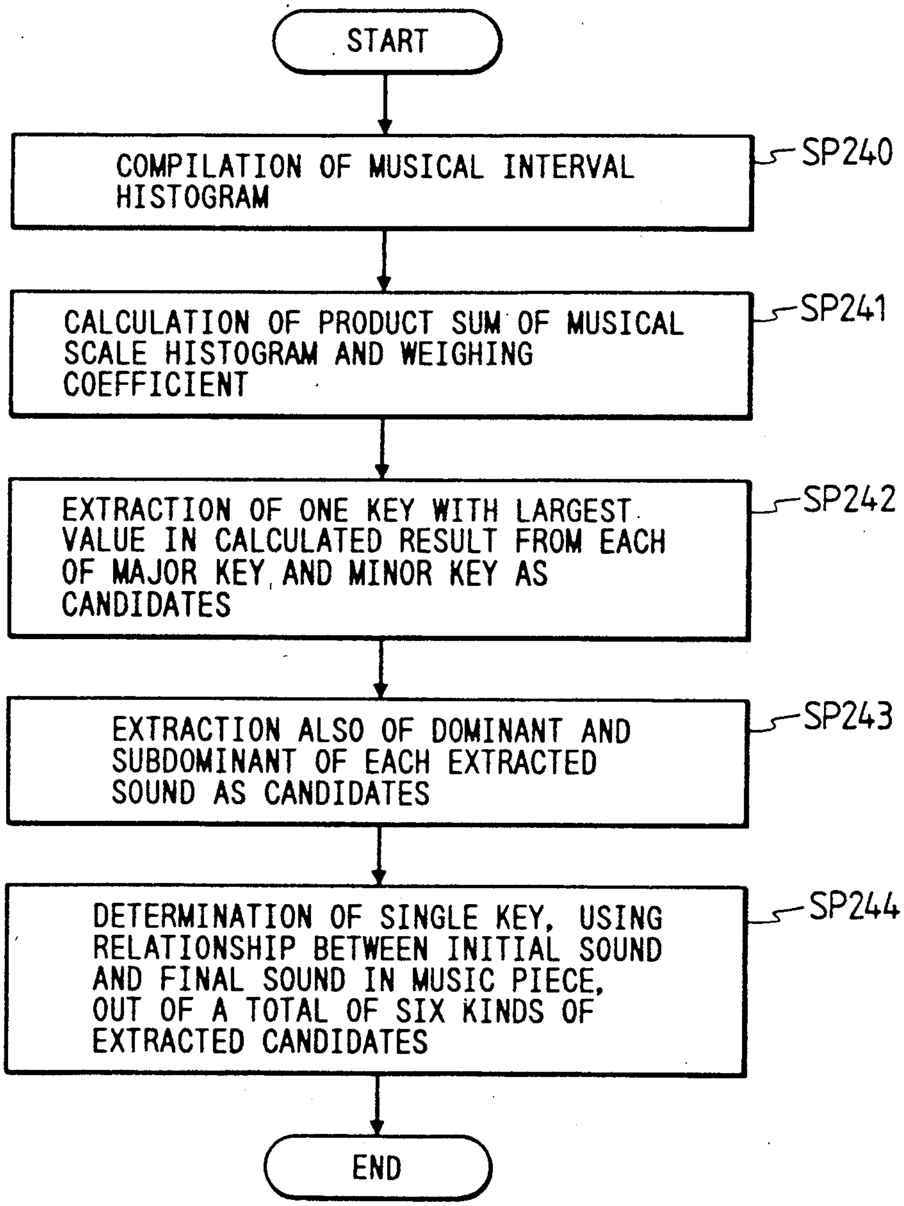
FIG. 40 is a flow chart illustrating an example of the key determining process according to the present invention.

Similarly, the means of determining the key are not limited to those mentioned above. The determination of the key may be executed by the processing procedure shown in FIG. 40. A detailed explanation of this procedure has been omitted because the steps of the procedure are the same as those of the procedure shown in FIG. 38 (up to the step, SP 241).

When CPU 1 obtains the product sums for the 24 keys at the step, SP 241, it extracts the key with the largest product sum for the major key and the key with the largest product sum for the minor key, respectively (Step SP 243). Thereafter, CPU 1 extracts the key in which the dominant key (the key higher by five degrees from the keynote) in the candidate key is the keynote for the extracted major key. CPU 1 also extracts they key in which the dominant key (i.e. the key higher by five degrees from the keynote) in the candidate key is the keynote for the extracted minor key. CPU 1 also extracts the key in which the subdominant key (i.e. the key lower by five degrees from the keynote) in the candidate key is the keynote for the extracted minor key (Step SP 244).

CPU 1 finally determines the proper key by selecting one key out of a total of the six candidate keys extracted in this way on the basis of the relationship between the initial note (i.e. the musical interval of the initial segment) and the final note (i.e. the musical interval of the final segment) (Step SP 245).

The system therefore does not determine the key having the largest product sum at once as the key of the acoustic signal. The reason is that the keynote, the dominant note, and the subdominant note frequently occur in the melody of a piece of music. It may be quite frequent in some cases for the dominant note and the subdominant note to be generated from the keynote. In these cases, the determination of the key merely by the largest value for the product sum could result in the determination not of the real key but of the key in which the dominant note or the subdominant note in the real key serves as the keynote. Therefore, now that it is found from an empirical rule that the initial sound and final sound in a piece of music have a unique relationship respecting the key, the present invention makes the final determination of the key on the basis of this relationship. In the case of the C major key, for example, it is observed that music frequently starts with either one of the notes, "do," "mi," and "so" and ends with "do". In the other keys, music often ends with the keynote.

Therefore, the system according to the embodiment given above is capable of accurately determining the key, reviewing the musical interval identified on the basis of such a key, and further improving the accuracy of the musical score data. The improvement is due to the fact that the invention prepares musical scale histograms, thereby capturing the frequency of occurrence of each musical scale. Through the use of histograms, the product sum with weighing coefficient is determined to be the parameter for the degree of importance of the musical scales as determined in accordance with the frequency and the key. Through the use of histograms, six candidate keys are extracted on the basis of the product sum. Through the use of histograms the key (with reference to the initial note and final note in the piece of music) is finally determined.

Although the embodiment mentioned above obtains a total of six candidate keys through its extraction of the key with the maximum product sum for the major key and the minor key, respectively, another feasible embodiment would involve determining the key out of a total of three candidate keys to be extracted without any regard to the distinction between the major key and the minor key.

TUNING PROCESS

Figure 41:
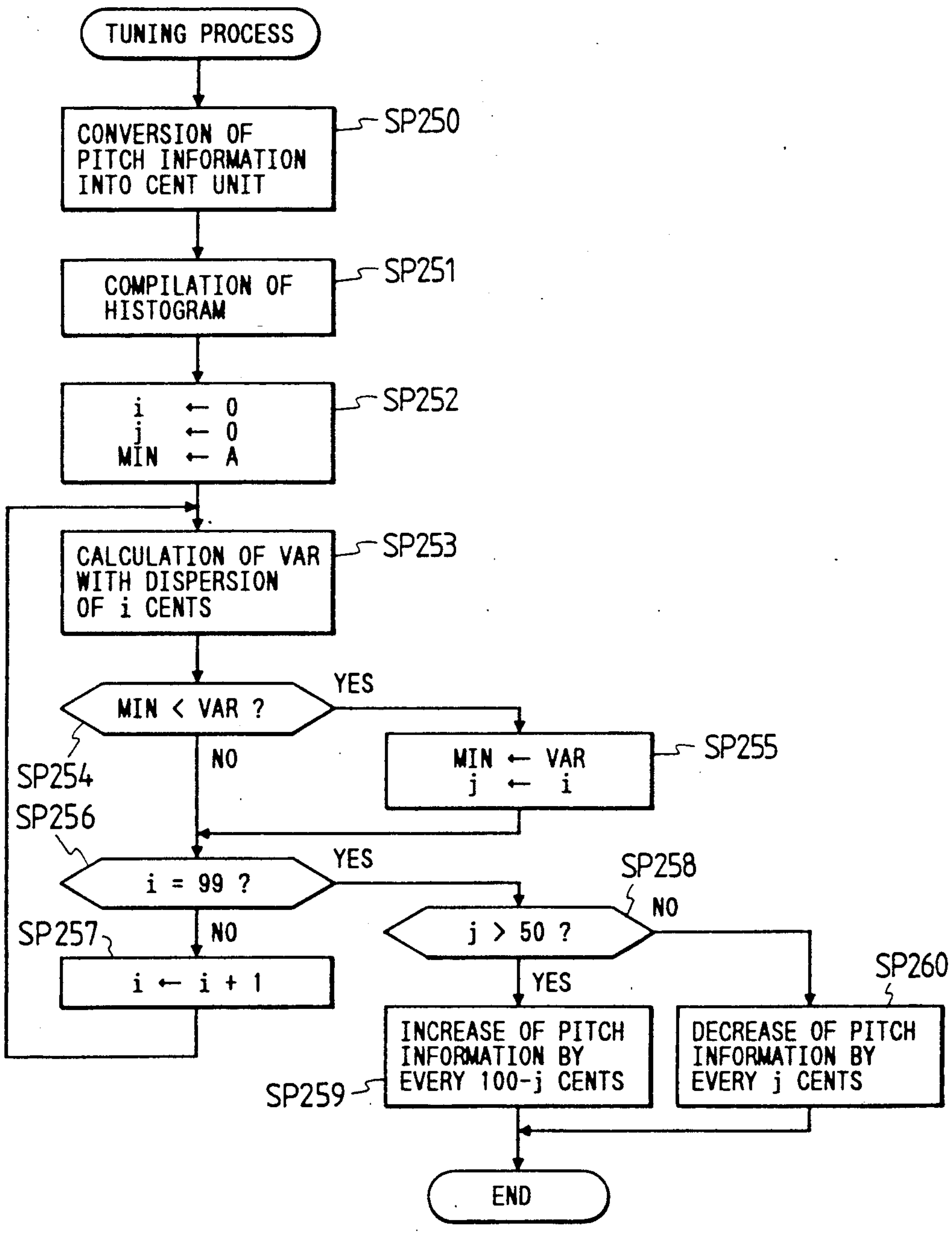
FIG. 41 is a flow chart illustrating an example of the tuning process according to the present invention.

Next, a detailed description is presented with reference to the detailed flow chart in FIG. 41 outlining the tuning process (Step SP 3 in FIG. 3).

CPU 1 first converts the input pitch information expressed in Hz (which is a unit for frequency) into pitch data expressed in cent (a value derived by multiplying by 1,200 the ratio of the frequency of a given musical interval to the standard musical interval as expressed in terms of a base 2 logarithm. Cent is a unit for the musical scale (Step SP 250). A difference of 100 cents corresponds to a half-step difference in the musical interval.

Figure 42:
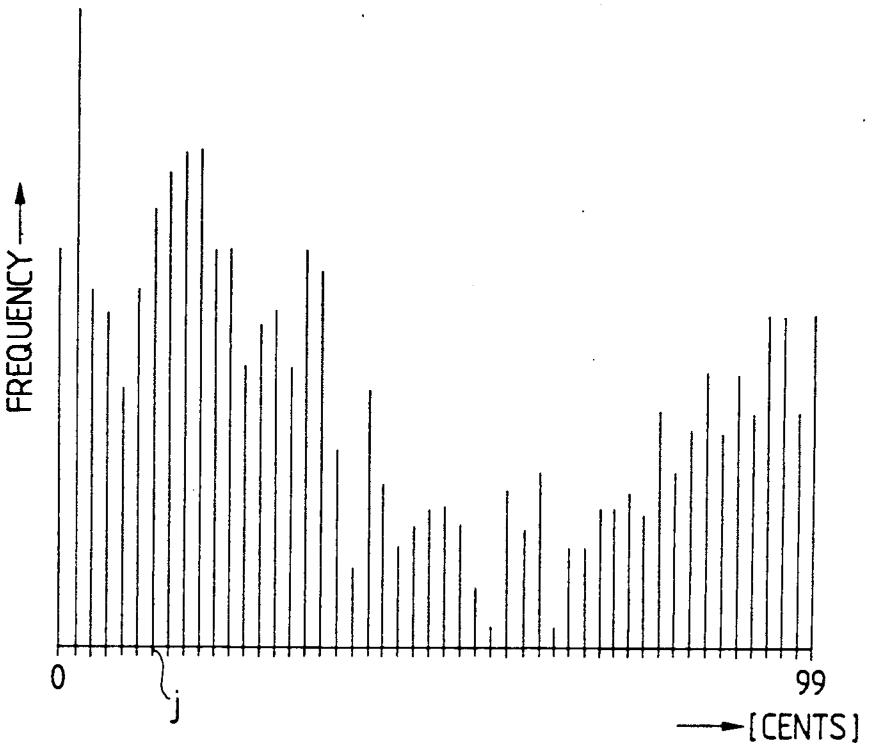
FIG. 42 is a histogram showing the state of distribution of the pitch information.

CPU 1 then prepares a histogram (like the one shown in FIG. 42) by calculating the classified totals of the individual sets of pitch data using identical numerical values forming the lowest two digits of the cent values (Step SP 251). More specifically, CPU 1 performs arithmetic operations to work out the classified totals. CPU 1 treats data with cent values of 0, 100, 200, . . . identically, data with cent values of 1, 101, 201, . . . identically, and data with cent values of 2, 102, 202, . . . identically, until it completes the calculation and finds the classified totals of the group of data with the cent values of 99, 199, 299, . . . Thus, the system develops a histogram for the pitch information with a full-width of 100 cents varying by one cent as illustrated in FIG. 42.

At this juncture, the pitch information different by every 100 cents but calculated identically by the calculation of the classified totals contains differences by the integral times of the half step. The acoustic signals take the half step and the full step as the standards for a difference in the musical interval. Hence, histograms developed by this system do not assume any uniform distribution. Rather, they indicate the peak of frequency in the proximity of the cent value which corresponds to the axis of musical interval held by the singer or by the particular musical instrument.

Next, CPU 1 clears parameters i and j to zero and sets the parameter MIN at A (a sufficiently large value) (Step SP 252). Then, CPU 1 performs arithmetic operations for determining a statistical dispersion, VAR' (centering around the cent value i) using the histogram information obtained (Step SP 253). After that, CPU 1 judges whether or not the dispersion value VAR obtained by the calculation is larger than the parameter MIN. It renews the dispersion value VAR to the value of the parameter MIN in case the VAR value is smaller than the parameter. It also modifies the parameter j to assume the value of the parameter i, thereafter proceeding to the step, SP 256. If the VAR value is larger than the parameter MIN, CPU 1 proceeds immediately to the step, SP 256, without performing the renewal operation (Steps SP 254 to SP 256). After that, CPU 1 judges whether or not the parameter i has the value 99, and, in case it is different in value, it increments the parameter i, thereafter returning to the above-mentioned step, SP 253 (Step SP 257).

In this manner, CPU 1 obtains the cent information (j) with the minimum dispersion from the classified total information obtained on the pitch information. Here, since the dispersion around the cent information is the smallest, it can be judged to be a cent group (j, 100+j, 200+j, . . .) by every half step forming the center of the acoustic signal. In other words, it can be interpreted that the cent group expresses the axis of the musical interval for the singer or the musical instrument.

Therefore, CPU 1 slides the axis of the musical interval by the value of this cent information, thereby fitting this axis into that of the absolute musical interval. First, CPU 1 judges whether or not the parameter j is smaller than 50 cents, (to which of the axes of the absolute musical interval, that of the higher tones or that of the lower tones). If the parameter j is closer to the higher-tone axis, CPU 1 modifies all the pitch information by sliding it towards the higher-tone axis by the obtained value of the cent j. If the parameter j is closer to the lower-tone axis, CPU 1 modifies all the pitch information by sliding it towards the lower-tone axis by the value obtained of the cent j (Step SP 258 to SP 260).

In this manner, the axis of the acoustic signals is fitted almost exactly into the axis of the absolute musical interval, and the pitch information developed in this way is used for the subsequent processes.

The embodiment mentioned above is capable of attaining higher accuracy in the musical score data to be obtained, regardless of the source of the acoustic signal, because the system does not apply the obtained information as is to the segmentation process or to such processes as that for identifying the musical intervals. Rather, this embodiment finds the classified totals by every half step on the same axis. In so doing, it detects the amount of the deviation from the axis of the absolute musical interval out of the information on the classified totals by applying the dispersion as the parameter and it modifies the axis of the musical interval for the acoustic signal by the amount of the deviation (so that the modified pitch information may be used for the subsequent processes).

Although the embodiment mentioned above presents a system which performs a tuning process on the pitch information obtained through autocorrelation analysis, the method of extracting the pitch information is, of course, not to be confined to this specific embodiment.

Wherein the above-mentioned embodiment the system obtains the axis of the musical interval for the acoustic signal by the application of dispersion, another statistical technique may also be applied to the detecting process for the axis.

Furthermore, although the embodiment given above uses cents as the unit for the pitch information (subjected to the statistical processing in the tuning process) the applicable units are not limited to this.

EXTRACTION OF PITCH INFORMATION

Next, a further description is given with regard to the extraction of pitch information (Refer to the step, SP 1, in FIG. 3) in an automatic music transcription system which performs musical score transcription by performing this process.

Figure 43:
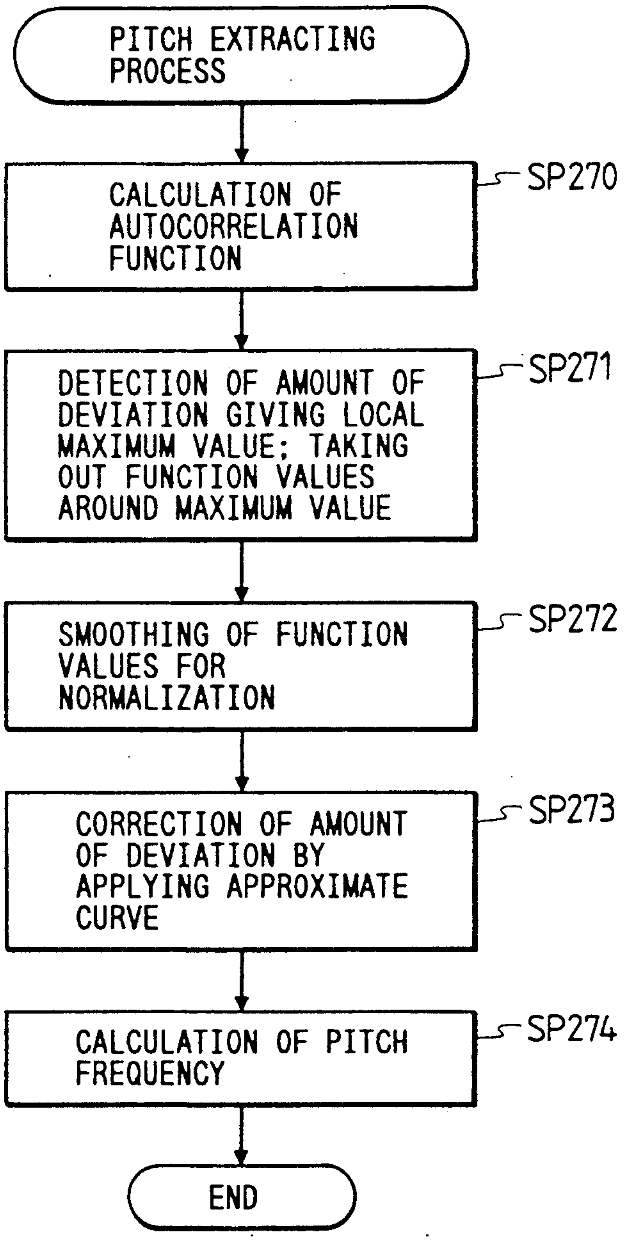
FIG. 43 is a flow chart showing an example of the pitch extracting process according to the present invention.

A detailed flow chart for such a process of extracting the pitch information is presented in FIG. 43. From the N-pieces of acoustic signal y(t) (t=0, . . . , N-1; where t expresses the sampling number with the sampling point s being set at 0) which is located inside the analytical windows at the noted sampling point s, CPU 1 finds the autocorrelation function $\phi(\tau)$ ($\tau=0, \ldots N-1$; $\mu=0, \ldots N-1-\tau$) as expressed in the following equation (Step SP 270):

$$\phi(\tau) = \sum_{n} y(u)\, y(u+\tau) \tag{4}$$

This equation expresses the above-mentioned acoustic signal, y(t), and the acoustic signal obtained by sliding the acoustic signal by the amount of $\tau$ pieces in relation to the noted sampling point s. The autocorrelation function curve obtained in this manner is presented in FIG. 44.

Next, CPU 1 detects the amount of deviation, z, which gives the maximum of the local maximum for the autocorrelation functions $\phi(\tau)$ by an amount of deviation other than 0 (the pitch cycle for the acoustic signal as expressed in terms of the scale for the sampling number) from the value of the autocorrelation functions $\phi(\tau)$ for the N-pieces. CPU 1 retrieves the autocorrelation functions, $\phi(z-1)$, $\phi(z)$, $\phi(z+1)$ regarding the three preceding and following amounts of deviation, $z-1$, z, $z+1$, in total, including this amount of deviation z (Step SP 271). CPU 1 then performs an interpolation process for normalizing these autocorrelation functions, $\phi(z-1)$, $\phi(z)$, $\phi(z+1)$ in the manner expressed in the following equations (Step SP 272):

$$p1=\phi(z-1)/(N-z+1) \tag{5}$$

$$p2=\phi(z)/(N-z) \tag{6}$$

$$p3=\phi(z+1)/(N-z-1) \tag{7}$$

Figure 44:
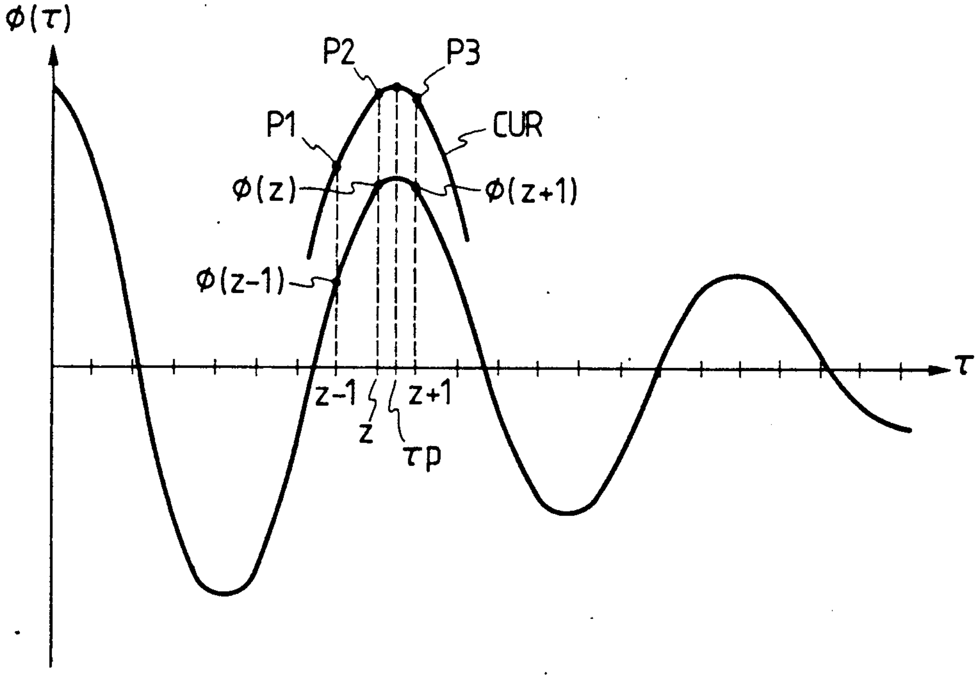
FIG. 44 is a schematic drawing presenting the autocorrelation function curves to be used for the pitch extracting process.

This procedure is employed because, due to the analytical windows provided here, the number of pieces to be added ($N-\tau$ pieces) in the calculation of the sum of products decreases as the amount of deviation $\tau$ becomes larger. If the arithmetic operations to find the autocorrelation functions according to the equation (4) were performed, the maximums for the autocorrelation function (which become equal when the amount of deviation $\tau$ is enlarged) would decline graduallywith time as shown in FIG. 44 under the influence of such a decrease in the number of pieces for addition. Therefore, the interpolation process for normalization is performed to eliminate such influence.

Then, CPU 1 obtains the pitch cycle $\tau p$ expressed for the acoustic signal on the scale of the sampling number as smoothed through arithmetic operations performed with the following equation (Step SP 273):

$$\tau p = z - (p3 - p1)/[2\{(p1 - p2)(p2 - p3)\}] \quad (8)$$

Equation (8) is to be used for calculating the amount of deviation, $\tau p$. $\tau p$, expressed on the scale of the sampling number giving the maximum value on parabola CUR (a parabola passing through the autocorrelation values for the amount of deviation z), represents the pitch cycle for the acoustic signal. $\tau p$ is expressed on the scale of the sampling number once obtained, and for the amounts of deviation, z−1, and z+1, respectively preceding and following the amount of deviation z (Refer to FIG. 44). In other words, the system extracts the amount of deviation which gives the maximum value out of the information contained in the parabola by drawing the parabola in approximation of the curve in the proximity of the first maximum value for the autocorrelation function $\phi(\tau)$.

This feature has been adopted in order to avoid the inadequacy that is has hitherto been impossible to extract the pitch information accurately because the pitch cycle (z) where the maximum value is the largest, if found, clarifies only its position in a sampling point. The conventional approach does not detect the local maximum when it exists between sampling points and the resulting information would contain errors because the autocorrelation function $\phi(\tau)$ was obtained at each sampling point.

Furthermore, since the autocorrelation function $\phi(\tau)$ can be expressed by a cosine function, which, with Maclaurin's expansion applied thereto, can be expressed in an even function, it is possible to express the same in a parabolic function if the terms above the fourth-degree can be ignored. Accordingly the amount of deviation which gives the local maximum can be found (with little impact from the actual amount of deviation), even if the amount of deviation is calculated by approximation in a parabola.

Next, CPU 1 calculates the pitch frequency fp from the pitch cycle $\tau p$ of the acoustic signal expressed with reference to the scale for the sampling number in accordance with the equation given in the following:

$$fp = fS/\tau p \quad (9)$$

CPU 1 then moves on to the next process (Step SP 274). Here fs represents the sampling frequency. Accordingly, the embodiment mentioned above finds the local maximum of the autocorrelation function even if the maximum is positioned between the sampling points. This embodiment accordingly extracts the pitch frequency more accurately in comparison with the conventional method without raising the sampling frequency. This system can more accurately execute subsequent processes such as segmentation, musical interval identification, and key determination.

In the embodiment given above, the interpolation process for normalization for eliminating the influence of the analytical windows is performed prior to the interpolation of the pitch cycle. It is, however, also acceptable to make the interpolation of the pitch cycle while omitting such a normalizing process.

It also should be noted that although an embodiment described above performs the correction of the pitch cycle by applying a parabola, such a correction may be made with another function. For example, such a correction may be made with an even function of the fourth degree by applying the autocorrelation functions for the five preceding and following points of the amount of deviation corresponding to the once obtained pitch frequency.

Figure 45:
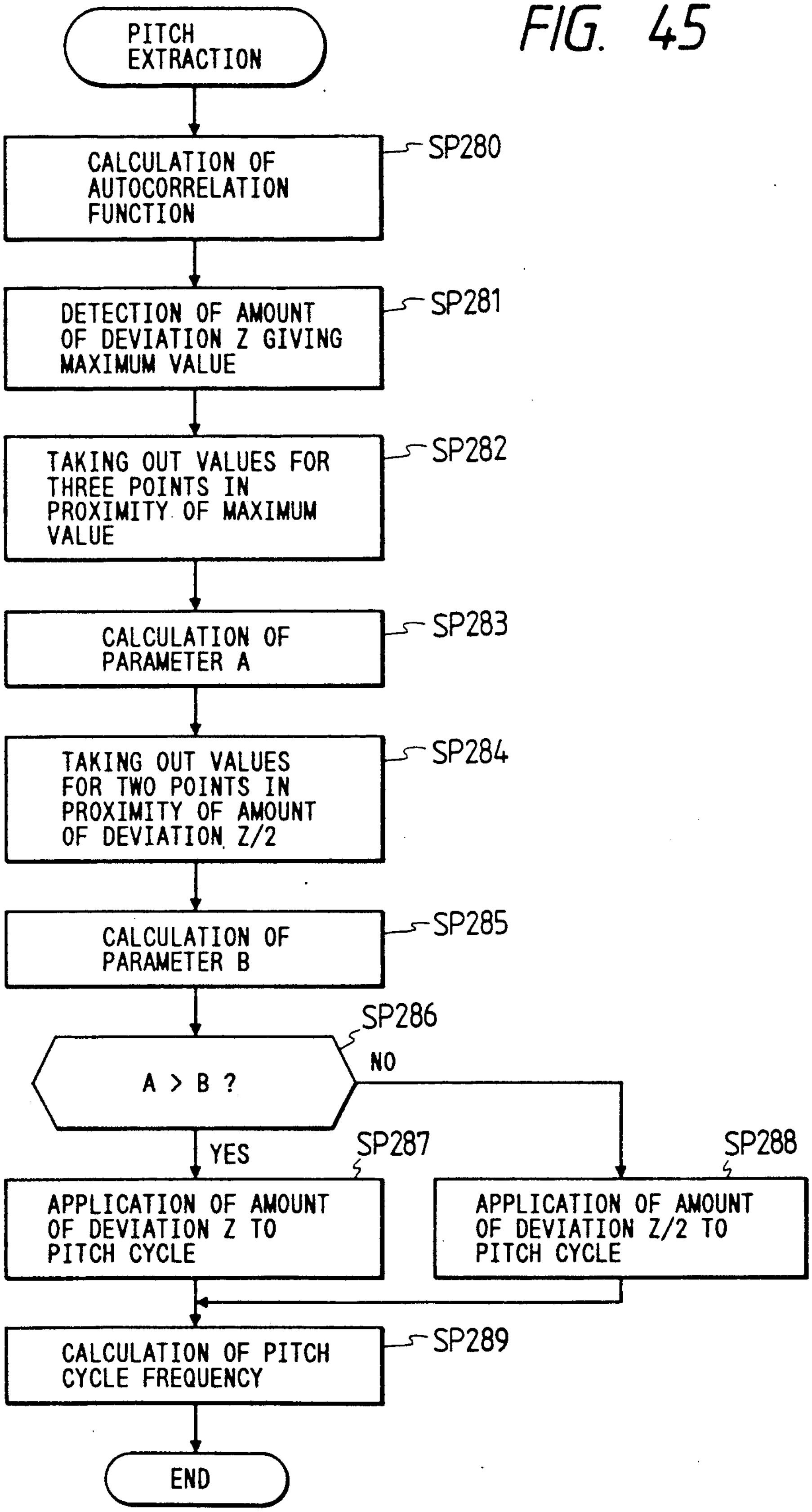
FIG. 45 is a flow chart illustrating an example of the pitch extracting process according to the present invention.

Moreover, the process for extracting the pitch information (Step SP 1 in FIG. 3) may be performed by the procedure shown in the flow chart in FIG. 45. From the N-pieces of acoustic signal y(t) (t=0, . . . , N−1; where t expresses the sampling number with the sampling point s being et at 0) (the N pieces are located inside the analytical windows at the noted sampling point s) and the subsequent sampling points, CPU 1 finds the autocorrelation function. CPU 1 finds by arithmetic operation the autocorrelation function $\phi(\tau)$ ($\tau$=0, . . . , N−1; u=0, . . . , N−1−$\tau$) expressed in the equation (4) (step SP 280).

Figure 46A:
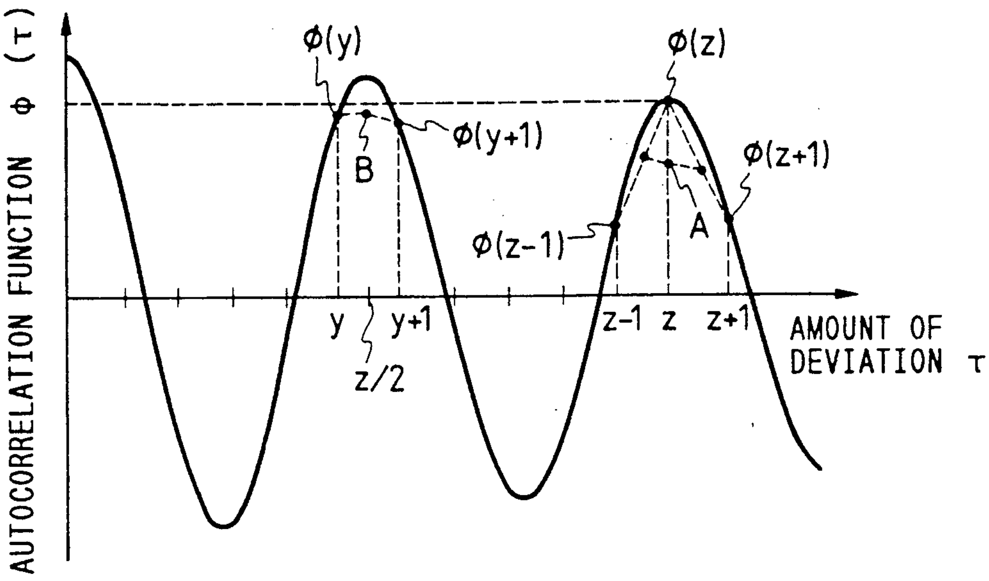
FIG. 46 is a schematic drawing showing the autocorrelation function curves used in the pitch extracting process.
Figure 46B:
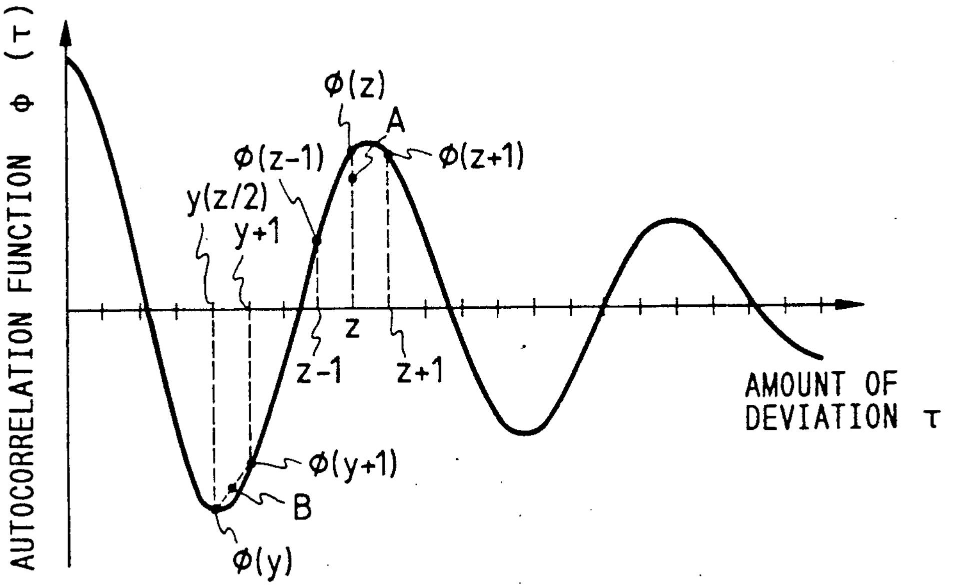

The equation (4) expresses the above-mentioned acoustic signal, y(t), and the acoustic signal obtained by sliding the acoustic signal by the amount of $\tau$ pieces in relation to the noted sampling point s. Moreover, the autocorrelation function curve obtained in this manner is presented in FIGS. 46A and 46B, respectively.

Next, CPU 1 detects the amount of deviation, z. The amount of deviation z defines the maximum value for the autocorrelation functions $\phi(\tau)$ by an amount of deviation other than 0 (i.e. the pitch cycle for the acoustic signal as expressed in terms of the scale for the sampling number) from the values of the N-pieces of the autocorrelation functions $\phi(\tau)$ (Step SP 281).

Thereafter, CPU 1 retrieves the autocorrelation functions, $\phi(z-1)$, $\phi(z)$, $\phi(z+1)$ for the three preceding and following amounts of deviation, z−1, z, z+1, including this amount of deviation z and calculates the parameter A expressed in the following equation (Steps SP 282 and SP 283). The parameter A is the weighing average for the autocorrelation functions, $\phi(z-1)$, $\phi(z)$, and $\phi(z-1)$.

$$A = \{\phi(z-1+2\phi(z)+\phi(z+1)\}/4 \quad (10)$$

CPU 1 then retrieves the autocorrelation functions, $\phi(y)$ and $\phi(y+1)$, for the amounts of deviation y and y+1, which are closest to the one half amount of deviation, z/2, for the amount of deviation, z. CPU 1 then determines parameter B expressed according to the following equation:

$$B = \{\phi(y)+\phi(y+1)\}/2 \quad (11)$$

(Steps SP 284 and SP 285). Parameter B represents the average of the autocorrelation functions, $\phi(y)$ and $\phi(y+1)$. After that, CPU 1 compares both parameters A and B to determine which has the larger value. If parameter A is larger than the parameter B, CPU 1 selects the amount of deviation z as the amount of deviation $\tau p$ (Steps SP 286 and SP 287). On the other hand, if parameter B is larger than parameter A, CPU 1 selects the amount of deviation, z/2, as the amount of deviation $\tau p$ corresponding to the pitch (Step SP 288).

In view of the observation that the autocorrelation function in the proximity of the second local maximum point is detected as the function which gives the maximum value (provided that the amount of deviation two times as large as the amount of deviation which gives the real maximum value coincides almost exactly with the sampling point and that the amount of deviation which gives the real maximum value), the system does not use the amount of deviation which gives the maximum value for the autocorrelation function directly as the pitch cycle. This is done so that it may be judged on the basis of the relative size of the parameters A and B may be used for finding whether or not the information being processed is such a case as mentioned above and that one half of the amount of deviation is to be taken as that corresponding to the pitch cycle in case the value does not correspond to the amount of deviation which gives the real maximum value.

Moreover, FIG. 46 (B) shows a case in which the value in the proximity of the first local maximum is detected as the maximum value. In this case, parameter A will always be larger than parameter B as shown in FIG. 46 (B), and the obtained amount of deviation z is used as it is for the pitch cycle used in the subsequent process.

CPU 1 finds the pitch frequency fp by arithmetic operation, in accordance with the equation (9), from the pitch frequency $\tau p$ expressed in terms of the scale for the sampling number obtained in this manner. Then, the CPU moves on to the next process (Step 289).

Consequently, in the embodiment mentioned above, the system detects the occurrence of the maximum value even when the autocorrelation function in the proximity of the second local maximum point attains the maximum value. The system applies interpolation to the pitch cycle, so that the system is capable of extracting the pitch information with a higher level of accuracy in comparison with systems of the past. The increased accuracy is achieved without raising the sampling frequency. Therefore the system executes the subsequent processes such as segmentation, musical interval identifying process, and key determining process with more accuracy.

Note that the embodiment described above features a system for which parameters A and B (A and B are for judging whether or not the amount of deviation corresponds to any point in the proximity of the real peak) are weighted average values. Another parameter, however, may be used for such a judgment.

Furthermore, the embodiment given above shows the present invention applied to an automatic music transcription system. The present invention may, however, also be applied to other apparatuses which require the process of extracting pitch information from acoustic signals.

Figure 47:
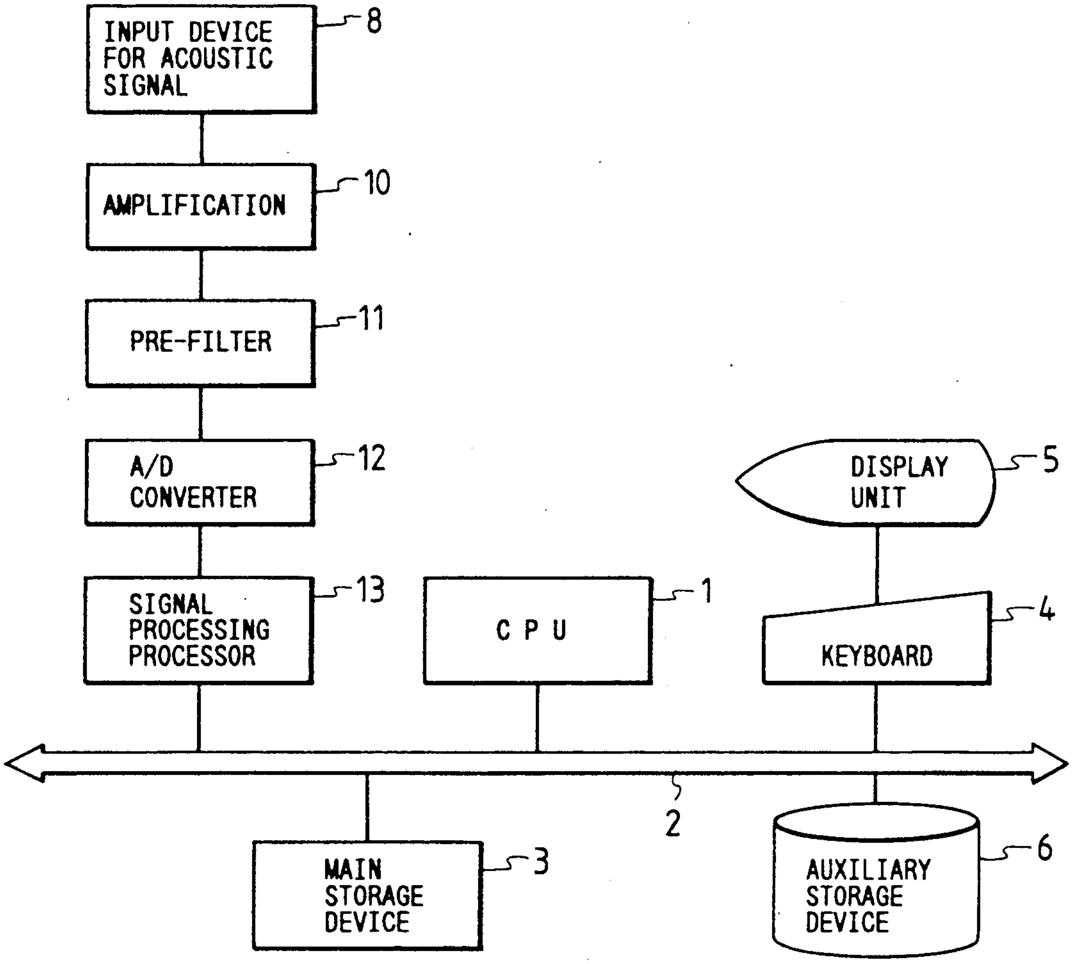
FIG. 47 is a block diagram illustrating the second embodiment of the construction of the automatic musical transcription system.

In the above-mentioned embodiment, moreover, CPU 1 executes all the processes shown in FIG. 3 according to the programs stored in the main storage device 3. The system may be so designed so that CPU 1 executes all the processes in hardware. For example, as shown in FIG. 47, where those parts in correspondence to their counterparts in FIG. 2 are represented with the same reference codes, the system may be so constructed that the acoustic signal transmitted from the acoustic signal input device 8 is amplified through the amplifying circuit 10 and thereafter converted into a digital signal by feeding it into the digital/analog converter 12 via a pre-filter circuit 11. The acoustic signal thus converted into a digital signal is processed for autocorrelation analysis by the signal processor 13 for extracting the pitch information. The acoustic signal is also processed for finding the sum of the square value thereby extracting the power information to be given to the software processing system. Signal processor 13 (for use in a hardware construction (10 to 13) like this), is a processor (for example, $\mu$ PD 7720 made by NEC) capable of performing realtime processing of signals in the vocal sound zone and having interfacing signals for interfacing with CPU 1 in the host computer. A 1 in the host computer. A system according to the present invention is capable of performing highly accurate segmentation without being influenced by noises or fluctuations in the power information, even if they are present. The present invention also accurately determines the key, accurately identifies the musical interval of each segment, and generates an accurate final musical score.

Moreover, without raising the sampling frequency, the present invention extracts pitch information with a higher degree of accuracy than previous prior art systems. This advantage is made possible through the utilization of autocorrelation functions.

Still further, the present invention improves the accuracy of post-treatment processes (such as the identifying of musical intervals) thereby improving the accuracy of the finally generated musical score data.

What is claimed is:

1. A method for transcribing music onto an absolute musical interval axis with predetermined frequencies marking boundaries of each interval, comprising the steps of:

inputting an acoustic signal;

extracting pitch information and power information from said acoustic signal;

correcting said pitch information by determining a musical interval axis of said pitch information according to a predetermined algorithm and then shifting the pitch of said pitch information so that a musical interval axis of the shifted pitch information according to said algorithm matches the absolute musical interval axis;

first dividing said acoustic signal into first single sound segments on the basis of said corrected pitch information while second dividing said acoustic signal into second single sound segments on the basis of power changes in said power information;

third dividing said acoustic signal into third single sound segments on the basis of both said first and second single sound segments;

identifying musical intervals in said acoustic signal by matching each of said third single sound segments to one of said predetermined frequencies marking the boundaries of the absolute musical interval axis;

fourth dividing said acoustic signal again into fourth single sound segments by combining adjacent third single sound segments which are matched to the same predetermined marking frequency;

determining a key inherent in said acoustic signal on the basis of the pitch information extracted in said extracting pitch information step;

correcting the matching of said fourth dividing step using said determined key;

fifth dividing said acoustic signal again into fifth single sound segments by combining adjacent third single sound segments which are matched to the same predetermined marking frequency;

determining a time and tempo inherent in said acoustic signal on the basis of said corrected segment information; and compiling musical score data from the fifth single sound segments, the predetermined marking frequency on the absolute musical interval axis to which each of the fifth single sound segments is matched, the key, the time and the tempo.

2. The method for transcribing music of claim 1, further comprising the step of:

eliminating noise from and interpolating said extracted pitch and power information, the noise eliminating and interpolating step being performed after said step of extracting pitch and power information and before said step of correcting said pitch information.

3. The method for transcribing music of claim 1, wherein said second dividing step comprises the steps of:

comparing said power information to a predetermined value and dividing said acoustic signal into a first section larger than said predetermined value while recognizing said first section as an effective section and also dividing said acoustic signal into a second section smaller than said value while recognizing said second section as an invalid section;

extracting a point of change where said power information rises with respect to said effective section;

dividing said effective segment into smaller parts at said point of change;

measuring the length of said segments of both of said effective and invalid sections; and connecting any segment with a length shorter than a predetermined length to the preceding segment to form one segment.

4. The method for transcribing music of claim 1, wherein said second dividing step comprises the steps of:

comparing said power information to a predetermined value and dividing said acoustic signal into a first section larger than said predetermined value while recognizing said first section as an effective section and also dividing said acoustic signal into a second section smaller than said value while recognizing said second section as an invalid section;

extracting a point of change where said power information rises with respect to said effective section; and dividing said acoustic signal on the basis of said extracted point of change.

5. The method for transcribing music of claim 1, wherein said second dividing step comprises the steps of:

dividing said acoustic signal into a first section larger than a predetermined value while recognizing said first section as an effective section and into a second section smaller than said predetermined value while recognizing said second section as an invalid section;

measuring the length of both said first and second sections; and connecting any segment with a length shorter than a predetermined length to the preceding segment.

6. The method for transcribing music of claim 1, wherein said second dividing step comprises the steps of:

extracting a point of change where said power information rises; and dividing said acoustic signal with respect to said point of change.

7. The method for transcribing music of claim 1, wherein said second dividing step comprises the steps of:

extracting a point of change where of said power information rises;

dividing said acoustic signal with respect to said point of change; and connecting any segment with a length shorter than a predetermined length to the preceding segment.

8. The method for transcribing music of claim 1 wherein the acoustic signal is sampled into individual sampling points, wherein said first dividing step comprises the steps of:

analyzing said individual sampling points of the acoustic signal using said extracted pitch information to determine a length of a series of said sampling points in which the pitch of said sampling points remains in a range;

detecting a section in which said determined length of said series exceeds a predetermined value;

identifying the sampling point beginning the series having the maximum series length of said detected sections to be the typical point;

detecting the amount of the variation in said pitch information between adjacent typical points with respect to the individual sampling points between them when the difference in said pitch information at two adjacent typical points exceeds a predetermined value; and dividing said acoustic signal at one of said sampling points between adjacent typical points where the amount of variation between said one sampling point and an adjacent sampling point is maximum.

9. The method for transcribing music of claim 1, wherein said third dividing step comprises the steps of:

determining a standard length of a note corresponding to a predetermined duration of time on the basis of the length of each of said first single sound segments divided in said first dividing step; and dividing each of said first single sound segments on the basis of said determined standard length and dividing said single sound segments again which have lengths longer than said predetermined duration of time of said note.

10. The method for transcribing music of claim 1, wherein said step of identifying musical intervals comprises the steps of:

calculating the differences in pitch between the pitches of each of said third single sound segments and said predetermined frequencies of said absolute musical interval;

detecting the smallest difference; and recognizing the musical interval of said third single sound segment to be at said predetermined frequency on said absolute musical interval axis in relation to which the pitch of said third single sound segment has said smallest difference.

11. The method for transcribing music of claim 1, wherein said step of identifying musical intervals comprises the steps of:

calculating an average value of all said pitch information of each of said third single sound segments; and recognizing the musical interval of each of said third single sound segments to be at the predetermined frequency on said absolute musical interval axis in relation to which said calculated average pitch value of said third single sound segment is closest 12. The method for transcribing music of claim 1, wherein said step of identifying musical intervals comprises the steps of:

extracting an intermediate value of said pitch information of each of said third single sound segments; and recognizing the musical interval of each of said third single sound segments to be at the predetermined frequency on said absolute musical interval axis in relation to which said intermediate value is closest.

13. The method for transcribing music of claim 1, wherein said step of identifying musical intervals comprises the steps of:

extracting the most frequent value of said pitch information of each of said third single sound segments; and recognizing the musical interval of each of said third single sound segments to be at the predetermined frequency on said absolute musical interval axis in relation to which said most frequent value is closest.

14. The method for transcribing music of claim 1, wherein said step of identifying musical intervals comprises the steps of:

extracting the peak point pitch value of said power information for each of said third single sound segments; and recognizing the musical interval each of said third single sound segments to be at the predetermined frequency on said absolute musical interval axis in relation to which said peak point pitch value is closest.

15. The method for transcribing music of claim 1, wherein the acoustic signal is sampled into individual sampling points, wherein the step of identifying musical intervals comprises the steps of:

analyzing said individual sampling points of the acoustic signal using said extracted pitch information to determine a series for each of said sampling points in which the pitch of said sampling points in the series remains in a range;

identifying which of said series in each of said third single sound segments has the longest length finding an analytical point for said series of longest length in each of said third single sound segments, the analytical point being the sampling point about which the pitches of all other sampling points fall within half of said range; and identifying each of said third single sound segments with a predetermined pitch of the absolute musical interval axis by matching the pitch of the analytical point to the closest predetermined pitch on the absolute musical interval axis.

16. The method for transcribing music of claim 1, wherein said step of identifying musical intervals comprises the steps of;

extracting segments with lengths lower than a predetermined value;

extracting segments which have changes in pitch information of a particular constant inclination;

detecting the differences in pitch between the identified musical interval of each of said extracted segments and adjacent segments;

identifying the musical interval of both the extracted segment and the adjacent segment to be the predetermined marking frequency of the absolute musical interval axis which is closest to either of the extracted segment and the adjacent segment which is smaller than a predetermined value as an actual musical interval.

17. The method for transcribing music of claim 1, wherein said step of identifying musical intervals comprises the steps of:

extracting segments of said acoustic signal which begin and end according to a half step above and a half step below each of the predetermined frequencies of the absolute musical interval axis;

classifying totals of each of said extracted segments in said acoustic signal which corresponds to the same predetermined frequency on the absolute musical interval axis; and identifying the musical interval of each of said segments in accordance with said classified totals.

18. The method for transcribing music of claim 1, wherein said key determining step comprises the steps of:

classifying totals of said pitch information with respect to the absolute musical interval axis;

extracting a frequency of occurrence of each of said predetermined frequencies on the absolute musical interval axis;

calculating product sums of predetermined weighing coefficient and said extracted frequency of occurrence of each of said predetermined frequencies on the absolute musical interval axis, a different calculation being performed for each of musical key; and identifying the key of the acoustic signal to be the particular musical key resulting in the maximum product sum calculation.

19. The method for transcribing music of claim 1, wherein said step of extracting pitch information comprises the steps of:

converting said acoustic signal into digital form;

calculating an autocorrelation function of said acoustic signal in the digital form;

detecting an amount of deviation giving the maximum of the local maximum for said calculated autocorrelation functions by an amount of deviation other than zero;

detecting an approximate curve through which said autocorrelation functions of a plurality of sampling points including that giving said amount of deviation pass;

determining an amount of deviation resulting in the local maximum of said autocorrelation on said calculated approximate curve; and detecting a pitch frequency in accordance with said determined amount of deviation.

20. The method for transcribing music of claim 1, wherein said step of extracting pitch information comprises the steps of:

converting said acoustic signal into digital form;

calculating an autocorrelation function of said acoustic signal in the digital form;

detecting a pitch information in accordance with the maximum information of said calculated autocorrelation function;

judging whether the local maximum point of said autocorrelation function exists approximate to two-times of the largest frequency component of said detected pitch information; and outputting pitch information corresponding to said local maximum if the result of said judge is positive.

21. The method for transcribing music of claim 1, wherein said step of correcting said pitch information comprises the steps of:

classifying totals of said pitch information;

detecting a deviation from the absolute musical interval axis using said classified totals; and shifting the pitch of said pitch information by the amount of said detected deviation.

22. An apparatus for transcribing music, comprising:

means for inputting an acoustic signal;

means for amplifying said inputted acoustic signal;

means for converting the analog acoustic signal into digital form;

means for processing said digital acoustic signal for extracting pitch information and power information;

means for storing the processing program;

means for controlling said signal processing program; and means for displaying the transcribed music, wherein said means for amplifying, said means for converting, and said means for processing are formed in a hardware construction.

* * * * *